US011578237B2

(12) United States Patent
Hoshi et al.

(10) Patent No.: US 11,578,237 B2
(45) Date of Patent: Feb. 14, 2023

(54) ADHESIVE SHEET SET AND METHOD FOR PRODUCING PRODUCT

(71) Applicant: DAI NIPPON PRINTING CO., LTD., Tokyo-to (JP)

(72) Inventors: Kentaro Hoshi, Tokyo-to (JP); Anri Takarabe, Tokyo-to (JP); Tomoyuki Tachikawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 330 days.

(21) Appl. No.: 15/765,438

(22) PCT Filed: Oct. 7, 2016

(86) PCT No.: PCT/JP2016/080033
§ 371 (c)(1),
(2) Date: Aug. 28, 2018

(87) PCT Pub. No.: WO2017/061625
PCT Pub. Date: Apr. 13, 2017

(65) Prior Publication Data
US 2019/0010361 A1  Jan. 10, 2019

(30) Foreign Application Priority Data

Oct. 7, 2015 (JP) .............................. JP2015-199783
Mar. 15, 2016 (JP) .............................. JP2016-050611

(51) Int. Cl.
| C09J 163/00 | (2006.01) |
| C09J 5/04 | (2006.01) |
| C09J 7/10 | (2018.01) |
| C09J 11/06 | (2006.01) |
| C09J 7/30 | (2018.01) |
| E04F 13/00 | (2006.01) |
| C09J 7/21 | (2018.01) |
| E04F 13/08 | (2006.01) |

(52) U.S. Cl.
CPC . C09J 5/04 (2013.01); C09J 7/10 (2018.01); C09J 7/30 (2018.01); C09J 11/06 (2013.01); C09J 163/00 (2013.01); C09J 7/21 (2018.01); C09J 2301/208 (2020.08); C09J 2301/302 (2020.08); C09J 2301/312 (2020.08); C09J 2301/408 (2020.08); C09J 2433/00 (2013.01); E04F 13/002 (2013.01); E04F 13/0887 (2013.01); Y10T 428/14 (2015.01); Y10T 428/1476 (2015.01); Y10T 428/2848 (2015.01); Y10T 428/31536 (2015.04)

(58) Field of Classification Search
None
See application file for complete search history.

(56) References Cited

U.S. PATENT DOCUMENTS

| 4,091,157 A * | 5/1978 | Hori ........................ B32B 7/12 |
| | | 428/196 |
| 5,409,764 A | 4/1995 | Otsuki et al. |
| 6,547,887 B1 * | 4/2003 | Ko ............................ G09F 3/10 |
| | | 134/6 |
| 2008/0014449 A1 | 1/2008 | Phanopoulos |
| 2009/0324868 A1 * | 12/2009 | Tamai .................. B65H 19/283 |
| | | 428/41.6 |
| 2011/0104483 A1 | 5/2011 | Shinozaki et al. |
| 2011/0210455 A1 * | 9/2011 | Oonishi .............. H01L 25/0657 |
| | | 257/798 |
| 2015/0125675 A1 * | 5/2015 | Yoon ......................... C09J 7/10 |
| | | 428/212 |
| 2015/0184034 A1 * | 7/2015 | Taniguchi ................. B32B 7/12 |
| | | 428/41.5 |
| 2017/0226384 A1 * | 8/2017 | Kawamoto .......... C09J 133/066 |

FOREIGN PATENT DOCUMENTS

| JP | S58-118876 A | 7/1983 |
| JP | H04-300979 A | 10/1992 |
| JP | H09-291260 A | 11/1997 |
| JP | 2001-072949 A | 3/2001 |
| JP | 2004-292608 A | 10/2004 |
| JP | 2006-282952 A | 10/2006 |
| JP | 2006-312743 A | 11/2006 |
| JP | 2008-7777 A | 1/2008 |
| JP | 2008-288601 A | 11/2008 |
| JP | 2009-167251 A | 7/2009 |
| JP | 2010-7023 A | 1/2010 |
| JP | 2010-37389 A | 2/2010 |
| JP | 5021471 B2 | 9/2012 |
| JP | 5365003 B2 | 12/2013 |
| JP | 2014-43099 A | 3/2014 |
| WO | WO-2014007341 A1 * | 1/2014 | ................ C09J 7/10 |
| WO | WO-2016136717 A1 * | 9/2016 | ............ C09J 133/00 |

OTHER PUBLICATIONS

Hideaki, Toshioka et al., "Adhesive Agent and Electrode Connection Method Using the Same", English translation of JP2010-037389A, Feb. 18, 2010 (Year: 2010).*

Yashuhiro, Suga et al., "Anisotropic Conductive Adhesive Film", English translation of JP2006-312743A, Nov. 16, 2006 (Year: 2006).*

Dec. 20, 2016 Search Report issued in International Patent Application No. PCT/JP2016/080033.

* cited by examiner

*Primary Examiner* — Anish P Desai
(74) *Attorney, Agent, or Firm* — Oliff PLC

(57) ABSTRACT

An adhesive sheet set including a pair of adhesive sheets respectively including an adhesive layer capable of being cured and adhered by being in contact with each other, and a method for producing a product using the same. An adhesive sheet set including a first adhesive sheet and a second adhesive sheet, wherein the first adhesive sheet includes a first separator and a first adhesive layer provided on one surface of the first separator, the second adhesive sheet includes a second separator and a second adhesive layer provided on one surface of the second separator, and the first adhesive sheet and the second adhesive sheet are configured to be cured and adhered by the first adhesive layer and the second adhesive layer being in contact with each other.

18 Claims, 7 Drawing Sheets

ADHESIVE SHEET SET AND METHOD FOR PRODUCING PRODUCT

TECHNICAL FIELD

The present disclosure relates to an adhesive sheet set and a method for producing a product using the same.

BACKGROUND ART

In a producing step of a product, in order to adhere each member included in the product, a coating adhesion method using an adhesive is used. There are various adhesives varying according to their triggers that cause curing such as heat and light, among these adhesives, when the curing by heating or ultraviolet irradiation, for example, is difficult for reasons such as the kind of a member and the production environment of a product, a liquid adhesive capable of being cured at normal temperature is preferably used.

Examples of such liquid adhesive may include one-component type adhesive whose reaction is initiated by oxygen or moisture in air (Patent Document 1), and two-component type adhesive that is separated into a main agent and a curing agent.

Examples of the two-component type adhesive may include two-component mixing type adhesive whose reaction is initiated by mixing the main agent and the curing agent, and two-component separate-coating type adhesive whose reaction is initiated by separately coating a liquid chemical including the main agent and a liquid chemical including the curing agent respectively and then bringing into contact to each other (Patent Documents 2 to 5). The two-component separate-coating type adhesive is generally called, for example, honeymoon type adhesive or two-component curing type adhesive of a non-mixing type.

Also, double-sided tape is also used for adhering the members, instead of the liquid adhesive (Patent Document 6). Since tacky agent is usually used for the double-sided tape so that the curing is not necessary, the members may be adhered regardless of, for example, the kind of the member and the production environment of the product.

CITATION LIST

Patent Documents

Patent Document 1: Japanese Patent No. 5021471
Patent Document 2: Japanese Patent Application Laid-Open (JP-A) No. 2008-7777
Patent Document 3: JP-A No. 2006-282952
Patent Document 4: Japanese Patent No. 5365003
Patent Document 5: JP-A No. 2004-292608
Patent Document 6: JP-A No. 2001-72949
Patent Document 7: JP-A No. S58-118876
Patent Document 8: JP-A No. 2010-37389
Patent Document 9: JP-A No. 2006-312743
Patent Document 10: JP-A No. H09-291260
Patent Document 11: JP-A No. 2010-7023
Patent Document 12: JP-A No. 2014-43099
Patent Document 13: JP-A No. 2008-288601

SUMMARY

Technical Problem

However, when the liquid adhesive is used to adhere the members, the coating is difficult depending on the placed locations or positions of the member, also, coating unevenness, coating failure, or protruding adhesive or liquid dripping from an adherend surface may occur. Also, in the case of the two-component mixing type adhesive, the processes require time and effort due to burdensome measuring and mixing of the two liquids, and it is difficult to interrupt the coating operation in the middle after mixing the two liquids. Also, in the case of the one-component type adhesive, stable adhesiveness cannot be maintained since the curing property varies according to, for example, the surrounding environment and the condition of the adherend.

As described above, although the liquid adhesive is capable of being cured at normal temperature, there is a problem that the production of a product is made complicated from the viewpoint of, for example, handling.

Meanwhile, when the double-sided tape is used to adhere the members, the above-described problems peculiar to the coating adhesion are not likely to occur. Also, since the curing and aging of the tacky agent is not necessary, the attaching step may be simplified. However, since the tacky agent is inferior to the adhesive in adhesive force (tack force) so that the member cannot be strongly adhered for a long term, and since it is also inferior in heat stability and weatherability, there is a problem that, the tack force of the double-sided tape is deteriorated in a short term due to the surrounding environment so that the member is easily peeled off. Further, when a shear stress is applied to the adhesive surface between the double-sided tape and the member, displacement easily occurs, above all, when the adhesive surface is a vertical surface or a normal line surface, the above-described problems tend to be occurred easily due to the shear stress being applied in the vertical direction or in the normal line direction. Therefore, the members cannot be sufficiently adhered by the double-sided tape alone so that other fixation method such as an anchor fixing is necessary to be used together.

The present disclosure has been made in a nod to the above-described problems, and a main object thereof is to provide an adhesive sheet set including a pair of adhesive sheets respectively including an adhesive layer capable of being cured and adhered by being in contact with each other, and a method for producing a product using the same.

Solution to Problem

A method for producing a product according to an embodiment of the present disclosure is a method wherein a first member and a second member are adhered by using a first adhesive layer and a second adhesive layer capable of being cured and adhered by being in contact with each other, and the method for producing a product comprising: a first preparing step of preparing a first adhesive sheet-containing member in which one surface of the first adhesive layer, of a first adhesive sheet including the first adhesive layer, is attached to the first member, a second preparing step of preparing a second adhesive sheet-containing member in which one surface of the second adhesive layer, of a second adhesive sheet including the second adhesive layer, is attached to the second member, and an attaching step of attaching another surface of the first adhesive layer of the first adhesive sheet-containing member and another surface of the second adhesive layer of the second adhesive sheet-containing member.

A method for producing a product according to an embodiment of the present disclosure is a method wherein a first member and a second member are adhered by using a first adhesive layer and a second adhesive layer capable of being cured and adhered by being in contact with each other, and the method for producing a product comprising: a preparing step of preparing a first adhesive sheet-containing member in which one surface of the first adhesive layer, of a first adhesive sheet including the first adhesive layer, is attached to the first member, a second adhesive sheet attaching step of attaching one surface of the second adhesive layer, of a second adhesive sheet including the second adhesive layer, to another surface of the first adhesive layer of the first adhesive sheet-containing member, and a second member attaching step of attaching the second member to another surface of the second adhesive layer of the second adhesive sheet.

A method for producing a product according to an embodiment of the present disclosure is a method wherein a first member and a second member are adhered by using a first adhesive layer and a second adhesive layer capable of being cured and adhered by being in contact with each other, and the method for producing a product comprising: a preparing step of preparing a multi-layered adhesive sheet in which one surface of the first adhesive layer, of a first adhesive sheet including the first adhesive layer, and one surface of the second adhesive layer, of a second adhesive sheet including the second adhesive layer, are attached, a first attaching step of attaching the first member to another surface of the first adhesive layer of the multi-layered adhesive sheet, and a second attaching step of attaching the second member to another surface of the second adhesive layer of the multi-layered adhesive sheet.

A method for producing a product according to an embodiment of the present disclosure is a method using a first adhesive layer and a second adhesive layer capable of being cured and adhered by being in contact with each other, and the method for producing a product comprising: a preparing step of preparing a first adhesive sheet-containing member in which one surface of the first adhesive layer, of a first adhesive sheet including the first adhesive layer, is attached to a first member, and a second adhesive sheet attaching step of attaching one surface of the second adhesive layer, of a second adhesive sheet including the second adhesive layer, to another surface of the first adhesive layer of the first adhesive sheet-containing member.

An adhesive sheet set according to an embodiment of the present disclosure comprises a first adhesive sheet and a second adhesive sheet, wherein the first adhesive sheet includes a first separator and a first adhesive layer provided on one surface of the first separator, the second adhesive sheet includes a second separator and a second adhesive layer provided on one surface of the second separator, and the first adhesive sheet and the second adhesive sheet are configured to be cured and adhered by the first adhesive layer and the second adhesive layer being in contact with each other.

Advantageous Effects of Disclosure

The present disclosure achieves the effects that it is possible to provide an adhesive sheet set including a pair of adhesive sheets respectively including an adhesive layer capable of being cured and adhered by being in contact with each other, and a method for producing a product using the same.

DESCRIPTION OF EMBODIMENTS

Figure 1A:
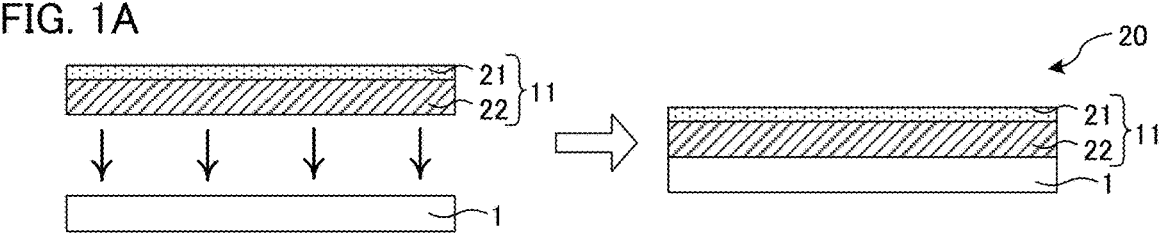
FIGS. 1A to 1D are process diagrams illustrating an example of the first embodiment of a method for producing a product.

In order to solve the above-described problems of each of the adhesive and the double-sided tape upon adhering the members in the production of a product, the present inventors have studied closely. As the result, the present inventors have found out that it is possible to adhere the members while compensating the shortcomings of the above-described adhesive and double-sided tape and also taking advantages of the both, by using an adhesive sheet wherein the two kinds of liquid chemicals of the two-component separate-coating type adhesive are made into a sheet respectively.

In a method for producing a product using the two-component separate-coating type adhesive, as disclosed in Patent Documents 2 and 3 for example, the members are usually adhered to each other by separately coating the two kinds of liquid chemicals to the adherend surface of each member, and then, bringing the liquid chemical coated surface of each member into contact with each other and curing at normal temperature. However, there are the above-described problems in the method for producing a product by coating adhesion method.

Meanwhile, using the two-component separate-coating type adhesive, the present inventors have developed an adhesive sheet set including a pair of adhesive sheets: an adhesive sheet including an adhesive layer containing one of the two kinds of liquid chemicals, and an adhesive sheet including an adhesive layer containing another of the two kinds of liquid chemicals. Further, when attaching each adhesive sheet respectively to separate members and bringing the adhesive layers of each member into contact with each other, the present inventors have found out that it is possible to adhere the members strongly since the curing proceeds at normal temperature as in the case with the coating adhesion method. Also, the present inventors have found out that the production of a product will be simpler than the coating adhesion method by using the above-described adhesive sheet set. Incidentally, Patent Documents 2 to 5 neither disclose nor suggest making of each liquid chemical of the two-component separate-coating type adhesive into a sheet.

Further, according to the adhesive sheet set, the present inventors have found out that it is possible to combine various members and adhere regardless of material quality and expansion coefficient difference, since the adhesive cures at room temperature so that the occurrence of warpage and rise up of the member may be suppressed.

For example, when an adhesive sheet wherein a thermosetting type adhesive is made into a sheet is used to adhere members whose material quality or expansion coefficient differ greatly, the combination of the adhered members is limited according to, for example, the material quality since there is a problem that the warpage or rise up of the member occurs upon the thermosetting of the adhesive. Particularly, when a metal member and a plastic member are adhered, the above-described problem will be noticeable.

In contrast, according to the adhesive sheet set containing two-component separate-coating type adhesive, the occurrence of the above-described problems may be suppressed since it is capable of being cured at normal temperature.

A method for producing a product and an adhesive sheet set according to an embodiment of the present disclosure are based on the above-described findings. Hereinafter, a method for producing a product and an adhesive sheet set according to an embodiment of the present disclosure will be described in detail.

Incidentally, in some cases, the first adhesive layer and the second adhesive layer may be merely referred to as adhesive layer, and the first adhesive sheet and the second adhesive sheet may be merely referred to as adhesive sheet in the present specification. Also, the first member and the second member may be merely referred to as member in some cases. Further, the first adhesive sheet-containing member and the second adhesive sheet-containing member may be merely referred to as adhesive sheet-containing member in some cases.

I. Method for Producing Product

First, a method for producing a product according to an embodiment of the present disclosure will be described.

A. EMBODIMENTS

Hereinafter, a method for producing a product according to an embodiment of the present disclosure will be shown.

First Embodiment

The first embodiment of a method for producing a product (hereinafter, is abbreviated to a method for producing of the first embodiment in some cases) is a method wherein a first member and a second member are adhered by using a first adhesive layer and a second adhesive layer capable of being cured and adhered by being in contact with each other, and the method for producing a product comprising: a first preparing step of preparing a first adhesive sheet-containing member in which one surface of the first adhesive layer, of a first adhesive sheet including the first adhesive layer, is attached to the first member, a second preparing step of preparing a second adhesive sheet-containing member in which one surface of the second adhesive layer, of a second adhesive sheet including the second adhesive layer, is attached to the second member, and an attaching step of attaching another surface of the first adhesive layer of the first adhesive sheet-containing member and another surface of the second adhesive layer of the second adhesive sheet-containing member.

FIGS. 1A to 1D are process diagrams illustrating an example of the first embodiment of a method for producing a product. As exemplified in FIGS. 1A to 1D, first adhesive sheet-containing member 20 is prepared at first (FIG. 1A, first preparing step). In first adhesive sheet-containing member 20, one surface of first adhesive layer 22, of first adhesive sheet 11 including first adhesive layer 22, is attached to one surface of first member 1. As shown in FIG. 1A, first adhesive layer 22 of first adhesive sheet 11 may be formed on one surface of first separator 21.

Figure 1B:
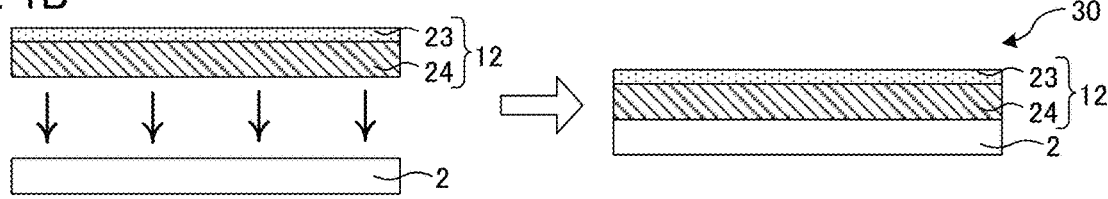

Also, second adhesive sheet-containing member 30 is prepared separately (FIG. 1B, second preparing step). In second adhesive sheet-containing member 30, one surface of second adhesive layer 24, of second adhesive sheet 12 including second adhesive layer 24, is attached to one surface of second member 2. As shown in FIG. 1B, second adhesive layer 24 of second adhesive sheet 12 may be formed on one surface of second separator 23. The first preparing step and the second preparing step may be performed in no particular order.

Figure 1C:
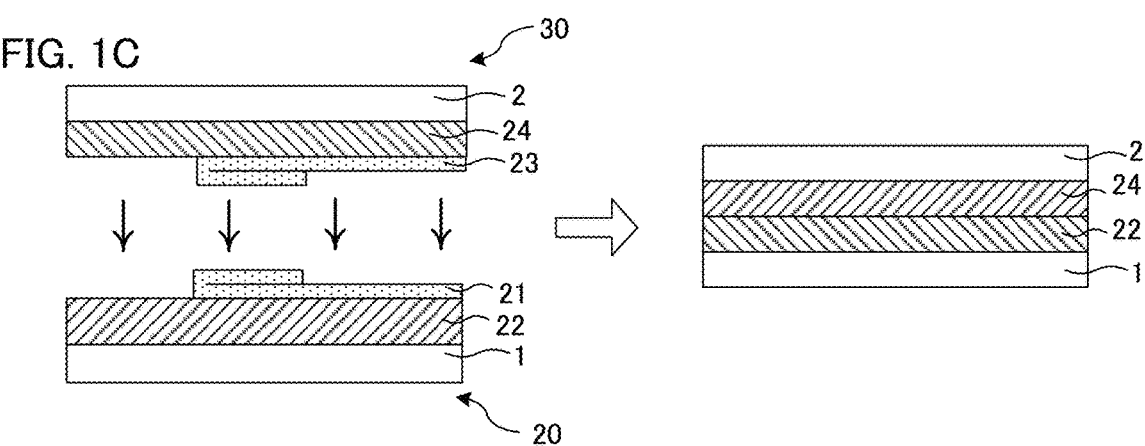
Figure 1D:
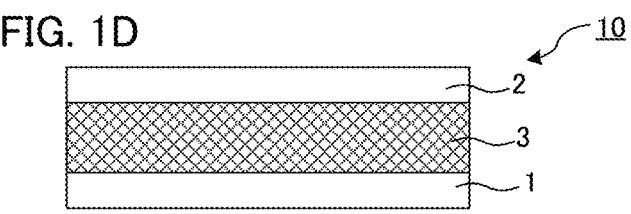

Subsequently, another surface of first adhesive layer 22 of first adhesive sheet-containing member 20 and another surface of second adhesive layer 24 of second adhesive sheet-containing member 30 are attached (FIGS. 1C to 1D, attaching step). When first adhesive sheet-containing member 20 or second adhesive sheet-containing member 30 includes first separator 21 or second separator 23 on another surface of first adhesive layer 22 or second adhesive layer 24, each separator is peeled off before attaching. On this occasion, by bringing first adhesive layer 22 and second adhesive layer 24 into contact with each other, the component in first adhesive layer 22 and the component in second adhesive layer 24 are diffused so that the curing reaction proceeds at normal temperature, and the adhesiveness is improved. And by the completion of the curing reaction, first adhesive layer 22 and second adhesive layer 24 will be cured adhesive layer 3 exhibiting a strong adhesive force (FIG. 1D) so that first member 1 and second member 2 may be adhered strongly via cured adhesive layer 3. Thus, product 10 including first member 1, cured adhesive layer 3, and second member 2 may be obtained.

According to the first embodiment of the method for producing a product, by attaching the first adhesive layer of the first adhesive sheet-containing member and the second adhesive layer of the second adhesive sheet-containing member, the curing reaction proceeds at normal temperature by being in contact so that the members may be adhered to each other with a strong adhesive force exhibited by the curing. Also, since each adhesive sheet-containing member includes the adhesive sheet attached to the member, the mixing of two liquids as for a two-component type adhesive is not necessary so that the members may be adhered to each other simply. In addition, since the thickness of the adhesive layer may be controlled, problems such as coating unevenness and coating failure of the adhesive, and protruding adhesive from an adherend surface may be suppressed from occurring. Furthermore, since the curing reaction does not proceed until the first adhesive layer and the second adhesive layer are brought into contact with each other, each adhesive sheet-containing member may be stored separately for long term until the attaching step, and the adhesive layers of each adhesive sheet-containing member may be brought into contact with each other according to the timing of adhering.

As described above, the production of a product may be made simpler than the coating adhesion method by making the two kinds of liquid chemicals of the two-component separate-coating type adhesive into a sheet.

In the first embodiment of the method for producing a product, it is preferable that the first member of the first adhesive sheet-containing member is fixed, a tack force of at least the second adhesive layer is in a range of 0.05 N/in or more to less than 1 N/in, and in the attaching step, the second adhesive sheet-containing member is moved and attached to the another surface of the first adhesive layer of the fixed first adhesive sheet-containing member.

Since at least the second adhesive layer has a predetermined tack force (weak tackiness) when the second adhesive sheet-containing member is moved to the fixed first adhesive sheet-containing member and attached to a desired position, the adhesive does not easily stick to a worker's hand so that handling thereof is easy and the workability may be improved. Also, since the second adhesive sheet-containing member may be easily peeled off even if it is attached to other adherend and may be reattached, the reworkability may be improved.

On this occasion, the tack force of the first adhesive layer may be appropriately set according to the required property and function.

Second Embodiment

The second embodiment of a method for producing a product (hereinafter, is abbreviated to a method for producing of the second embodiment in some cases) is a method wherein a first member and a second member are adhered by using a first adhesive layer and a second adhesive layer capable of being cured and adhered by being in contact with each other, and the method for producing a product comprising: a preparing step of preparing a first adhesive sheet-containing member in which one surface of the first adhesive layer, of a first adhesive sheet including the first adhesive layer, is attached to the first member, a second adhesive sheet attaching step of attaching one surface of the second adhesive layer, of a second adhesive sheet including the second adhesive layer, to another surface of the first adhesive layer of the first adhesive sheet-containing member, and a second member attaching step of attaching the second member to another surface of the second adhesive layer of the second adhesive sheet.

Figure 2A:
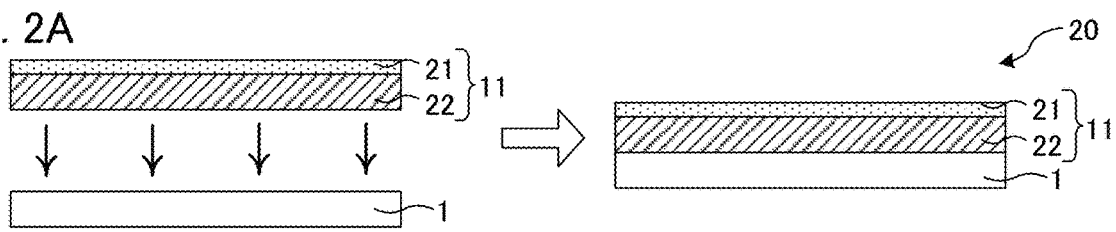
FIGS. 2A to 2C are process diagrams illustrating an example of the second embodiment of a method for producing a product.
Figure 2B:
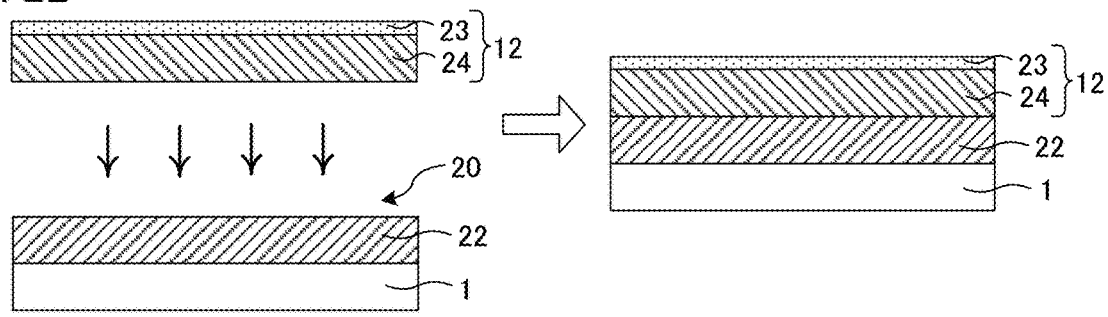
Figure 2C:
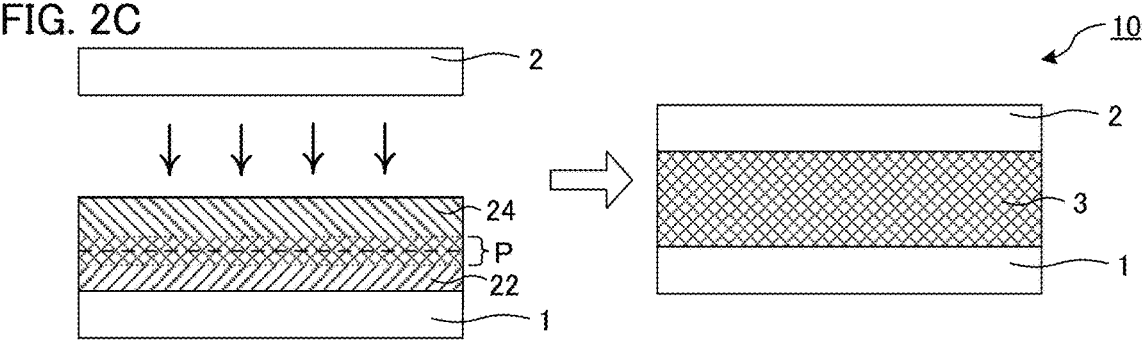

FIGS. 2A to 2C are process diagrams illustrating an example of the second embodiment of a method for producing a product. As exemplified in FIGS. 2A to 2C, first adhesive sheet-containing member 20 in which one surface of first adhesive layer 22, of first adhesive sheet 11 including first adhesive layer 22, is attached to one surface of first member 1, is prepared at first (FIG. 2A, preparing step). As shown in FIG. 2A, in first adhesive sheet 11, first separator 21 may be placed on another surface (surface opposite to the first member side) of first adhesive layer 22.

Next, one surface of second adhesive layer 24, of second adhesive sheet 12 including second adhesive layer 24, is attached to another surface of first adhesive layer 22 of first adhesive sheet-containing member 20 (FIG. 2B, second adhesive sheet attaching step). When first separator 21 is placed on another surface of first adhesive layer 22, first separator 21 is peeled off previously. As shown in FIG. 2B, second adhesive layer 24 of second adhesive sheet 12 may be formed on one surface of second separator 23. First adhesive layer 22 and second adhesive layer 24 may be cured at normal temperature by being in contact with each other.

Next, second member 2 is attached to another surface of second adhesive layer 24 of second adhesive sheet 12 (FIG. 2C, second member attaching step). When second separator 23 is placed on another surface of second adhesive layer 24, second separator 23 is peeled off previously. In the second member attaching step, by the completion of the curing reaction by being in contact, first adhesive layer 22 and second adhesive layer 24 will be cured adhesive layer 3 exhibiting a strong adhesive force so that first member 1 and second member 2 may be adhered strongly via cured adhesive layer 3. Thus, product 10 including first member 1, cured adhesive layer 3, and second member 2 may be obtained. Incidentally, P in FIG. 2C shows a region that has been cured (cured region) by first adhesive layer 22 and second adhesive layer 24 being in contact.

According to the second embodiment of the method for producing a product, by attaching the first adhesive layer of the first adhesive sheet and the second adhesive layer of the second adhesive sheet on the first member, the curing reaction proceeds at normal temperature by being in contact so that the members may be adhered to each other with a strong adhesive force exhibited by the curing. Also, since the first adhesive sheet and the second adhesive sheet are attached and stacked respectively on the first member, the mixing of two liquids as for a two-component type adhesive is not necessary so that the adhering may be carried out simply. In addition, since the adhesive sheet is used, the thickness of the adhesive layer may be controlled, problems such as coating unevenness and coating failure of the adhesive, and protruding adhesive from an adherend surface may be suppressed from occurring. Furthermore, since the adhesive layer is not provided on the second member side, the second member may be handled easily.

As described above, the production of a product may be made simpler than the coating adhesion method by making the two kinds of liquid chemicals of the two-component separate-coating type adhesive into a sheet.

In the second embodiment of the method for producing a product, it is preferable that the first member of the first adhesive sheet-containing member is fixed, a tack force of at least the second adhesive layer is in a range of 0.05 N/in or more to less than 1 N/in, in the second adhesive sheet attaching step, the second adhesive sheet is moved and attached to the another surface of the first adhesive layer of the fixed first adhesive sheet-containing member, and in the second member attaching step, the second member is moved and attached to the another surface of the second adhesive layer.

Since at least the second adhesive layer has a predetermined tack force (weak tackiness) when the second adhesive sheet is moved to the fixed first adhesive sheet-containing member and attached to a desired position, the adhesive does not easily stick to a worker's hand so that handling thereof is easy and the workability may be improved. Also, since the second adhesive sheet may be easily peeled off even if it is attached to other adherend, and further, since the second member is capable of being reattached due to the tack force of the second adhesive layer when the second member is attached to the second adhesive layer in the second member attaching step, the reworkability may be improved.

On this occasion, the tack force of the first adhesive layer may be appropriately set according to the required property and function.

Third Embodiment

The third embodiment of a method for producing a product (hereinafter, is abbreviated to a method for producing of the third embodiment in some cases) is a method wherein a first member and a second member are adhered by using a first adhesive layer and a second adhesive layer capable of being cured and adhered by being in contact with each other, and the method for producing a product comprising: a preparing step of preparing a multi-layered adhesive sheet in which one surface of the first adhesive layer, of a first adhesive sheet including the first adhesive layer, and one surface of the second adhesive layer, of a second adhesive sheet including the second adhesive layer, are attached, a first attaching step of attaching the first member to another surface of the first adhesive layer of the multi-layered adhesive sheet, and a second attaching step of attaching the second member to another surface of the second adhesive layer of the multi-layered adhesive sheet.

Figure 3A:
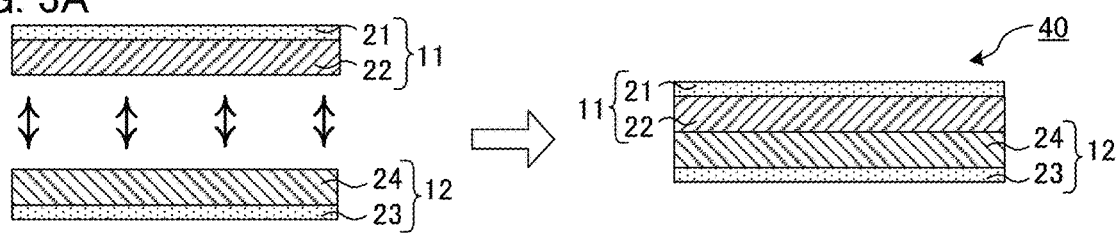
FIGS. 3A to 3C are process diagrams illustrating an example of the third embodiment of a method for producing a product.
Figure 3B:
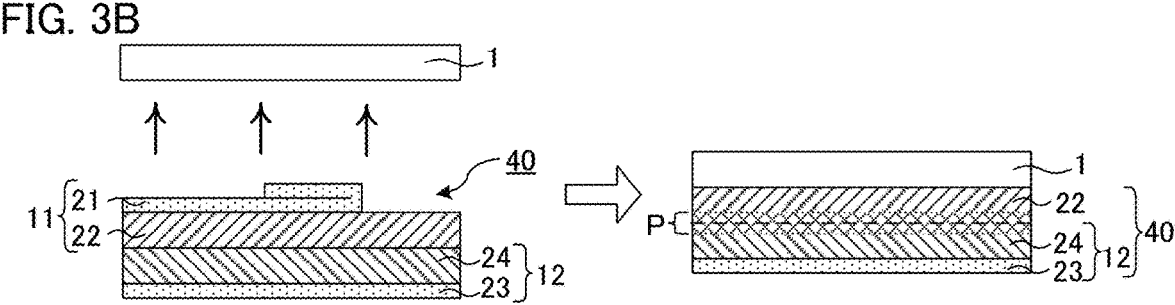
Figure 3C:
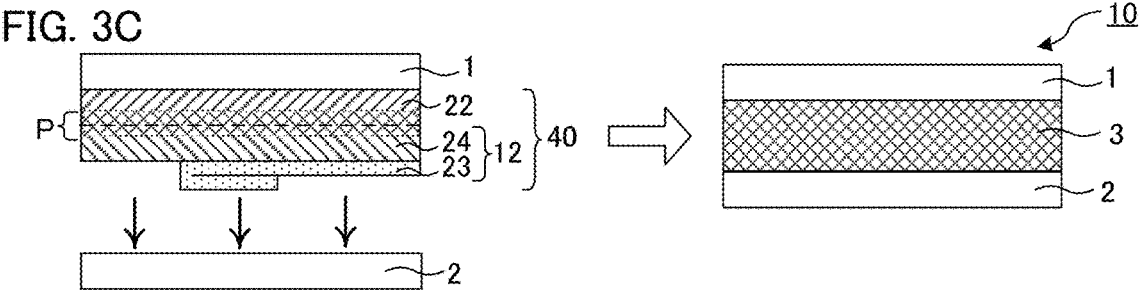

FIGS. 3A to 3C are process diagrams illustrating an example of the third embodiment of the method for producing a product. As exemplified in FIGS. 3A to 3C, multi-layered adhesive sheet 40 in which one surface of first adhesive layer 22, of first adhesive sheet 11 including first adhesive layer 22, and one surface of second adhesive layer 24, of second adhesive sheet 12 including second adhesive layer 24, are attached, is prepared at first (FIG. 3A, preparing step).

As shown in FIG. 3A, in first adhesive sheet 11, first separator 21 may be placed on another surface (surface opposite to the surface to be attached to second adhesive layer 24) of first adhesive layer 22. Also, in second adhesive sheet 12, second separator 23 may be placed on another surface (surface opposite to the surface to be attached to first adhesive layer 22) of second adhesive layer 24. Further, in multi-layered adhesive sheet 40, first separator 21 and second separator 23 may be respectively placed on another surface of first adhesive layer 22 and second adhesive layer 24.

Next, first member 1 is attached to another surface of first adhesive layer 22 of multi-layered adhesive sheet 40 (FIG. 3B, first attaching step). Also, second member 2 is attached to another surface of second adhesive layer 24 of multi-layered adhesive sheet 40 (FIG. 3C, second attaching step). When first separator 21 is placed on another surface of first adhesive layer 22 of multi-layered adhesive sheet 40, first separator 21 is peeled off previously in the present step. Similarly, when second separator 23 is placed on another surface of second adhesive layer 24 of multi-layered adhesive sheet 40, second separator 23 is peeled off previously in the present step.

In multi-layered adhesive sheet 40, first adhesive layer 22 and second adhesive layer 24 are in contact with each other, so that the component in first adhesive layer 22 and the component in second adhesive layer 24 are diffused in the first attaching step and the second attaching step, the curing reaction occurs at normal temperature, and a strong adhesive force may be exhibited. By the completion of the curing reaction, first adhesive layer 22 and second adhesive layer 24 will be cured adhesive layer 3 (FIG. 3C) so that first member 1 and second member 2 may be adhered strongly via cured adhesive layer 3. Thus, product 10 including first member 1, cured adhesive layer 3, and second member 2 may be obtained. Incidentally, P in FIGS. 3B and 3C shows a region that has been cured (cured region) by first adhesive layer 22 and second adhesive layer 24 being in contact.

The preparing step exemplified in FIG. 3A comprises a multi-layered adhesive sheet forming step of forming multi-layered adhesive sheet 40 by attaching first adhesive sheet 11 and second adhesive sheet 12. The multi-layered adhesive sheet forming step will be described later.

According to the third embodiment of the method for producing a product, time for attaching the members to each other may be shortened by using the multi-layered adhesive sheet in which the first adhesive layer of the first adhesive sheet and the second adhesive layer of the second adhesive sheet are previously stacked, and by attaching each member to the multi-layered adhesive sheet. Also, the members may be adhered to each other by strong adhesive force exhibited by the curing. Further, since the multi-layered adhesive sheet is used, the mixing of two liquids as for a two-component type adhesive is not necessary so that the members may be adhered to each other simply. In addition, since the thickness of the adhesive layer may be controlled, problems such as coating unevenness and coating failure of the adhesive, and protruding adhesive from an adherend surface may be suppressed from occurring.

As described above, the production of a product may be made simpler than the coating adhesion method by making the two kinds of liquid chemicals of the two-component separate-coating type adhesive into a sheet.

In the third embodiment of the method for producing a product, it is preferable that the first member is a fixed member, a tack force of at least the second adhesive layer is in a range of 0.05 N/in or more to less than 1 N/in, in the first attaching step, the multi-layered adhesive sheet is moved and attached to the another surface of the fixed first member, and in the second attaching step, the second member is moved and attached to the another surface of the second adhesive layer.

Since at least the second adhesive layer has a predetermined tack force (weak tackiness) when the multi-layered adhesive sheet is moved to the fixed first member and attached to a desired position, the adhesive does not easily stick to a worker's hand so that handling thereof is easy and the workability may be improved. Also, since the second member may be reattached, due to the tack force of the second adhesive layer, when the second member is moved and attached to the multi-layered adhesive sheet in the second attaching step, the reworkability may be improved.

On this occasion, the tack force of the first adhesive layer may be appropriately set according to the required property and function. For example, the workability and the reworkability, when the multi-layered adhesive sheet is moved and attached to the fixed first member in the first attaching step, may be improved by also making the tack force of the first adhesive layer in the above-described predetermined range.

Fourth Embodiment

The fourth embodiment of a method for producing a product (hereinafter, is abbreviated to a method for producing of the fourth embodiment in some cases) is a method using a first adhesive layer and a second adhesive layer capable of being cured and adhered by being in contact with each other, and the method for producing a product comprising: a preparing step of preparing a first adhesive sheet-containing member in which one surface of the first adhesive layer, of a first adhesive sheet including the first adhesive layer, is attached to a first member, and a second adhesive sheet attaching step of attaching one surface of the second adhesive layer, of a second adhesive sheet including the second adhesive layer, to another surface of the first adhesive layer of the first adhesive sheet-containing member.

Figure 4A:
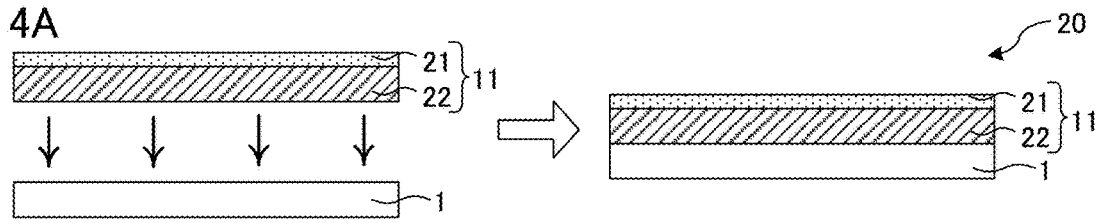
FIGS. 4A to 4C are process diagrams illustrating an example of the fourth embodiment of a method for producing a product.
Figure 4B:
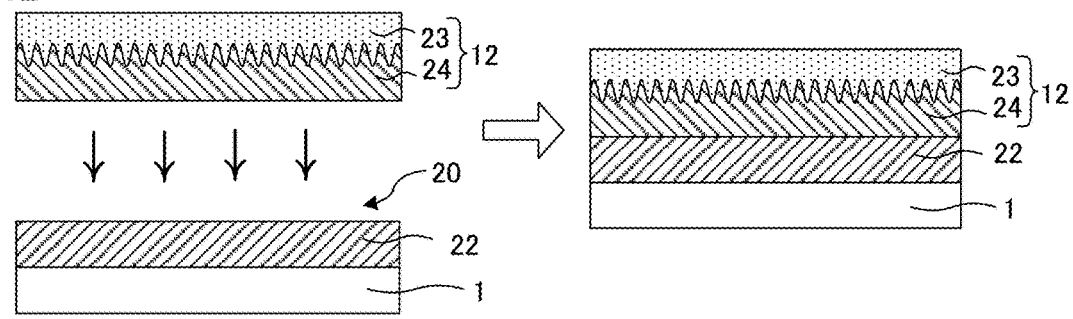
Figure 4C:
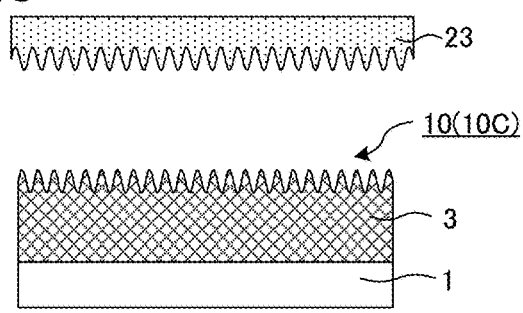

FIGS. 4A to 4C are process diagrams illustrating an example of the fourth embodiment of the method for producing a product. The fourth embodiment of the method for producing a product comprises a preparing step (FIG. 4A) and a second adhesive sheet attaching step (FIG. 4B). FIGS. 4A and 4B are similar to the above-described FIGS. 2A and 2B. By the completion of the curing reaction, first adhesive layer 22 and second adhesive layer 24 will be cured adhesive layer 3. As shown in FIG. 4C, when second separator 23 of second adhesive sheet 12 is placed on the surface of cured adhesive layer 3, that is opposite to the first member 1, after the second adhesive sheet attaching step, second separator 23 may be peeled off. Thus, product 10 including at least first member 1 and cured adhesive layer 3 may be obtained.

According to the fourth embodiment of the method for producing a product, by attaching the first adhesive layer of the first adhesive sheet and the second adhesive layer of the second adhesive sheet on the first member, the curing reaction proceeds at normal temperature by being in contact so that the adhesive layers may be adhered to each other with a strong adhesive force exhibited by the curing.

Also, since the first adhesive sheet and the second adhesive sheet are attached and stacked respectively on the first member, the mixing of two liquids as for a two-component type adhesive is not necessary so that the adhering may be carried out simply. In addition, since the adhesive sheet is used, the thickness of the adhesive layer may be controlled so that problems such as coating unevenness and coating failure of the adhesive, and protruding adhesive from an adherend surface may be suppressed from occurring.

Further, by one adhesive layer including other member within thereof, or by placing other member at the contact interface of the first adhesive layer and the second adhesive layer, the above-described other member may be held and fixed by the cured adhesive layer, and also, the first member may be mended or reinforced by the above-described other member.

As described above, the production of a product may be made simpler than the coating adhesion method by making the two kinds of liquid chemicals of the two-component separate-coating type adhesive into a sheet.

In the fourth embodiment of the method for producing a product, it is preferable that the first member of the first adhesive sheet-containing member is fixed, a tack force of at least the second adhesive layer is in a range of 0.05 N/in or more to less than 1 N/in, and in the second adhesive sheet attaching step, the second adhesive sheet is moved and attached to the another surface of the first adhesive layer of the fixed first adhesive sheet-containing member.

Since at least the second adhesive layer has a predetermined tack force (weak tackiness) when the second adhesive sheet is moved to the fixed first adhesive sheet-containing member and attached to a desired position, the adhesive does not easily stick to a worker's hand so that handling thereof is easy and the workability may be improved. Also, since the second adhesive sheet may be easily peeled off even if it is attached to other adherend, the reworkability may be improved.

[Others]

The first adhesive layer and the second adhesive layer may or may not have tackiness before curing, however, preferably have the tackiness. Since the aging of photosetting type and thermosetting type adhesives is needed until the completion of the curing, the attached state must be maintained for a desired aging time after attaching a member via the adhesive by, for example, pressing so that the operation in the attaching step will be complicated. In contrast, if the first adhesive layer and the second adhesive layer have the tackiness, the adhesive may be cured and aged while maintaining the attached state of the members or the adhesive layers to each other, until the contact curing is completed, by the tack force exhibited by the both adhesive layers. Incidentally, "the tackiness of a adhesive layer" in the present specification indicates the tackiness exhibited by the adhesive layer before the contacting (before the curing), unless the circumstances are exceptional.

Here, "tack" is a concept included in "adhesion". The tack is used as a meaning of a temporary adhesion phenomenon, whereas the adhesion is distinguished in some cases from a viewpoint that it is used as a meaning of a permanent adhesion phenomenon (Physical and Chemical Science Dictionary Fifth Edition, published by Iwanami Shoten). "Tackiness" and "tack force" indicate a property to adhere by pressure sensing and the adhesive force at that time.

An adhesive layer exhibiting the tackiness means that the adhesive layer before the contact curing exhibits the adhesive force (tack force) to the degree that it is able to fix a member temporarily. That is, the adhesive layer before the curing exhibits weaker adhesive force than after the curing. The specific tackiness exhibited by the adhesive layer will be described later.

Also, the first adhesive layer and the second adhesive layer will be the cured adhesive layer by being contact cured. The cured adhesive layer will be described later.

The first adhesive sheet and the second adhesive sheet may include a separator covering the first adhesive layer and the second adhesive layer respectively. The separator is provided on a surface of the adhesive layer so as to be peelable. In the adhesive sheet-containing member, the adhesive layer may be protected until it is attached to a member or other adhesive layer, by the surface of the adhesive layer that is opposite to the member, being covered with the separator.

When the adhesive sheet includes the separator, the separator may be included on one surface of the adhesive layer, or the separators may be included on both surfaces. In detail, the adhesive sheet before it is attached to an adherend such as the member and the adhesive layer of another adhesive sheet may include the separator on one surface of the adhesive layer, or the separators may be included on both surfaces. Also, in the adhesive sheet after it is attached to the adherend, the separator may be included on the surface of the adhesive layer that is opposite to the adherend.

Incidentally, the details of the separator will be described later. Also, the separator included in the first adhesive sheet is referred to as the first separator, and the separator included in the second adhesive sheet is referred to as the second separator.

B. USE APPLICATIONS AND DETAILS THEREOF

A method for producing a product according to an embodiment of the present disclosure may be used for methods for producing a product in various fields, and the use applications are not limited. Above all, it is preferably used as a method for producing a product in which heat or light irradiation is difficult. Specifically, the method for producing a product according to an embodiment of the present disclosure may be preferably used as a method for producing a construction product, an infra (infrastructure) structure, or an automobile.

Hereinafter, a method for manufacturing a construction product, a method for producing an infrastructure, and a method for producing an automobile using the method for producing a product according to an embodiment of the present disclosure will be explained.

1. Method for Producing Construction Product

In the method for producing a product according to an embodiment of the present disclosure, the first to third embodiments may be preferably used as a method for producing a construction product, among the above-described embodiments.

Since the first member and the second member are respectively a first construction material and a second construction material in the method for producing a construction product, that is, the method for producing a construction product may be "method for constructing a construction material" in which two kinds of construction materials are adhered. In this section, "product" may be replaced with "construction product", "method for producing a construction product" may be replaced with "method for constructing a construction material", and "member (first member and second member)" may be replaced with "construction material (first construction material and second construction material)" respectively and explained in some cases.

Examples of the construction product obtained by the method for producing a construction product using the method for producing a product according to an embodiment of the present disclosure may include construction structures generally constructed in the construction industry such as a house, a building, a tall building, and a tower; and a composite construction material used for these.

In the production of a construction product, the following construction is carried out; other construction material is adhered to a building frame such as a post, a beam, a ceiling, a wall, and a floor of a construction structure, such as a wallpaper is adhered to the inner wall of a construction structure, a decorative floor material such as a follow longboard is adhered to a floor, and a tile is adhered to an outer wall. Also, a construction, to make a composite construction material by adhering two kinds of different construction materials, is carried out.

Above, all, the renovation demand of the construction structure is increasing in recent years so that a construction in which a new construction material is adhered to the building frame already exist, is increasing.

However, when the adhesive is respectively coated to two kinds of construction material and adhered, there is a problem that the construction cannot be carried out simply since the coating operation is difficult depending on the arranged locations and positions of the construction material to which the adhesive is coated, and coating unevenness or protruding adhesive from the adherend surface of the construction material may occur according to the worker's coating skill. Also, when a two-component mixing and curing type adhesive is used, the construction requires time and effort due to burdensome measuring and mixing of the two liquids. In addition, there is a problem that the construction procedure is complicated since the attached construction material must be pressed and held until the adhesive is cured and the aging is completed.

On the other hand, when two kinds of construction materials are attached by using the double-sided tape, there are problems that the attached construction materials cannot be strongly fixed and held for long term, and that the fixed position may be displaced by applying a shear stress, since the tacky agent is used for the double-sided tape. Above all, the above-described problems tend to occur easily by applying the shear stress in a vertical direction or in a normal line direction, since the adherend surface in construction of a construction material is a vertical surface of a normal line surface in many cases. Therefore, the construction materials cannot be sufficiently fixed to each other by the double-sided tape alone so that other fixation method such as an anchor fixing is necessary to be used together, and the construction procedure will be complicated. Further, since the tacky agent is inferior in heat stability and weatherability, depending on the surrounding environment, the tack force is deteriorated in a short period of time so that the attached construction materials are easily peeled off. When the material quality of the two attached construction materials are different, there is a problem that a warpage and rise up occur easily due to the difference of the expansion coefficient of each construction material.

In contrast, by using any one of the first to third embodiments for the construction of a construction material upon the production of a construction product, among the above-described method for producing a product, these problems may be solved for the above-described reasons. Also, the first construction material and the second construction material may be adhered strongly at the desired position, the displacement after the adhesion may be suppressed from occurring, the construction procedure may be carried out simply, and a desired construction product may be obtained.

Hereinafter, a method for producing a construction product using each of the first to third embodiments of the method for producing a product will be described respectively.

(1) First Aspect

The first aspect of a method for producing a construction product (hereinafter, in this section, is abbreviated to "a method for producing of the present aspect" in some cases) is a method is a method using the method for producing of the first embodiment explained in the section of "A. Embodiments" above.

According to the method for producing of the present aspect, the first construction material and the second construction material may be adhered strongly at a desired position in the attaching step, and occurrence of, for example the displacement after the adhesion may be suppressed due to the effects exhibited by the above-described method for producing of the first embodiment.

Also, the curing and aging may be carried out while maintaining the attached state of the first construction material and the second construction material, until the curing reaction by the first adhesive layer and the second adhesive layer being in contact is completed, by the tack force respectively exhibited by each adhesive layer so that the construction procedure may be carried out simply since the operation time and effort during the aging is decreased. Further, by using the adhesive sheet, problems such as coating unevenness and protruding adhesive may be suppressed from occurring. Furthermore, for each adhesive sheet-containing construction material, the adhesive layers may be attached to each other at the appropriate timing of the construction, and the separate storage is possible.

(a) Construction Example

The method for producing of the present aspect is a method comprising the first preparing step, the second preparing step, and the attaching step that will be described later, and the construction is possible according to the kinds of the first construction material and the second construction material; the direction of the adherend surface (adhesive surface) when the construction materials are attached to each other; and the tackiness degree of the first adhesive layer and the second adhesive layer.

Hereinafter, a construction example using the method for producing of the present aspect will be explained with examples.

(i) First Example

The first example of the construction example using the method for producing of the present aspect (hereinafter, in this section, is abbreviated to "the present construction example" in some cases) is a construction example in which the adherend surface (adhesive surface) between the first construction material and the second construction material is a vertical surface or a normal line surface. Specifically, it is a construction example in which one of the first construction material and the second construction material is a wall covering material, and another is the wall of a construction structure. By the present construction example, a construction product, in which the wall of the construction structure and the wall covering material are adhered via the cured adhesive layer, may be obtained.

Figure 5A:
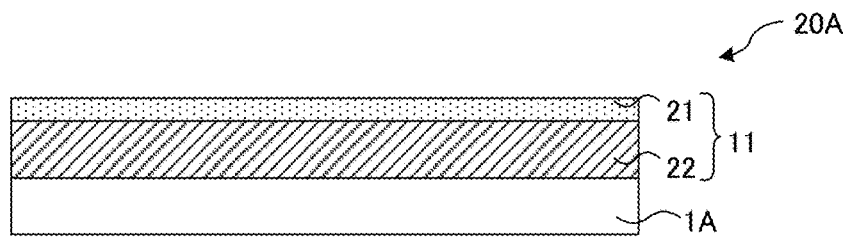
FIGS. 5A to 5C are process diagrams illustrating another example of the first embodiment of a method for producing a product.
Figure 5B:
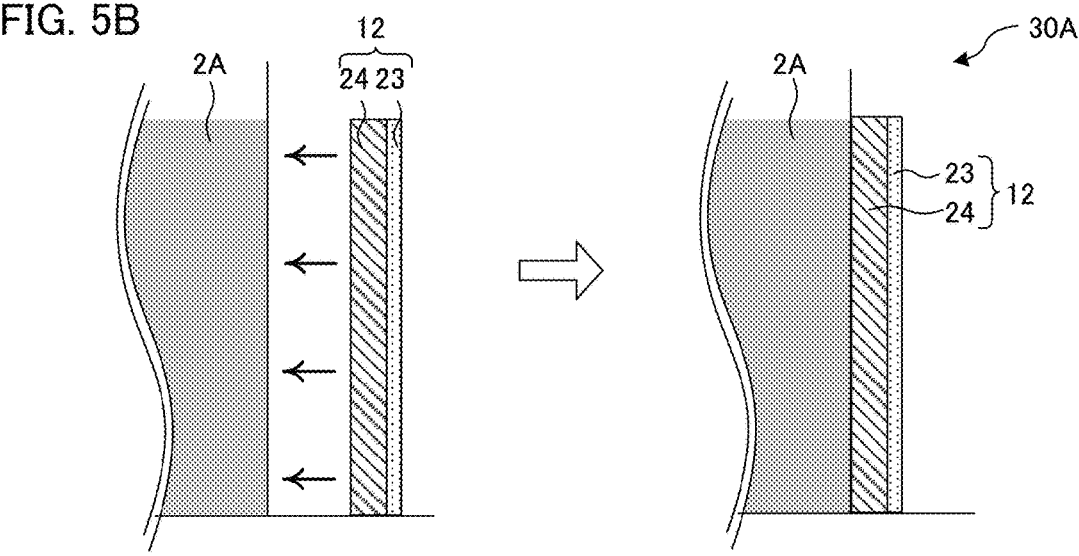
Figure 5C:
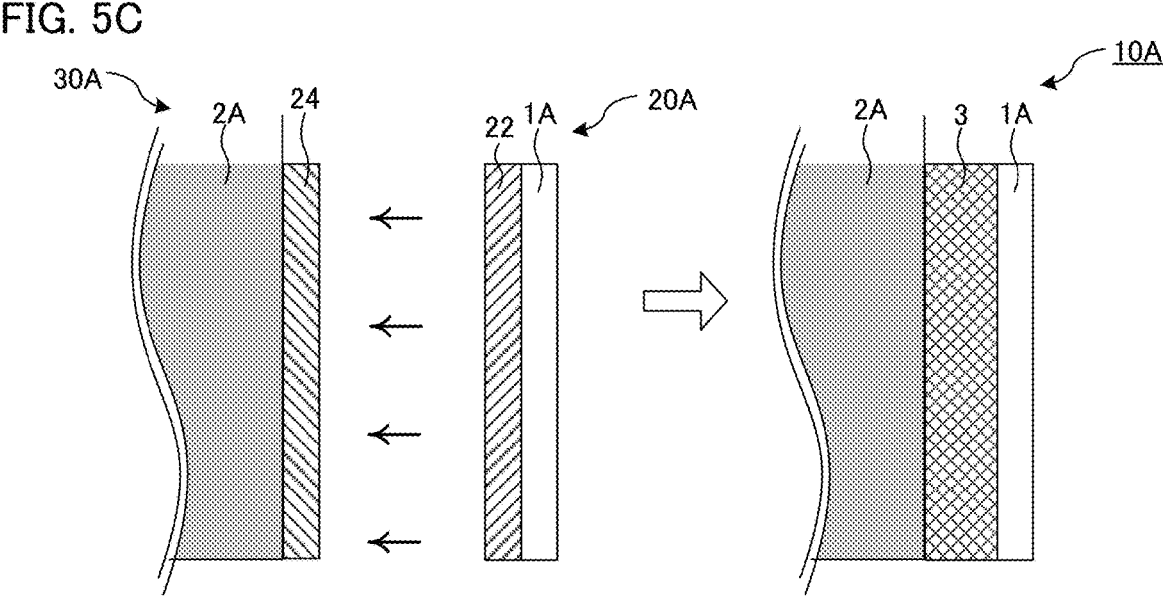

The construction of adhering the wall of the construction structure and the wall covering material may be carried out, for example, via the first preparing step, the second preparing step, and the attaching step illustrated in FIGS. 5A to 5C.

In the present construction example, in the first preparing step (FIG. 5A), first adhesive sheet-containing wall covering material 20A in which the first construction material is wall covering material 1A is prepared, and in the second preparing step (FIG. 5B), second adhesive sheet-containing wall 30A in which the second construction material is wall 2A of a construction structure is prepared. Incidentally, in FIG. 5B, upon preparing second adhesive sheet-containing wall 30A, the second adhesive sheet attaching step, in which second adhesive sheet 12 is attached to a surface (vertical surface) of wall 2A of the construction structure, is included. By the present construction example, construction product 10A, in which wall 2A of the construction structure and wall covering material 1A are adhered via cured adhesive layer 3, may be obtained.

Although the first construction material is the wall covering material and the second construction material is the wall of the construction structure in the example illustrated in FIGS. 5A to 5C, the contrary is possible. Above all, since the wall of a construction structure is usually fixed, the first construction material that is the first member is preferably the wall of a construction structure, and the second construction material that is the second member is preferable the wall covering material.

Since the adherend surface of the wall of a construction structure is usually a vertical surface or a normal line surface, a shear stress is applied in a vertical direction or in a normal line direction when the first adhesive layer on the surface of the wall covering material and the second adhesive layer on the surface of the wall are attached in attaching step. However, the attached state of the wall and the wall covering material may be maintained until a sufficient adhesive force is exhibited due to the progress of the curing reaction by the first adhesive layer and the second adhesive layer being in contact, so that the peeling off of the construction material due to the application of the shear stress may be suppressed by combining each of the first adhesive layer and the second adhesive layer respectively exhibiting the desired tack force and cohesive force. Also, even though the tack force is deteriorated over time, the wall and the wall covering material may be adhered and held strongly by the strong adhesive force exhibited due to the progress of the curing reaction meanwhile. Also, by adjusting the combination of the tack force between the first adhesive layer and the second adhesive layer, they may be reattached after being attached as long as the first adhesive layer and the second adhesive layer are not yet cured. Further, by making the viscosity between the first adhesive layer and the second adhesive layer high or low, parallel movement with respect to the adherend surface is possible in the attached state so that the position may be adjusted.

Specific the physical property and the combination of the first adhesive layer and the second adhesive layer will be described later.

(ii) Second Example

The second example of the construction example using the method for producing of the present aspect (hereinafter, in this section, is abbreviated to "the present construction example" in some cases) is a construction example in which the adherend surface (adhesive surface) between the first construction material and the second construction material is a horizontal surface. Specifically, it is a construction example in which one of the first construction material and the second construction material is a decorative floor material, and another is the floor of a construction structure. By the present construction example, a construction product, in which the floor of the construction structure and the decorative floor material are adhered via the cured adhesive layer, may be obtained.

Figure 6A:
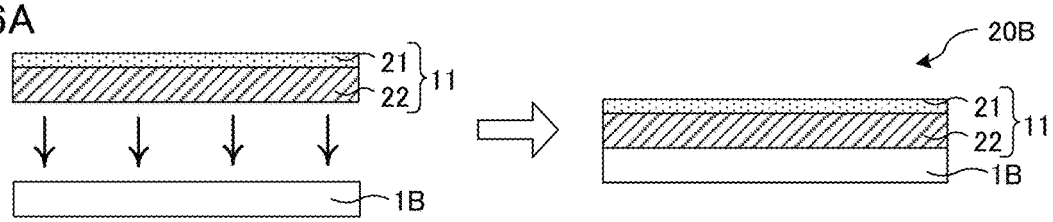
FIGS. 6A to 6C are process diagrams illustrating another example of the first embodiment of a method for producing a product.
Figure 6B:
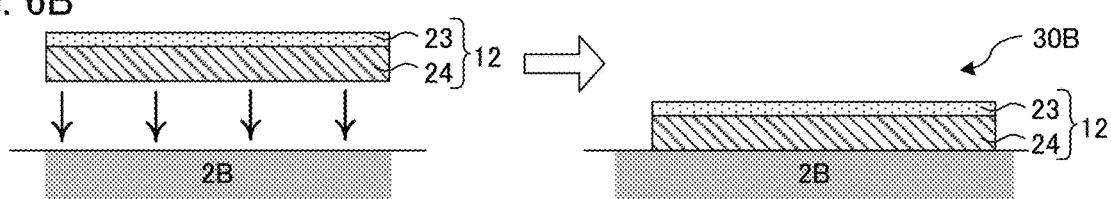
Figure 6C:
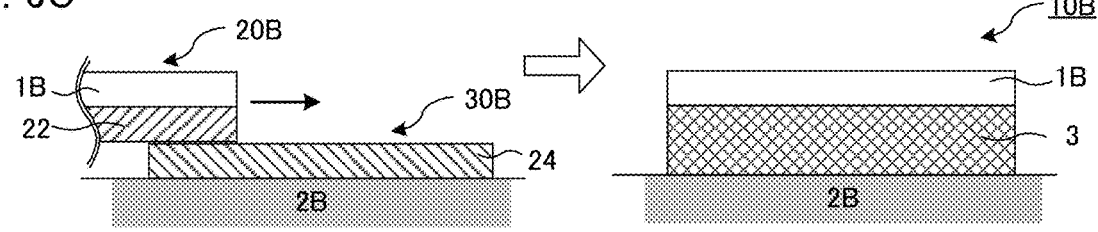

The construction of adhering the floor of the construction structure and the decorative floor material may be carried out, for example, via the first preparing step, the second preparing step, and the attaching step illustrated in FIGS. 6A to 6C.

In the present construction example, in the first preparing step (FIG. 6A), first adhesive sheet-containing decorative floor material 20B in which the first construction material is decorative floor material 1B is prepared, and in the second preparing step (FIG. 6B), second adhesive sheet-containing floor 30B in which the second construction material is floor 2B of a construction structure is prepared. Incidentally, in FIG. 6A, upon preparing first adhesive sheet-containing decorative floor material 20B, the first adhesive sheet attaching step, in which first adhesive sheet 11 is attached to a surface of decorative floor material 1B is included. Also, in FIG. 6B, upon preparing second adhesive sheet-containing floor 30B, the second adhesive sheet attaching step, in which second adhesive sheet 12 is attached to a surface (horizontal surface) of floor 2B of the construction structure, is included. By the present construction example, construction product 10B, in which floor 2B of the construction structure and decorative floor material 1B are adhered via cured adhesive layer 3, may be obtained.

Although the first construction material is the decorative floor material and the second construction material is the floor of the construction structure in the example illustrated in FIGS. 6A to 6C, the contrary is possible. Above all, since the floor of a construction structure is usually fixed, the first construction material that is the first member is preferably the floor of a construction structure, and the second construction material that is the second member is preferable the decorative floor material.

According to the present construction example, the attached state of the floor of a construction structure and the decorative floor material may be maintained while the curing reaction by the first adhesive layer and the second adhesive layer being in contact is in progress, by combining each of the first adhesive layer and the second adhesive layer respectively exhibiting the desired tack force and cohesive force. Also, since the floor and the decorative floor material are strongly adhered after the curing, the displacement of the floor and the decorative floor material may be suppressed from easily occurring even though a shear stress is applied in horizontal direction. Also, by adjusting the combination of the tack force between the first adhesive layer and the second adhesive layer, they may be reattached after being attached as long as the first adhesive layer and the second adhesive layer are not yet cured. Further, by making the viscosity between the first adhesive layer and the second adhesive layer high or low, parallel movement with respect to the adherend surface is possible in the attached state so that the position may be adjusted.

Specific physical property and combination of the first adhesive layer and the second adhesive layer will be described later.

(b) First Preparing Step and Second Preparing Step

The first preparing step in the method for producing of the present aspect is a step of preparing a first adhesive sheet-containing construction material in which one surface of the first adhesive layer, of a first adhesive sheet including the first adhesive layer, is attached to the first construction material. Also, the second preparing step is a step of preparing a second adhesive sheet-containing construction material in which one surface of the second adhesive layer, of a second adhesive sheet including the second adhesive layer, is attached to the second construction material.

The first preparing step and the second preparing step may be performed in no particular order.

(i) First Adhesive Sheet and Second Adhesive Sheet

The first adhesive sheet includes the first adhesive layer. Also, the second adhesive sheet includes the second adhesive layer.

Examples of the adhesive sheet may include a stacked body including a separator and the adhesive layer provided on one surface of the separator, and in the adhesive sheet-containing construction material using the same, the separator is placed on a surface of the adhesive layer that is opposite to the construction material side.

That is, in the first adhesive sheet-containing construction material prepared in the first preparing step, the first adhesive sheet including the first separator and the first adhesive layer formed on one surface of the first separator is attached to the first construction material on a surface of the first adhesive layer that the first separator is not placed.

Also, in the second adhesive sheet-containing construction material prepared in the second preparing step, the second adhesive sheet including the second separator and the second adhesive layer formed on one surface of the second separator is attached to the second construction material on a surface of the second adhesive layer that the second separator is not placed.

The first adhesive sheet including the first separator and the first adhesive layer provided on one surface of the first separator, and the second adhesive sheet including the second separator and the second adhesive layer provided on one surface of the second separator may be an adhesive sheet set since they have a pair relation.

The details of the adhesive sheet set that will be explained below are not limited to a adhesive sheet set used for the method for producing of the present aspect, and are related to the details of the adhesive sheet used for the method for producing a product according to an embodiment of the present disclosure and the adhesive sheet set according to an embodiment of the present disclosure described below.

<<<First Adhesive Layer and Second Adhesive Layer>>>

The first adhesive layer and the second adhesive layer may be cured and adhered by being in contact with each other. One of the first adhesive layer and the second adhesive layer having such property may be an adhesive layer including a curable component, that is a curable component-including layer, and another may be an adhesive layer including a reactivity imparting component, that is a reactivity imparting component-including layer.

The reactivity imparting component here refers to a component that reacts directly with the curable component or to a component that induces or proceeds the curing reaction of the curable component. By initiating the curing reaction by being in contact, and by the progress of the curing reaction while each of the components are diffused mutually, the adhesive layer including the curable component and the adhesive layer including the reactivity imparting component are capable of being cured substantially evenly.

In the above-described first and second examples of the construction example, the first adhesive layer may be the curable component-including layer and the second adhesive layer may be the reactivity imparting component-including layer, and the contrary is possible.

The combination of such curable component and reactivity imparting component is not particularly limited, and examples thereof may include a combination of a curable resin as the curable component and a curing agent as the reactivity imparting component, a combination of a curable resin and a latent curing agent as the curable component and a catalyst or a reducing agent as the reactivity imparting component, a combination of a curable inorganic material as the curable component and water or a catalyst as the reactivity imparting component, and a combination of a curable resin and a ph reactivity imparting component as the curable component and a an acid or an alkaline component as the reactivity imparting component.

For example, the first adhesive layer and the second adhesive layer may be formed by using each liquid chemical of a two-component separate-coating type adhesive including two kinds of a liquid chemical including a curable component (A liquid) and a liquid chemical including a reactivity imparting component (B liquid). Examples of the two-component separate-coating type adhesive may include conventionally known compositions. Specifically, examples may include an acrylic adhesive (SGA) including A liquid containing an acrylic resin and a radical polymerization initiator and B liquid containing a redox polymerization catalyst; an urethane adhesive including A liquid containing a polyol compound and B liquid containing a polyisocyanate compound; an epoxy adhesive including A liquid containing an epoxy resin and B liquid containing a curing agent such as a polyamide resin or a polythiol resin, and an imidazole; and a silicone adhesive including A liquid containing a silicone resin such as silicone oligomer and B liquid containing a platinum catalyst.

Incidentally, the two-component separate-coating type adhesive is not limited to these, and may be appropriately selected according to the material quality, for example, of a product. The followings are similar also in other method for producing a product. Also, not limited to the two-component separate-coating type adhesives, two-component curing type paints such as polymer cement may be used.

Hereinafter, the first adhesive layer and the second adhesive layer in the method for producing of the present aspect will be explained in each of the curable component-including layer and the reactivity imparting component-including layer.

<<Curable Component-Including Layer>>

The curable component-including layer is a layer including the curable component. The curable component may be a component that is curing reacted with the reactivity imparting component included in the reactivity imparting component-including layer, or may be a component that causes the curing reaction between the components included in the curable component by the existence of the reactivity imparting component. When a two-component separate-coating type adhesive is used for the first adhesive layer and the second adhesive layer, the curable component usually at least includes a main agent component in the two-component separate-coating type adhesive.

<Curable Component>

Examples of the curable component may include a curable resin, a curable inorganic material, and other materials used together with these. The curable component may include one of the curable resin and the curable inorganic material, or may include the both.

(Curable Resin)

The curable resin may be a resin used for a known two-component separate-coating type adhesive; examples may include an epoxy resin, an acrylic resin, a polyol compound, a silicone resin such as silicone oligomer, a melamine resin, a phenol resin mixture, and a silyl compound.

These may be appropriately selected according to the material quality of a product attached to the curable component-including layer. For example, when the material quality of a product to be attached is wood, ceramic, concrete, or metal, the curable resin is preferably an epoxy resin or a polyol compound. Also, when the material quality of a product to be attached is, for example, a hardly adhesive resin such as polypropylene and polyethylene, the curable resin is preferably a silicone resin or an acrylic resin.

When the curable component includes an epoxy resin, the epoxy resin preferably has two or more epoxy groups in one molecule. Generally, an epoxy resin used for an epoxy adhesive may be used. Examples may include an epoxy resin with a bisphenyl group such as bisphenol A type epoxy resin and a bisphenol F type epoxy resin; a naphthalene type epoxy resin; an aliphatic epoxy resin; a glycol epoxy resin; a pentaerythritol epoxy resin; an aromatic epoxy resin; a modified epoxy resin such as an urethane-modified epoxy resin and rubber-modified epoxy resin; and others such as epoxy resins disclosed in JP-A No. 2009-167251. These epoxy resins may be used alone, or two kinds or more may be used.

Also, when the curable component includes a polyol compound, any polyol compound may be used if it includes a plurality of hydroxyl groups in the molecule, and examples may include a polyester polyol, an acrylic polyol, and a polyetherpolyol.

When the curable component includes an acrylic resin, the acrylic resin may be any one of an acrylic monomer, an acrylic oligomer, and an acrylic polymer, and may be, for example, acrylic resins disclosed in JP-A No. 2008-248111.

When the curable component includes a melamine resin, a phenol resin mixture, or silylated compound, these resins and compounds may be similar to a resin and a compound used for a general two-component separate-coating type adhesive.

Above all, the curable component preferably includes an epoxy resin. Since the cohesive force and the adhesive force after the curing are high, it is possible to adhere those of various material qualities such as wood, concrete, and ceramic in a high strength.

Hereinafter, the epoxy resin included in the curable component will further be explained.

The epoxy resin included in the curable component may be a liquid epoxy resin or may be a solid epoxy resin. The liquid epoxy resin refers to an epoxy resin that is liquid at normal temperature (23° C.±2° C.), and the solid epoxy resin refers to an epoxy resin that is solid at normal temperature (23° C.±2° C.). For example, a bisphenol A type epoxy resin may be liquid at normal temperature when the bisphenol structure of the main chain is one or more and three or less, and may be solid at normal temperature when the bisphenol structure of the main chain is two or more and ten or less.

Any curable component-including layer may be used if at least one of the liquid epoxy resin and the solid epoxy resin is included; above all, it is preferable to include the both. When the curable component-including layer includes the liquid epoxy resin and the solid epoxy resin, the tackiness before the curing and the adhesive force after the curing may be adjusted by adjusting the molecular weight and the compounded amount of the each.

The mass-average molecular weight and the epoxy equivalent of the liquid epoxy resin may be appropriately set according to the required curing speed upon the contact of the first adhesive layer and the second adhesive layer. For example, the mass-average molecular weight (Mw) of the liquid epoxy resin is preferably in a range of 200 or more to 900 or less. Also, the epoxy equivalent (g/eq.) on this occasion is preferably in a range of 100 or more to 500 or less. Within the range, the liquid epoxy resin is easily penetrated to another adhesive layer side upon the contact of the first adhesive layer and the second adhesive layer so that the curing speed may be increased. Also, the durability and the adhesive force of the adhesive layer after the curing may be improved.

Also, the mass-average molecular weight and the epoxy equivalent of the solid epoxy resin may be appropriately set according to the magnitude of a shear stress applied to the curable component-including layer and the direction of the applied stress. For example, the mass-average molecular weight (Mw) of the solid epoxy resin is preferably in a range of 900 or more to 6000 or less. Within the range, the durability and the tack force of the adhesive layer may be improved. Also, the epoxy equivalent (g/eq.) on this occasion is preferably in a range of 450 or more to 5000 or less. Within the range, the cohesive force and the film-forming property of the curable component-including layer may be improved and it may be stronger to a shear stress. Also, the durability and the adhesive force of the adhesive layer after the curing may be improved.

The mass-average molecular weight is a value in terms of polystyrene upon measuring by a gel permeation chromatography (GPC). Also, the epoxy equivalent is the weight in grams of the resin including an epoxy group of one gram equivalent measured by a method compliant with JIS K 7236:2009

(Determination of Epoxy Equivalent in Epoxy Resins).

When the curable component-including layer includes the both of the liquid epoxy resin and the solid epoxy resin as the epoxy resin, the compounded ratio of the liquid epoxy resin and the solid epoxy resin may be set according to the tackiness and the cohesive force required to the curable component-including layer.

In order to obtain a curable component-including layer having a strong tackiness or a low cohesive force, the content of the liquid epoxy resin is preferably 50% by mass or more, above all, 60% by mass or more, also, preferably 95% by mass or less, above all, 90% by mass or less, to the total amount of the liquid epoxy resin and the solid epoxy resin in the curable component-including layer (100% by mass). The content of the liquid epoxy resin is preferably more than the content of the solid epoxy resin.

Meanwhile, in order to obtain a curable component-including layer having a weak tackiness or a high cohesive force, the content of the liquid epoxy resin is preferably 20% by mass or more, above all, 30% by mass or more, and also, preferably 70% by mass or less, above all, 60% by mass or less, to the total amount of the liquid epoxy resin and the solid epoxy resin in the curable component-including layer (100% by mass). The content of the liquid epoxy resin in the curable component-including layer is more preferably equal to or less than the content of the solid epoxy resin. Incidentally, the strength and the weakness of the tackiness and the highness and the lowness of the cohesive force will be described later.

(Curable Inorganic Material)

As the curable inorganic material, for example, a hydraulic curing inorganic material that is cured using water as a catalyst may be used. Specific examples of the hydraulic curing inorganic material may include cements such as Portland cement, alumina cement, acid resistance cement, slag cement, Roman cement, and magnesia cement; plaster; caustic lime; magnesium carbonate.

(Other Materials)

The curable component may include, for example, a curing agent, a catalyst, an initiator, a curing accelerating agent, and a reducing agent, in addition to the curable resin or the curable inorganic material. Usually, these materials may be different materials from that of the reactivity imparting component included in the reactivity imparting component-including layer to be a pair, and may be appropriately selected according to the kind of the curable resin or curable inorganic material, the kind of the reactivity imparting component included in the reactivity imparting component-including layer.

Incidentally, when both of the first adhesive layer and the second adhesive layer include the reactivity imparting component, the adhesive layer including the curable component as a main component is the curable component-including layer. Including the curable component as a main component means that the proportion (% by mass), in the adhesive layer, of a composition besides the curable component does not exceed the % by mass of the curable component.

Specifically, when a curable resin is included as the curable component, if the curable resin is an acrylic resin, the curable component may include a radical polymerization initiator or a reducing agent, for example, besides the acrylic resin. On this occasion, the reactivity imparting component-including layer that comes as a pair may include, for example, a redox polymerization catalyst as the reactivity imparting component.

Also, when the curable resin is an epoxy resin, the curable component may include a curing agent such as a phenol compound, an amine compound, and a thiol compound generally compounded in an epoxy resin; a latent curing agent such as dicyandiamide, microcapsule type amines or an inclusion catalyst, and hydrazides; and a curing agent such as a cation catalyst type curing agent, besides the epoxy resin. On this occasion, the reactivity imparting component-including layer that comes as a pair may include, for example, a curing catalyst such as aliphatic dimethylurea and aromatic dimethylurea; imidazole; a phosphorous based catalyst; and polyamines, as the reactivity imparting component.

<First Compatible Polymer Component>

The curable component-including layer preferably further includes a first compatible polymer component that is compatible with at least the curable component. The reason therefor is as follows.

When using a two-component separate-coating type adhesive, two kinds of the liquid chemicals respectively coated are usually contacted with each other and cured immediately after the coating. However, since each liquid chemical has inferior film-forming property, when making of each liquid chemical into a sheet with a desired thickness and the separate storage thereof are intended, there is a problem that it is difficult to maintain the sheet form for a long term. In contrast, by including the compatible polymer component that is compatible with the component of each liquid chemical, the film-forming property may be improved so that it is possible to maintain the sheet form for a long term.

Also, in each adhesive layer formed by separately coating the two kinds of liquid chemicals, since the component of the liquid chemical functions as a plasticizer, by further adding the compatible polymer component to the adhesive layer including the component of each liquid chemical, the whole of the adhesive layer is plasticized and tackiness and softness due to the compatible polymer component are exhibited. Thus, tackiness before the curing and close attaching to an adherend may be improved, and the toughness of the adhesive layer after the curing may be improved and the adhesive force may be made higher.

Being compatible with a curable component here means that it has good affinity for the curable component, above all, the curable resin and that a phase split does not occur when it is mixed with the curable component at an arbitrary ratio. The first compatible polymer component being compatible with the curable component in the curable component-including layer may be confirmed by, for example, the high transparency of the curable component-including layer; the low haze value of the curable component-including layer; and non-existence of a micron sized island within the layer when the surface or the cross-section surface of the curable component-including layer is observed with a scanning electron microscope (SEM) or a transmission electron microscope (TEM). The above is similar also in the reactivity imparting component-including layer that will be described later.

Particularly, when any one curable resin of an epoxy resin, an acrylic resin and a polyol compound is included as the curable component, the effect due to the first compatible polymer component may be exhibited higher.

For example, when the curable resin included in the curable component is the acrylic resin, the crosslinking density tends to be high; however, by including the first compatible polymer component, the main chain of the acrylic resin may be made longer, that is, the crosslinking density may be made lower so that it is possible to impart softness to the curable component-including layer. The exhibition of the effect due to the first compatible polymer component when the curable resin included in the curable component is the epoxy resin will be explained in detail later.

Also, the first compatible polymer component is preferably further compatible with the reactivity imparting component included in the reactivity imparting component-including layer. Being compatible with a reactivity imparting component means that it has good affinity for the reactivity imparting component, and that a phase split does not occur when the curable component-including layer and the reactivity imparting component-including layer are brought into contact so that it is mixed with the reactivity imparting component at an arbitrary ratio.

The first compatible polymer component is not particularly limited as long as it includes a polymer having good compatibility with the curable component. The polymer may include a polar group. Examples of the polar group may include an epoxy group, a hydroxyl group, a carboxyl group, a nitrile group, and an amide group.

Above all, the first compatible polymer component is preferably a component including acrylic polymer, that is, a compatible acrylic polymer-including component.

The compatible acrylic polymer-including component may be a mixed component including two kinds or more of homopolymers in which the acrylic polymer is a homopolymer of an acrylic acid ester monomer; or may be a component including one or more copolymer in which the acrylic polymer is a copolymer including two kinds or more acrylic acid ester monomer. Also, the compatible acrylic polymer-including component may be a mixed component including the homopolymer and the copolymer. "Acrylic acid" in the acrylic acid ester monomer includes the concept of a methacrylic acid.

Specifically, the compatible acrylic polymer-including component may be a mixture of a polymer of methacrylate and a polymer of an acrylate; or may be an acrylic acid ester copolymer including methacrylate-acrylate-methacrylate. Above all, the compatible acrylic polymer-including component preferably includes a copolymer including two kinds or more acrylic acid ester monomer (acrylic acid ester copolymer).

Examples of the monomer component included in the acrylic acid ester copolymer may include the monomer components described in JP-A No. 2014-065889. The monomer component may include the above-described a polar group. The reason therefor is to improve compatibility with the epoxy resin so that the tack force and also the adhesive force after the curing may be made higher. Examples of the acrylic acid ester copolymer may include ethyl acrylate-butyl acrylate-acrylonitrile copolymer, ethyl acrylate-acrylonitrile copolymer, and butyl acrylate-acrylonitrile copolymer. Incidentally, "acrylic acid" in, for example, methyl acrylate and ethyl acrylate includes "methacrylic acid" such as methyl methacrylate and ethyl methacrylate.

Examples of the acrylic acid ester copolymer may preferably include a block copolymer, more preferably an acrylic triblock copolymer including methacrylate-acrylate-methacrylate. Examples of the methacrylate included in the acrylic triblock copolymer may include methyl methacrylate, ethyl methacrylate, propyl methacrylate, butyl methacrylate, lauryl methacrylate, 2-ethylhexyl methacrylate, cyclohexyl methacrylate, and benzyl methacrylate. Also, examples of the acrylate included in the triblock copolymer may include methyl acrylate, ethyl acrylate, propyl acrylate, butyl acrylate, lauryl acrylate, 2-ethylhexyl acrylate, cyclohexyl acrylate, and benzyl acrylate.

Specific examples of the triblock copolymer including methacrylate-acrylate-methacrylate may include an acrylic triblock copolymer including methyl methacrylate-butyl acrylate-methyl methacrylate (MMA-BA-MMA) (hereinafter, is described as MMA-BA-MMA binary copolymer in some cases). The binary copolymer of polymethyl methacrylate-polybutyl acrylate-polymethyl methacrylate (PMMA-BA-MMA) is included in the MMA-BA-MMA binary copolymer.

For such acrylic block copolymer, the film-forming property may be improved, and it may exhibit sufficient adhesiveness to an adherend.

The acrylic block copolymer may not include a polar group, or may be a modified material in which the above-described polar group is introduced to a part of the block. For the modified material, since the compatibility with the epoxy resin is further improved, the adhesion (tack) strength is further improved.

Above all, the first compatible polymer component is preferably a MMA-BA-MMA binary copolymer or a modified material thereof. The MMA-BA-MMA binary copolymer includes a methacrylic acid ester polymer block (MMA) that is a "hard" segment and an acrylic acid butyl polymer block (BA) that is a "soft" segment. By adding such triblock copolymer, the curable component-including layer may suppress rise up or peeling off from the adherend effectively, and the toughness after the curing is improved so that the adhesive force may be improved.

The exhibition of the effects may be presumed as follows. In the conventional adhesive, an acrylic resin is added besides the main agent resin such as an epoxy resin, in order to impart the toughness (softness); however, the heat stability of the adhesive itself is deteriorated by the addition of the acrylic resin. In contrast, by using the acrylic resin including the both of the "hard" segment and the "soft" segment, such as MMA-BA-MMA binary copolymer, it is believed that the curable component-including layer capable of having the toughness and maintaining excellent adhesiveness (tackiness) may be achieved, since the "hard" segment part contributes to the heat stability and the "soft" segment part contributes to the toughness or the softness.

For example, the MMA-BA-MMA binary copolymer is added, as the first compatible polymer component to the curable resin composition including a resin likely to be incompatible with the BA block part such as an epoxy resin and an acrylic resin having high polarity. On this occasion, self-assembling, in which the first compatible polymer component is the matrix, occurs by lowering the compatibility with the resin by lowering the polarity of the MMA-BA-MMA binary copolymer. As the result, a sea-island structure, in which the resin is the island, and the first compatible polymer component is the sea, occurs. It is thought that the curable component-including layer is capable of maintaining the excellent adhesiveness (tackiness) by including such sea-island structure.

Also, by using the modified material, in which a functional group is introduced to a part of the BA block or the MMA block of the MMA-BA-MMA binary copolymer, as the first compatible polymer component, the adhesiveness (tackiness) is improved since the heat stability of the curable component-including layer is further improved as well as the compatibility with the curable component is improved. For example, when a modified material of the MMA-BA-MMA binary copolymer is added, as the first compatible polymer component, to the curable resin composition including a resin likely to be incompatible with the BA block part such as an epoxy resin and an acrylic resin having high polarity, the self-assembling, in which the resin is the matrix, occurs since the MMA block part is compatible with the resin and the BA block part is not compatible with the resin. As the result, within the curable component-including layer, the sea-island structure, in which the resin is the sea, and the first compatible polymer component is the island, occurs.

Since the compatibility of the modified material of the MMA-BA-MMA binary copolymer and the resin is improved, the island part becomes smaller so that the state appears as if the both are compatible with each other. By the exhibition of such sea-island structure or apparent compatible state, the curable component-including layer may be avoided from an interfacial fracture so that excellent adhesiveness (tackiness) may be maintained.

The mass-average molecular weight of the first compatible polymer may be appropriately set according to the tackiness and the cohesive force required to the curable component-including layer, and it is preferably more than the mass-average molecular weight of the curable component. The reason is because the curable component is required to function as a plastisizing component, leaving the film-forming property to the first compatible polymer. Also, the reason is because the first compatible polymer is desirably compatible with the reactivity imparting component included in another adhesive layer.

Specifically, the mass-average molecular weight of the first compatible polymer component is preferably in a range of 10000 to 900000, above all, preferably in a range of 30000 to 500000. When the mass-average molecular weight of the first compatible polymer component is too small, three-dimensional crosslinking will be dominant so that the toughness is lowered in some cases. Meanwhile, when it is too large, the strength is lowered since the compatibility is deteriorated.

The mass-average molecular weight of the first compatible polymer may be measured by GPC (eluting solution: THF, standard substance: PS, sample: 20 µl, fluid flow: 1 ml/min, column temperature: 40° C.)

The content of the first compatible polymer component in the curable component-including layer may be appropriately adjusted according to the kind of the first compatible polymer component, the tackiness, cohesion, and viscosity required to the curable component-including layer. For example, when the curable resin such as an acrylic resin and an epoxy resin is included as the curable component, and the MMA-BA-MMA binary copolymer is included as the first compatible polymer component, the content of the MMA-BA-MMA binary copolymer to 100 parts by mass of the curable resin is preferably in a range of 4 parts by mass to 100 parts by mass.

When the both are compounded in this ratio, the sea-island structure, in which the MMA-BA-MMA binary copolymer of nano-order level fine particle (island) is dispersed in the epoxy resin (sea), occurs in the curable component-including layer at the stage before the contact curing, so that the apparent compatible state occurs. Then, by being in contact with the reactivity imparting component-including layer, the curable component-including layer is capable of exhibiting excellent adhesive strength by being cured while maintaining the apparent compatible state. Also, since the curable component-including layer has the sea-island structure, intrusion of water from the interface with the adherend may be suppressed, and further, excellent adhesion-holding property may be exhibited.

<Other Components>

Besides the above, the curable component-including layer may include an arbitrarily component such as an inorganic particle such as silica; a flame retardant; a thickening agent; a heat dissipating agent; an insulating agent; a conductive agent; a fiber for improving the strength (particularly, chopped fiber, for example); a tackiness imparting agent such as a silicone resin.

The curable component-including layer may include a coloring agent. By coloring the curable component-including layer by adding the coloring agent, distinguishing from the adhesive sheet including the reactivity imparting component-including layer is made easier so that mistaking work upon the construction may be prevented. Examples of the coloring agent may include a pigment such as a carbon black; and a dye. Above all, the pigment is preferable. By including the pigment as the coloring agent, the ultraviolet ray deterioration of the member may be prevented by making the pigment absorb the ultraviolet ray.

<Curable Component-Including Layer>

The curable component-including layer may be transparent or may be opaque; however, is preferably transparent. The reason therfor is to be capable of exhibiting the desired functions such as the tackiness since the component included in the curable component-including layer is sufficiently compatible.

The thickness of the curable component-including layer may be appropriately set according to the kind of the adherend, and preferably be capable of including the amount of the curable component required for the curing reaction by being in contact with the reactivity imparting component-including layer that will be described later.

The thickness of the curable component-including layer is preferably more than the thickness of the reactivity imparting component-including layer. This is because the curable component-including layer is able to exhibit stronger tackiness as the thickness is more, so that the tack force may be more that the reactivity imparting component-including layer. Also, although the reactivity imparting component is capable of functioning as a catalyst even in a small amount, when the amount of the curable component is small, that is, when the thickness is small, sufficient amount of the curable component may not be spread into the reactivity imparting component-including layer, and may cause insufficient curing, since the reactivity imparting component itself is not cured.

The thickness of the curable component-including layer is not particularly limited as long as it is able to exhibit the function, and for example, may be 2 µm or more, preferably 5 µm or more, and more preferably 20 µm or more. Also, the thickness may be 200 µm or less, preferably 150 µm or less, and more preferably 100 µm or less. Specifically, the thickness is preferably in a range of 2 µm or more to 200 µm or less, more preferably in a range of 5 µm or more to 150 µm or less, and further preferably in a range of 20 µm or more to 100 µm or less.

Also, when the adherend surface of an adherend (construction material) is a rough surface, the thickness of the curable component-including layer is preferably larger; specifically, the thickness is preferably equal to or more than the height difference of the concavo-convex of the adherend surface. When the curable component-including layer does not have the thickness equal to or more than the height difference of the concavo-convex of the adherend surface, the curable component-including layer cannot follow the concavo-convex, and the adherend (construction material) cannot be held for the desired term, since the adhesive area between the curable component-including layer and the adherend surface is small.

<<Reactivity Imparting Component-Including Layer>>

The reactivity imparting component-including layer is a layer including the reactivity imparting component. The reactivity imparting component usually has a composition different from that of the curable component included in the curable component-including layer.

<Reactivity Imparting Component>

For the reactivity imparting component included in the reactivity imparting component-including layer, a material capable of directly reacting with the curable component included in the curable component-including layer, or a material capable of inducing or promoting the curing reaction of the curable component included in the curable component-including layer may be used, and may be appropriately selected according to the kind of the curable component. Examples of the reactivity imparting component may include a curing agent, an acid or an alkaline component, curing promoting agent, an acid-generating agent, a base-generating agent, a catalyst, and a water absorbing agent.

The reactivity imparting component included in the reactivity imparting component-including layer may be one kind, or may be two kinds or more.

Examples of the reactivity imparting component when the curable component includes the epoxy resin may include the curing agent. Specific example of the curing agent may include an imidazole compound, a phenol compound, an amine compound, a polyamide compound, an acid anhydride, an isocyanate compound, and a thiol compound.

Above all, the curing agent is preferably the imidazole compound. The imidazole compound has good reactivity with the epoxy resin at room temperature, also, the glass-transition temperature (Tg) after the curing is high, is excellent in heat stability and durability, and also, there are many compound having small molecular weight. Accordingly, when the first adhesive layer and the second adhesive layer are brought into contact, it is easily penetrated into another adhesive layer including the epoxy resin so that the curing reaction by being in contact is easily caused.

Also, examples of the reactivity imparting component when the curable component includes the acrylic resin may include a catalyst and an initiator. Specific example thereof may include a redox polymerization catalyst disclosed in JP-A No. 2008-81691, and radical polymerization initiators such as a peroxide and an azo compound disclosed in JP-A No. 2008-308531.

Examples of the reactivity imparting component when the curable component includes the polyol compound may include a curing agent. Specific example thereof may include a polyisocyanate compound; above all, preferably an aromatic polyisocyanate such as MDI, crude MDI, and TDI, since it is excellent in reactivity with the polyol compound.

Also, examples of the reactivity imparting component when the curable component includes the silicone resin may include a platinum catalyst.

Examples of the reactivity imparting component when the curable component includes a melamine resin or a phenol resin mixture may include an acid or a base component such as a hydrogel-containing sulfuric acid aqueous solution and a hydrogel-containing sodium hydroxide.

Examples of the reactivity imparting component when the curable component includes a silyl compound or a curable inorganic material may include a solid-state liquid diffused choroid. Specific example thereof may include a hydrogel, a water absorbing polymer, and a gelatin. The curable component may be cured by the water included therein.

The content of the reactivity imparting component is preferably an amount that is capable of sufficiently reacting with the curable component when the first adhesive layer and the second adhesive layer are brought into contact, and may be appropriately set according to the combination and kind of the curable component and the reactivity imparting component. For example, when the curable component-including layer includes the epoxy resin, and the reactivity imparting component-including layer includes the imidazole compound as the curing agent, the content of the imidazole compound in the reactivity imparting component-including layer to 100 parts by weight of the epoxy resin is, for example, preferably in a range of 0.1 parts by weight to 30 parts by weight, and more preferably in a range of 1 parts by weight to 20 parts by weight, although it depends on the epoxy equivalent of the epoxy resin. When the content of the imidazole compound in the reactivity imparting component-including layer is too much, the close attaching to the adherend (construction material) is weakened in some cases, meanwhile, when the content is too little, it may cause insufficient curing in some cases.

Incidentally, when the curable resin included in the curable component-including layer is a material other than the epoxy resin, there is no significant problem in relation to the content of the reactivity imparting component as long as it is not deviated greatly from the general distribution of two-component curing when a general two-component curing type adhesive is used.

<Second Compatible Polymer Component>

The reactivity imparting component-including layer preferably further includes the second compatible polymer component that is compatible with at least the reactivity imparting component. Also, the second compatible polymer component is preferably compatible further with the curable component included in the curable component-including layer.

Since the reason therefor and specific examples of the second compatible polymer component are similar to those of the first compatible polymer component explained in the section of curable component-including layer described above, the explanation is omitted herein.

When the curable component-including layer includes any one curable resin of the epoxy resin, the acrylic resin and the polyol compound as the curable component, the effect due to the second compatible polymer component may be exhibited higher.

The content of the second compatible polymer component in the reactivity imparting component-including layer may be appropriately adjusted according to the adhesiveness and viscosity required to the reactivity imparting component-including layer, and the kind of the second compatible polymer component, and for example, is preferably in a range of 10 parts by weight to 200 parts by weight, above all preferably in a range of 20 parts by weight to 100 parts by weight, to 100 parts by weight of the reactivity imparting component in the reactivity imparting component-including layer. Although the preferable amount varies with, for example, the molecular weight of the second compatible polymer component, it is preferably in the above-described range generally. When the content of the second compatible polymer component is too little, the film-forming property and the adhesiveness of the reactivity imparting component-including layer may be insufficient in some cases, meanwhile, when the content is too much, the strength deterioration of the reactivity imparting component-including layer may be caused in some cases.

The mass-average molecular weight of the second compatible polymer component is preferably more than the mass-average molecular weight of the reactivity imparting component. Since the reason therefor, specific range of the mass-average molecular weight and method for measuring thereof are similar to the first compatible polymer described above, the explanation is omitted herein.

The second compatible polymer component included in the reactivity imparting component-including layer and the first compatible polymer component included in the curable component-including layer may be the same component, or may be different components; however, preferably the same component.

Above all, the first compatible polymer component and the second compatible polymer component are preferably the same component including an acrylic polymer. This is because, since the same component is most easily phase diffused, it is advantageous from the view point of the reaction speed.

On this occasion, the acrylic polymer is preferably an acrylic acid ester copolymer, more preferably an acrylic triblock copolymer or modified material thereof, and particularly preferably the MMA-BA-MMA triblock copolymer or modified material thereof. The reason therefor is similar to the reason explained in the section of curable component-including layer described above.

<Other Components>

The reactivity imparting component-including layer may include an arbitrarily material explained in the section of curable component-including layer described above. Also, the reactivity imparting component-including layer may include a coloring agent. The reason therefor is similar to the reason explained in the section of curable component-including layer described above. As described later, since the adhesive layers are combined and used so that the magnitude of the tack force of each adhesive layer differ from each other, the coloring agent included in the reactivity imparting component-including layer preferably has different color from the coloring agent included in the curable component-including layer. That is, the first adhesive layer and the second adhesive layer are preferably in different colors from each other.

<Reactivity Imparting Component-Including Layer>

The reactivity imparting component-including layer may be transparent, or may be opaque; however, preferably transparent. The reason therefor is to be capable of exhibiting the desired functions such as the tackiness since the component included in the reactivity imparting component-including layer is sufficiently compatible.

The thickness of the reactivity imparting component-including layer may be appropriately set according to the kind of the adherend (construction material), and preferably a thickness capable of including the amount of the reactivity imparting component required to cause the curing reaction by being in contact with the curable component-including layer.

Although the tack force may be stronger when the thickness of the reactivity imparting component-including layer is larger, the thickness is preferably small from the viewpoint of increasing the reactivity of the contact curing with the curable component-including layer. The reason therefor is to make the migration of the reactivity imparting component into the curable component-including layer easier when brought into contact with the curable component-including layer so that the curing reaction is easily promoted and the reactivity is improved.

Since the reactivity imparting component is capable of exhibiting the function to the curable component even when the content of the reactivity imparting component is small as described above, the thickness of the reactivity imparting component-including layer may be made less than the curable component-including layer, and the tack force may be weakened. The thickness of the reactivity imparting component-including layer is not particularly limited as long as it is able to exhibit the function, and for example, may be 2 μm or more, preferably 5 μm or more, and more preferably 10 μm or more. Also, the thickness may be 200 μm or less, preferably 150 μm or less, and more preferably 100 μm or less. Specifically, the thickness is preferably in a range of 2 μm or more to 200 μm or less, further preferably in arrange of 5 μm or more to 150 μm or less, and more preferably 10 μm or more to 100 μm or less.

Also, when the adherend surface is a rough surface, the thickness of the reactivity imparting component-including layer is preferably larger; specifically, the thickness is preferably equal to or more than the height difference of the concavo-convex of the adherend surface. The reason therefor is similar to the explanation of the reactivity imparting component-including layer described above.

<<Others>>

Among the first adhesive layer and the second adhesive layer, the curable component is usually included in one adhesive layer; however, the curable component may be included also in another adhesive layer. Such examples may include a case in which the first adhesive layer is the curable component-including layer, and the first adhesive layer includes an acrylic monomer that is the curable resin and a polymerization initiator as the curable component; and the second adhesive layer is the reactivity imparting component-including layer, and the second adhesive layer includes a reducing agent as the reactivity imparting component, and further includes an acrylic monomer that is the curable resin as the curable component. In this case, by the first adhesive layer and the second adhesive layer being in contact, the curing reaction is promoted due to the occurrence of radical by the reducing agent and the polymerization initiator being reacted. On this occasion, the curable resin included in the first adhesive layer and the second adhesive layer may be the same, or may be different. When both of the first adhesive layer and the second adhesive layer include the curable component, the adhesive layer including the reactivity imparting component as the main component is the reactivity imparting component-including layer.

One of the first adhesive layer and the second adhesive layer may include a curable component, and another may include a reactivity imparting component, the adhesive layer including the curable component may further include a first compatible polymer component that is compatible with at least the curable component, and the adhesive layer including the reactivity imparting component may further include a second compatible polymer component that is compatible with at least the reactivity imparting component.

Above all, a combination that the curable component includes the epoxy resin and the reactivity imparting component includes the imidazole compound, is preferable, and more preferably, the first compatible polymer component and the second compatible polymer component are the same component including the acrylic polymer. Since the reason therefor has been explained in each section of curable component-including layer and reactivity imparting component-including layer described above, the explanation is omitted herein.

<<Property>>

Before the contacting, the first adhesive layer and the second adhesive layer may have the tackiness respectively. The tack force of the first adhesive layer and the second adhesive layer before the contacting (before the curing) may be appropriately set according to the kind of each adhesive layer, the kind of the adherend (product), and placed aspect. The tack force of the adhesive layer to the adherend is preferably in a range of at least 0.05 N/in or more to 50 N/in or less, above all, preferably in a range of 0.1 N/in or more to 40 N/in or less.

Also, one of the first adhesive layer and the second adhesive layer may be the curable component-including layer and another may be the reactivity imparting component-including layer, and the curable component-including layer and the reactivity imparting component-including layer may have the desired tack force respectively.

The tack force of the curable component-including layer is preferably 0.05 N/in or more, above all, 0.1 N/in or more, and particularly 0.5 N/in or more. Also, the tack force is preferably 50 N/in or less, above all, 40 N/in or less, and particularly 30 N/in or less.

Meanwhile, the tack force of the reactivity imparting component-including layer is preferably 0.05 N/in or more, above all, 0.1 N/in or more, and particularly 0.2 N/in or more, also, the tack force is preferably 30 N/in or less, above all, 20 N/in or less, and particularly 10 N/in or less.

The adhesive layer may further be classified into strong tackiness, medium tackiness, and weak tackiness according to the magnitude of the tack force. Specifically, the tack force that is in a range of 5 N/in or more to 50 N/in or less may be classified as the strong tackiness, in a range of 1 N/in or more to less than 5 N/in may be classified as the medium tackiness, and in a range of 0.05 N/in or more to less than 1 N/in may be classified as the weak tackiness. The medium tackiness may be included in the strong tackiness or the weak tackiness according to the use application and the property.

The adhesive layer may be improved in the reactivity by having the strong tackiness, meanwhile, the handling property (workability) and reworkability of the adhesive layer may be improved by having the weak tackiness. Also, by the adhesive layer having the medium tackiness, both of the reactivity and the workability/reworkability may be balanced. The first adhesive layer and the second adhesive layer are capable of exhibiting the desired function by the combination of these tackinesses.

Also, the cohesive force of the adhesive layer is low and the layer has softness when the tack force is stronger, whereas the cohesive force thereof is high and the layer is hard when the tack force is weaker.

The tackiness of the adhesive layer may be adjusted by adjusting, for example, thickness and composition thereof.

The tack force of the first adhesive layer and the second adhesive layer is preferably exhibited at least as soon as they are attached to the adherend, and maintained until the curing reaction by the first adhesive layer and the second adhesive layer being in contact is completed, above all, preferably maintained for about one year.

The tack force to the adherend may be measured by the following method. Incidentally, for the adhesive sheet, in which the separator is not provided on both surface sides, a separator that is a releasing film (such as PET separator PET28×IJO, manufactured by Nippa Co., Ltd.) is attached before the measuring. First, the adhesive sheet provided with the separators on both surfaces of the adhesive layer is cut to the size of 25.4 mm lengthwise, 150 mm widthwise, one separator is peeled off, and a PET film (A4100, manufactured by Toyobo Co., Ltd.) is attached on the exposed adhesive layer with a roller by hand. After that, the other separator is peeled off, and a SUS plate (304BA, adherend surface: ground surface, sample: 25.4 mm lengthwise, 150 mm widthwise) is attached on the exposed adhesive layer with a roller by hand. After that, about 20 mm of the adhesive layer provided with the PET film is peeled off by hand from the SUS plate, the tack force (N/in) to the SUS plate surface may be measured with a tensile testing machine (model number: RTF-1150H, manufactured by A and D Co., Ltd.) under the conditions (tensile speed: 300 mm/min, peeling distance: 150 mm, peeling angle: 180°) compliant with JIS 20237:2009 (Testing methods of pressure-sensitive adhesive tapes and sheets) and Method 1 of Testing Method for Tack Force (temperature: 23° C., humidity: 50%, testing method in which the tape and the sheet are peeled off at 180° to the stainless testing plate). Incidentally, 1 inch is 25.4 mm.

Incidentally, the after described tack force may be measured by this method.

Also, the holding property to the adherend in the above-described case may be measured by the following method. Incidentally, for the adhesive sheet, in which a separator is not provided on both surface sides, a separator that is a releasing film (such as PET separator PET28×IJO, manufactured by Nippa Co., Ltd.) is attached before the measuring. First, the adhesive sheet provided with the separators on both surfaces of the adhesive layer is cut to the size of 12.5 mm lengthwise by 25 mm widthwise, one separator is peeled off, and the tip part of an iron plate (hot-dip galvanized steel plate, 100 mm lengthwise×25 mm widthwise×1.5 mm thickness) that is one adherend is attached on the exposed adhesive layer. The adhesive layer is attached so that 12.5 mm from the end in the length direction and the whole in the width direction of the adherend is covered. Next, the other separator is peeled off from the adhesive sheet attached to the iron plate, and the tip part of the iron plate (hot-dip galvanized steel plate, 100 mm lengthwise×25 mm widthwise×1.5 mm thickness) that is the other adherend is attached on the exposed adhesive layer. The adhesive layer is attached so that 12.5 mm from the end in the length direction and the whole in the width direction of the iron plate is covered. Then, a specimen is obtained by attaching the adhesive layer of one adherend to which the adhesive layer is attached and the adhesive layer of the other adherend to which the adhesive layer is attached so that the adhesive layers are overlapped facing to each other, and that the ends of the respective adherend, of the side that the adhesive layer is not attached, are facing opposite so as not to overlap. Next, the upper side of one adherend of the specimen is temporarily fixed with a holding force testing machine, and is confirmed whether it may be held without sliding or not, under the environment of 23° C. and 50% RH by applying 200 g load to the lower side of the other adherend of the specimen. The time able to hold without sliding may be the time that the adhesive layer is able to exhibit the holding property. The holding force testing machine such as BE-501, manufactured by Tester Sangyo Co., Ltd., for example, may be used.

Here, "at least" refers to a range of the tack force capable of maintaining the attached state upon attaching of the adhesive layer to the adherend, if the minimum range of the tack force is exhibited. And, while the adhesive layer exhibits the tack force of this range, the adherend may be preferably attached to the adhesive layer.

The tackiness and the holding property of the first adhesive layer and the second adhesive layer to the adherend may be set in further detail according to the kind of the adherend and the direction of the adherend surface. For example, when the adhesive surface (adherend surface) of the first construction material and the second construction material and the adhesive layer, upon attaching the construction materials to each other in the attaching step, is a vertical surface or a normal line surface, specifically, when the first construction material and the second construction material are the wall of a construction structure and a wall covering material to be attached to the wall, the tackiness and the holding property of the adhesive layer to the construction material is preferably high, although it depends on the weight of the construction material. The reason therefor is to maintain the attached state until the curing reaction by the first adhesive layer and the second adhesive layer being in contact is completed, even though a heavy construction material such as a tile or a panel is used as the wall covering material. Also, the reason therefor is to prevent falling of the construction material attached to the adhesive layer by its own weight due to a shear stress applied in the vertical direction or the normal line direction.

When the adhesive surface (adherend surface) of the adherend and the adhesive layer is a vertical surface or a normal line surface, the tack force of the adhesive layer to the adherend (construction material) may be appropriately adjusted according to the weight of the adherend (construction material), in the above-described range of the tack force to the adherend. Above all, it is preferably in a range of 0.05 N/in or more to 50 N/in or less, and particularly preferably in a range of 0.1 N/in or more to 40 N/in or less. Also, the tack force is preferably exhibited at least as soon as attached to the adherend (construction material), and maintained until the curing reaction by the first adhesive layer and the second adhesive layer being in contact is completed, above all, preferably maintained for about one year.

Also, in the above-described case, the adhesive layer further preferably exhibit the holding force for one day or more in a state that at least 200 g of load is applied in the above-described testing method of the holding property, and the tack force to the adherend (construction material) at that time is preferably 5 N/in or more.

Usually, although the required time for the curing by the first adhesive layer and the second adhesive layer being in contact depends on the composition, since it is generally about one day, it is preferable that the holding property is able to be exhibited, in a state that a predetermined load is applied, for at least one day or more required for the curing, and that a desired tack force to the adherend (construction material) is exhibited.

Meanwhile, when the adhesive surface (adherend surface) of the adherend (first construction material and the second construction material) and the adhesive layer is a horizontal surface, specifically, when the first construction material and the second construction material are the floor of a construction structure and a decorative floor material to be attached to the floor, the adhesive layer preferably exhibits the tack force and the holding property capable of temporarily fixing the construction materials to each other while curing.

When the adhesive surface (adherend surface) of the adherend and the adhesive layer is a horizontal surface, the tack force of the adhesive layer to the adherend (construction material) may be appropriately adjusted according to the kind of the construction material, in the above-described range of the tack force to the adherend; above all, it is preferably in a range of 0.05 N/in or more to 20 N/in or less, and particularly preferably in a range of 0.1 N/in or more to 20 N/in or less.

Also, the tack force is preferably exhibited at least as soon as attached to the adherend (construction material), and maintained until the curing reaction by the first adhesive layer and the second adhesive layer being in contact is completed, above all, preferably maintained for about one year.

The first adhesive layer and the second adhesive layer preferably exhibit the desired tackiness to the other adhesive layer, according to the direction of the adhesive surface of the adhesive layers. For example, when the adhesive surface between the adhesive layers is a vertical surface or a normal line surface, the tackiness and the holding property between the first adhesive layer and the second adhesive layer are preferably high. Also, when the adhesive surface between the adhesive layers is a horizontal surface, the tackiness and the holding property between the first adhesive layer and the second adhesive layer are not particularly limited.

Specific tack force and holding property between the first adhesive layer and the second adhesive layer and the effects thereof when the adhesive surface between the adhesive layers is a vertical surface or a normal line surface, and when it is a horizontal surface may be similar to the above-described explanation about the value of the tack force and the holding property of the adhesive layer to the adherend (construction material) and the effects thereof.

The tack force between the first adhesive layer and the second adhesive layer may be measured by the following method. First, the adhesive sheet provided with the first separators on the both surfaces of the first adhesive layer and a PET film (A4100, manufactured by Toyobo Co., Ltd.) are attached similarly to the above-described method carried out when measuring the tack force of the curable component-including layer. Next, the adhesive sheet provided with the second separators on both surfaces of the second adhesive layer is also cut to the similar size, and a SUS plate (304BA, adherend surface: ground surface, sample: 25.4 mm lengthwise, 150 mm widthwise) is attached on the second adhesive layer, exposed by peeling one of the second separators, with a roller by hand. After that, the first separator on the first adhesive layer and the second separator on the second adhesive layer are peeled off respectively, the exposed adhesive layers are attached to each other with a roller by hand, and then, about 20 mm of the first adhesive layer on the PET film is peeled off by hand at the adhesive surface to the second adhesive layer, and the tack force to the second adhesive layer may be measured with a tensile testing machine. The conditions of the tensile test may be similar to the above-described measuring conditions of the tack force to the member.

By at least one of the first adhesive layer and the second adhesive layer exhibiting low viscosity or high viscosity, if the curing is not yet completed, parallel movement with respect to the adherend surface is possible as is attached so that the attached position may be adjusted. By taking advantage of such property, for example, another adhesive sheet-containing member may be slid in horizontal direction to another surface of the adhesive layer of one adhesive sheet-containing member and attached in the attaching step.

The magnitude of the viscosity of the first adhesive layer and the second adhesive layer may be classified according to the value of loss tangent thereof. At least one of the first adhesive layer and the second adhesive layer exhibiting the low viscosity means that the loss tangent at 23° C. (hereinafter, may be referred to as "tan δ (23° C.)") of at least one of the first adhesive layer and the second adhesive layer is 0.2 or less, and more preferably 0.1 or less. Also, at least one of the first adhesive layer and the second adhesive layer exhibiting the high viscosity means that tan δ (23° C.) of at least one of the first adhesive layer and the second adhesive layer is 0.5 or more, and more preferably 1.0 or more.

Tan δ reflects the viscosity of the adhesive layer, and is one of the parameter that exhibits a stress relaxation behavior (a delay of deformation when a force is applied). The small value of tan δ shows that the restoration of the deformation of the adhesive layer tends to occur fast, and the large value shows that the restoration of the deformation tends to occur slowly.

Tan δ may be calculated from, for example, storage elastic modulus' and loss elastic modulus" measured by a dynamic viscoelasticity measuring method (attachment mode: compression mode, frequency: 1 Hz, temperature: −50° C. to 150° C., rising temperature: 5° C./min) compliant with JIS K7244-1:1998 (Plastics—Testing Method for a Dynamic Mechanical Property-Part 1: General Rules) using a solid viscoelasticity analyzer RSA-III manufactured by TA Instruments as a measuring equipment (tan δ=E"/E').

The viscosity of the first adhesive layer and the second adhesive layer may be appropriately adjusted according to the composition of the components included in each layer and the compounded ratio, for example.

<<Combination of Tack Force of First Adhesive Layer and Second Adhesive Layer>>

The tack force of each of the first adhesive layer and the second adhesive layer may be appropriately selected and combined according to the function required between the two adhesive layers such as workability, reactivity, reworkability, and holding property, and to the use application of the product after the adhesion.

Hereinafter, the combination of the tack force of the first adhesive layer and the second adhesive layer will be explained for each required function.

<Combination Having Good Workability>

When the first adhesive layer and the second adhesive layer are attached to each other, the combination of the tack force is preferably such that the workability, such as the adhesive layer does not easily stick to a worker's hand, is good.

Such combination may be a combination in which the tack force of the first adhesive layer and the tack force of the second adhesive layer are in a range of 0.05 N/in or more to less than 1 N/in, respectively. That is, for the first adhesive layer and the second adhesive layer, one may be the curable component-including layer having the weak tackiness, and another may be the reactivity imparting component-including layer having the weak tackiness.

By each of the first adhesive layer and the second adhesive layer having the weak tackiness, the adhesive layer does not easily stick to a hand upon attaching so that the attaching procedure may be carried out easily and the workability may be improved.

<Combination Having Good Reworkability>

The combination of the tack force of the first adhesive layer and the second adhesive layer is preferably such that at least one has a good reworkability.

Such combination may be a combination in which, among the first adhesive layer and the second adhesive layer, a tack force of one adhesive layer is more than a tack force of another adhesive layer. Since the adhesive layer having strong tack force is soft, and the adhesive layer having weak tack force is hard, by combining the adhesive layers having different softness, the first adhesive layer and the second adhesive layer may be peeled off at the adhesive surface and reattached even if they have been once attached, as long as the curing reaction is not yet completed, so that the reworkability may be improved.

For the combination in which, among the first adhesive layer and the second adhesive layer, a tack force of one adhesive layer is more than a tack force of another adhesive layer, the tack force of the one adhesive layer is preferably in a range of 5 N/in or more to 50 N/in or less, and the tack force of the another adhesive layer is preferably in a range of 0.05 N/in or more to less than 5 N/in. That is, one preferably has the strong tackiness, and another preferably has the medium tackiness or the weak tackiness.

Above all, the tack force of one is preferably in a range of 5 N/in or more to 15 N/in or less, and the tack force of another is preferably in a range of 0.1 N/in or more to 3 N/in or less.

Also, in the above-described combination, the first adhesive layer and the second adhesive layer preferably further have a predetermined tack force or more, respectively. The reason therefor is to sufficiently attach each adhesive layer to the adherend, also, to easily peel off at the adhesive surface of the first adhesive layer and the second adhesive layer upon reattaching, and a peel off at the adhesive surface of the adherend (product) and the adhesive layer does not easily occur.

When the first adhesive layer and the second adhesive layer have the predetermined tack force or more respectively, specifically, the tack force is preferably 0.5 N/in or more, above all, preferably 1 N/in or more.

When one of the first adhesive layer and the second adhesive layer includes a curable component, and another includes a reactivity imparting component, the combination having good reworkability is preferably a combination in which one of the first adhesive layer and the second adhesive layer includes a curable component, and another includes a reactivity imparting component, and the tack force of the adhesive layer including the curable component is more than the tack force of the adhesive layer including the reactivity imparting component. On this occasion, the adhesive layer including the curable component preferably has the strong tackiness. Further, it is preferable that the adhesive layer including the curable component has the strong tackiness and the adhesive layer including the reactivity imparting component has the medium tackiness or the weak tackiness, particularly preferable that the adhesive layer including the reactivity imparting component has the medium tackiness or the weak tackiness, also, has the above-described predetermined tack force or more.

[Reworkability]

To have a good reworkability, when the first adhesive layer and the second adhesive layer are attached under their own weight, maintained for 10 seconds, and then, peeled off, a proportion of an area of the first adhesive layer transferred to the second adhesive layer side after the peeling, with respect to an adhesive area of the first adhesive layer before the peeling (hereinafter, is regarded as adhesive layer transferred ratio) is preferably 50% or less, above all, preferably 40% or less, and particularly 30% or less. If the adhesive layer transferred ratio is in the above-described range, the first adhesive layer is capable of exhibiting the desired function, when the first adhesive layer and the second adhesive layer are peeled off, and then, attached again.

The reworkability may be measured by the following method. First, the curable component-including layer is used as the first adhesive layer, and the first adhesive sheet (size: 25 mm×100 mm) provided with the separators on both surfaces of the first adhesive layer is prepared; and the first specimen is obtained by attaching the surface of the first adhesive layer exposed by peeling one separator of the first adhesive sheet, to one surface of a SUS304 (BA treated) plate (size: 25 mm×100 mm). Similarly, the reactivity imparting component-including layer is used as the second adhesive layer, and the second adhesive sheet (size: 25 mm×100 mm) provided with the separators on both surfaces of the second adhesive layer is prepared; and the second specimen is obtained by attaching the surface of the second adhesive layer exposed by peeling off one separator of the second adhesive sheet, to one surface of other SUS304 (BA treated) plate (size: 25 mm×100 mm).

Next, the first specimen is left to stand on a horizontal surface so that the first adhesive sheet faces upward, and the surface of the first adhesive layer is exposed by peeling off another separator of the first adhesive sheet. Also, the surface of the second adhesive layer of the second specimen is exposed by peeling off another separator of the second adhesive sheet, the exposed surface of the first adhesive layer and the exposed surface of the second adhesive layer are stacked crosswise, directly stacked and attached under their own weight only so that the adhesive area is 25 mm×25 mm. After maintaining for 10 seconds, the second specimen is peeled off, and the proportion of the area of the first adhesive layer transferred to the second adhesive layer side after the peeling, with respect to 100% of the adhesive area (that is, the contacting area to the second adhesive layer) of the first adhesive layer before the peeling, is calculated.

<Combination Having Good Reactivity>

The combination of the tack force of the first adhesive layer and the second adhesive layer is preferably such that the reactivity, of the curing reaction caused by the both being in contact, is high. This is because the adhesive force, of the cured adhesive layer formed by the contact curing of the first adhesive layer and the second adhesive layer, may be strong and the members may be adhered strongly via the cured adhesive layer. Hereinafter, such combination will be explained.

[Combination 1]

The combination of the tack force having good reactivity may be a combination in which, among the first adhesive layer and the second adhesive layer, a tack force of one adhesive layer is more than a tack force of another adhesive layer. Since the adhesive layer having strong tack force is a layer having softness, and the adhesive layer having weak tack force is a hard layer, the adhesive layer having strong tack force is easily closely attached to the adhesive layer having weak tack force so that the component included in the adhesive layer having weak tack force is easily transferred to the adhesive layer having strong tack force, and the reaction due to the contact curing is easily promoted. Also, as described above, the combination is preferable from the viewpoint of improving the reworkability.

Here, specifically, when the tack force of one being more than the tack force of another, the tack force of one and the tack force of another is preferably such that the tack force of the one adhesive layer is in a range of 5 N/in or more to 50 N/in or less, and the tack force of the another adhesive layer is in a range of 0.05 N/in or more to less than 5 N/in. That is, among the first adhesive layer and the second adhesive layer, it is preferable that one has the strong tackiness, and another has the medium tackiness or the weak tackiness. Since the adhesive layer having the strong tackiness has softness reattaching is possible as long as the curing reaction is not yet completed so that the reworkability may be improved in addition to the reactivity. Above all, it is preferable that a tack force of one is in a range of 5 N/in or more to 15 N/in or less, and a tack force of another is in a range of 0.1 N/in or more to 3 N/in or less.

[Combination 2]

Other combination of the tack force having good reactivity may be a combination in which one of the first adhesive layer and the second adhesive layer includes the curable component, and another includes the reactivity imparting component, and a tack force of the adhesive layer including the curable component is more than a tack force of the adhesive layer including the reactivity imparting component.

By the tack force of the curable component-including layer being more than the tack force of the reactivity imparting component-including layer, the curable component-including layer may have more softness than the reactivity imparting component-including layer so that the reactivity imparting component is easily transferred to the curable component-including layer side, and the reaction due to the contact curing is easily promoted. By the reactivity being improved as described above, the shear strength after the contact curing may be improved so that the members may be strongly adhered.

Also, the combination may be a combination in which a thickness of the adhesive layer including the curable component is more than a thickness of the adhesive layer including the reactivity imparting component. This is because the reactivity imparting component is easily transferred to the curable component-including layer side, and the reaction due to the contact curing is promoted when the thickness of the reactivity imparting component-including layer is less so that the reactivity is further improved.

In the combination, it is preferable that a tack force of the adhesive layer including the curable component is in a range of 5 N/in or more to 50 N/in or less, that is, the curable component-including layer has the strong tackiness.

As shown in the results of the Examples described later, the present inventors have found out that the strength of the tackiness of the curable component-including layer contributes to the reactivity in the curing reaction by the curable component-including layer and the reactivity imparting component-including layer being in contact. That is, since the curable component-including layer having the strong tackiness has high softness, it is likely to be compatible regardless of the tack force of another reactivity imparting component-including layer so that the reactivity imparting component is easily transferred to the curable component-including layer side. Accordingly, the curing reaction is easily promoted, and the adhesive force of the cured adhesive layer formed by the contact curing may be stronger. Above all, since the shear strength after the contact curing is made higher, the falling of the member due to its own weight may be prevented when the adhesive surface between the adhesive layers is a vertical surface or a normal line surface.

Also, since the adhesive layer having the strong tackiness has softness, it may be reattached as long as the curing reaction is not yet completed so that the reworkability may be improved in addition to the reactivity.

[Shear Strength]

As for the first adhesive layer and the second adhesive layer, the higher the reactivity is, the stronger the shear strength after the contact curing reaction, that is, the shear strength of the cured adhesive layer. The stronger the shear tensile strength of the cured adhesive layer is, the more preferable; above all, is preferably 1 MPa or more, and more preferably 2 MPa or more. Also, the upper limit of the shear tensile strength is not particularly limited, and may be similar to the upper limit of the shear tensile strength of a general adhesive layer.

The shear strength may be measured by the following method (provided that the testing speed is 10 mm/min) compliant with JIS K6850:1999 (Adhesives-Determination of tensile lap-shear strength of rigid-to-rigid bonded assemblies). Incidentally, as for the adhesive sheet in which the separators are not provided on both surface sides, a separator that is a releasing film (such as PET separator PET28×IJO, manufactured by Nippa Co., Ltd.) is attached before the measuring.

First, the first adhesive sheet, the second adhesive sheet, and two SUS plates (size: 100 mm lengthwise×25 mm widthwise) are prepared. The first adhesive sheet has a layer structure in which the curable component-including layer is the first adhesive layer, and the separators are provided on both surfaces of the first adhesive layer. Also, the second adhesive sheet has a layer structure in which the reactivity imparting component-including layer is the second adhesive layer, and the separators are provided on both surfaces of the second adhesive layer. The size of each adhesive sheet is 12.5 mm lengthwise×25 mm widthwise. Next, one separator of the first adhesive sheet is peeled off, and the surface of the exposed first adhesive layer is attached to the tip of one surface of one SUS plate. The second adhesive sheet is also attached to the tip of one surface of another SUS plate by the similar method.

Subsequently, a sample stacked in the order of SUS plate/first adhesive layer/second adhesive layer/SUS plate was produced by directly staking, attaching (adhesive area: 12.5 mm×25 mm), and clipping the surface of the first adhesive layer exposed by peeling off another separator of the first adhesive sheet on the SUS plate; and the surface of the second adhesive layer exposed by peeling off another separator of the second adhesive sheet on the SUS plate. After aging the samples by leaving to stand for 24 hours or for 4 days under the environment of 23° C., 50% RH, the both ends of the samples after each aging time are fixed to the Tensilon universal material tester (RTF-1350, manufactured by A & D Co., Ltd.) under the environment of 23° C., 50% RH, and is measured by pulling by 10 mm/min in horizontal direction to the adhesive surface.

It is preferable that the shear tensile strength is in the above-described range in both cases of aging time of 24 hours and 4 days.

<Combination Having Good Holding Property>

The combination of the tack force of the first adhesive layer and the second adhesive layer is preferably such that the holding force when attached so as to be in contact with each other is high. By making the holding force between the first adhesive layer and the second adhesive layer high, the attached state may be maintained by the tack force exhibited by each adhesive layer until the contact curing of the first adhesive layer and the second adhesive layer is completed. Above all, when the adhesive surface of the first adhesive layer and the second adhesive layer is a vertical surface or a normal line surface, the peeling off at the adhesive surface due to their own weight may be prevented from occurring, until the contact curing is completed.

The holding force may be improved by adjusting at least one or more of the tack force, the thickness and the cohesive force.

[Combination 1]

The combination having good holding property may be a combination in which, a tack force of at least one of the first adhesive layer and the second adhesive layer is in a range of 5 N/in or more to 50 N/in or less, that is, a combination in which at least of the first adhesive layer and the second adhesive layer has the strong tackiness. On this occasion, although the tack force of another adhesive layer is not particularly limited, it is preferably less than the tack force of the above-described one adhesive layer, above all, the tack force of the another is preferably the medium tackiness or the weak tackiness.

It is preferable that one of the first adhesive layer and the second adhesive layer is the curable component-including layer, another is the reactivity imparting component-including layer, and the curable component-including layer has the strong tackiness exhibiting the above-described tack force. Above all, it is preferable that the curable component-including layer has the strong tackiness exhibiting the above-described tack force, and the reactivity imparting component-including layer has the medium tackiness or the weak tackiness.

[Combination 2]

Other combination having good holding property is preferably a combination in which, among the first adhesive layer and the second adhesive layer, a ratio of a thickness of one adhesive layer and a thickness of another adhesive layer is in a range of 0.5:1 to 5:1, and a thickness of the one adhesive layer is in a range of 2 µm or more to 200 µm or less.

Generally, since the thickness and the strength of the tack force are in proportional relationship, by the two adhesive layers having the above-described magnitude relationship of thickness, the tack force of the adhesive layer having more thickness becomes stronger to be a soft layer so that the stress is easily spread overall, and the holding force may be improved. The thickness of another adhesive layer on this occasion is not particularly limited if it is capable of satisfying the above-described ratio, and is preferably less than the thickness of the one adhesive layer.

Above all, the ratio of the thickness of one adhesive layer and the thickness of another adhesive layer is further preferably in a range of 0.6:1 to 3:1, and more preferably in a range of 0.8:1 to 2:1.

Also, the thickness of the one adhesive layer is preferably in a range of 5 µm or more to 150 µm or less.

On this occasion, it is preferable that the adhesive layer having the one thickness has the strong tackiness, and the adhesive layer having the another thickness has the medium tackiness or the weak tackiness. The reason therefor has been explained in Combination 1, thus omitted herein.

Incidentally, when the thickness is too small, the holding force is deteriorated in some cases even though the cohesive force is high (storage elastic modulus is high) since the stress concentration is not sustainable; meanwhile, when the thickness is too large, the holding force tends to be lowered even though the cohesive force is low (storage elastic modulus is low) since the first adhesive layer and the second adhesive layer are easily displaced at the adhesive surface.

When one of the first adhesive layer and the second adhesive layer is the curable component-including layer and another is the reactivity imparting component-including layer, the ratio of the thickness of the curable component-including layer and the thickness of the reactivity imparting component-including layer (the thickness of the curable component-including layer: the thickness of the reactivity imparting component-including layer) is preferably in a range of 0.5:1 to 5:1, further preferably in a range of 0.6:1 to 3:1, and more preferably in a range of 0.8:1 to 2:1.

Also, in this occasion, it is preferable that the thickness of the curable component-including layer is in a range of 2 µm or more to 200 µm or less, above all in a range of 5 µm or more to 150 µm or less.

In order to obtain the adhesive strength of a certain level by the contact curing of two adhesive layers, the curable component included in the curable component-including layer is needed to be transferred to the reactivity imparting component-including layer side. Accordingly, by making the thickness of the curable component-including layer to have the above-described thickness, the component is easily transferred, and the strong tackiness may be obtained so that the above-described effects are easily exhibited.

[Combination 3]

Other combination having good holding property may be a combination in which at least one of the first adhesive layer and the second adhesive layer has a predetermined cohesive force.

That is, it is preferable that a storage elastic modulus at 20° C. of at least one of the first adhesive layer and the second adhesive layer is in a range of $1.0 \times 10^5$ Pa or more to $1.0 \times 10^6$ Pa or less. Specifically, the storage elastic modulus is preferably $1.0 \times 10^5$ Pa or more, above all $2.0 \times 10^5$ Pa or more. Also, the storage elastic modulus is preferably $1.0 \times 10^6$ Pa or less, above all $5.0 \times 10^6$ Pa or less.

Among the energy generated in an object due to an external force and a distortion, the storage elastic modulus is defined as a component stored within the object, and is an index of the hardness of the adhesive force before the curing. The storage elastic modulus may be measured by a dynamic viscoelasticity measuring method compliant with JIS K7244-1. Specific measuring equipment and measuring conditions may be similar to the measuring equipment and measuring conditions used for measuring storage elastic modulus E' in the calculating method of the loss tangent (tan δ) specifying the above-described viscosity.

The adhesive layer (tacky agent layer) here has the tackiness according to the storage elastic modulus, and when the tack force is low, the value of the storage elastic modulus will be high and the cohesive force will also be high.

The holding property is generally thought to be depending on a relationship of the tack force between two adhesive layers. That is, when one of the first adhesive layer and the second adhesive layer is an adhesive layer having the strong tackiness, the adhesive layer having the strong tackiness has low cohesive force and has softness; however, since the stress is easily spread overall by the strong tack force, a high holding property may be exhibited.

Also, as shown in the results of the Examples described later, it was suggested that it is capable of improving the holding property when the storage elastic modulus of one adhesive layer is in a predetermined range, even though both of the first adhesive layer and the second adhesive layer have the weak tackiness. Form these results, although the cohesive force of each adhesive layer is high and is hard, the combination of two adhesive layers having the weak tackiness exhibits a predetermined storage elastic modulus. Thus, the stress is received as a whole so as the stress is not concentrated on either one so that the bearing force in shear direction may be increased. As the result, the holding property is presumed to be good.

The dynamic viscoelasticity of another adhesive layer may be more or may be less than the dynamic viscoelasticity of the one adhesive layer, and may be appropriately set according to the tack force and the thickness of the one adhesive layer. Above all, the storage elastic modulus at 20° C. of each of the first adhesive layer and the second adhesive layer is preferably in the above-described predetermined range. By each of the adhesive layer having the storage elastic modulus in the predetermined range, further higher holding property, than the case in which only one adhesive layer has the storage elastic modulus in the predetermined range, may be obtained.

It is preferable that one of the first adhesive layer and the second adhesive layer is the curable component-including layer and another is the reactivity imparting component-including layer, and at least the reactivity imparting component-including layer has the above-described storage elastic modulus. Above all, the reactivity imparting component-including layer preferably has the above-described storage elastic modulus and also has the weak tackiness.

[Others]

It is preferable that at least one of the first adhesive layer and the second adhesive layer has at least one or more of the predetermined tack force, thickness, and cohesive force, and another has the predetermined storage elastic modulus. Specifically, it is preferable that one of the first adhesive layer and the second adhesive layer is the curable component-including layer, another is the reactivity imparting component-including layer, the curable component-including layer has at least one of the above-described predetermined tack force and thickness, and the reactivity imparting component-including layer has the above-described predetermined storage elastic modulus.

[Holding Force]

The holding force between the first adhesive layer and the second adhesive layer is preferably 8 seconds or more, above all preferably 10 seconds or more, and particularly preferably 12 seconds or more, by the method compliant with JIS Z0237:2009 (Testing methods of pressure-sensitive adhesive tapes and sheets).

The holding force here may be measured by the following method compliant with JIS Z0237:2009 (Testing methods of pressure-sensitive adhesive tapes and sheets). Incidentally, as for the adhesive sheet in which the separators are not provided on both surface sides, a separator that is a releasing film (such as PET separator PET28×IJO, manufactured by Nippa Co., Ltd.) is attached before the measuring. First, the first adhesive sheet (size: 12 mm lengthwise×12 mm widthwise) provided with the curable component-including layer as the first adhesive layer and the separators on both surfaces of the first adhesive layer, is prepared; and the surface of the first adhesive layer exposed by peeling off one separator of the first adhesive sheet is attached to the tip center of one surface of a SUS plate (size: 125 mm lengthwise×50=widthwise). Next, the second adhesive sheet (size: 12 mm lengthwise×12 mm widthwise) provided with the reactivity imparting component-including layer as the second adhesive layer and the separators on both surfaces of the second adhesive layer, is prepared; and the surface of the second adhesive layer exposed by peeling off one separator of the second adhesive sheet, and the surface of the first adhesive layer exposed by peeling off another separator of the first adhesive sheet on a SUS plate, are directly stacked and attached (attaching area: 12 mm×12 mm).

Subsequently, the tip of a PET sheet (size: 150 mm lengthwise×12 mm widthwise) is attached to the whole surface of the second adhesive layer exposed by peeling off another separator of the second adhesive sheet. The SUS plate is fixed so as the longitudinal direction of the SUS plate becomes the vertical direction, and the falling time of a weight, when a 1 kg weight is hanged from the lower end of the PET sheet projecting lower from the SUS plate, is measured under the environment of 23° C., 50% RH.

<Others>

The combination of the tack force of the first adhesive layer and the second adhesive layer may be appropriately selected from the above-described combinations according to the function required to between the two adhesive layers.

Above all, the following combination is most preferable from the viewpoint of the reactivity, reworkability, and the holding property; a combination in which one of the first adhesive layer and the second adhesive layer includes a curable component, and another includes a reactivity imparting component, the adhesive layer including the curable component further includes a first compatible polymer component that is compatible with at least the curable component, and also has the strong tackiness and the adhesive layer including the reactivity imparting component further includes a second compatible polymer component that is compatible with at least the reactivity imparting component, and also has the weak tackiness.

<<<Separator>>>

The separator is not particularly limited if it is capable of being peeled off from the adhesive layer, and preferably has the strength of a degree enough to protect the adhesive layer.

As such separator, for example, those conventionally known such as a releasing film, a separate paper, a separate film, a sepa-paper, a peeling film, a peeling paper may be used. Specific examples may include polypropylene, polyethylene, and a fluorine film.

Also, the separator may have releasing property as single layer as the above-described examples, or a stacked body in which a releasing layer is formed on one surface or on both surfaces of a substrate for releasing paper such as high-quality paper, coated paper, impregnated paper, and plastic film, may be used. The releasing layer is not particularly limited if it is material having the releasing property, and examples may include silicone resin, organic resin-modified silicone resin, fluorine resin, amino-alkyd resin, melamine resin, acrylic resin, polyester resin, and long-chain alkyl resin. As for these resins, any one of emulsion type, solvent type, and solventless type may be used.

When the adherend surface of the adherend (construction material) is a rough surface, the separator preferably has softness so that the separator is capable of following the expansion of the adhesive layer upon attaching the adhesive sheet to the adherend (construction material). For such separator, for example, PE film is preferable.

The separator may have light-shielding property according to the kind of material included in the adhesive layer, or the construction environment in which the adherend (construction material) is attached. The reason therefor is to suppress the deterioration of the adhesive layer due to being irradiated with ultraviolet rays until the attaching step.

Examples of the separator having the light-shielding property may include an aluminum foil separator, an aluminum deposited film, a paper separator, a colored separator, and a film separator including an ultraviolet absorbing agent.

Also, the surface of the separator to be contacted with the adhesive layer is preferably subjected to an easy-peeling treatment.

As for the separator in the first adhesive sheet (first separator) and the separator in the second adhesive sheet (second separator), the both may be in the same color, or may be in different color. Above all, the first separator and the second separator are preferably in different colors from each other. This is because the first adhesive sheet and the second adhesive sheet may be easily distinguished.

The adhesive sheet before attaching to the product (construction material) may have separators on both surfaces of the adhesive layer. The adhesive sheet having such layer structure may be used when the preparing step described later comprises an adhesive sheet attaching step.

When the adhesive layer has the separators on both surfaces thereof, the separator placed on each surface may be the same or may be different; however, it is preferable that one has a light peeling property and another has a heavy peeling property.

<<<Method for Producing First Adhesive Sheet and Second Adhesive Sheet>>>

The first adhesive sheet and the second adhesive sheet may be formed by coating, for example, two kinds of the liquid chemicals of the two-component separate-coating type adhesive, that is, an adhesive composition including the curable component and an adhesive composition including the reactivity imparting component, onto one surface of each separator respectively and drying. The adhesive composition may include a solvent as necessary.

The coating method of the adhesive composition is not particularly limited, and known printing methods and coating methods may be used. Also, the drying conditions of the coated layer is preferably the condition so that the solvent included in the coating layer may be sufficiently vaporized, and may be appropriately set according to the composition.

The adhesive sheet may have the separators on both surfaces of the adhesive layer by forming the adhesive layer by coating one surface of the separator with an adhesive composition and drying thereof, and then, placing other separator on the adhesive layer.

(ii) First Construction Material and Second Construction Material

The first construction material and the second construction material are construction materials forming the construction product obtained by the method for producing of the present aspect, and are appropriately selected according to the kind thereof. As long as it has an adherend surface, the aspect of the construction material is not particularly limited.

The construction material may include, for example, inorganic material, organic material, or composite material or stacked material combining thereof. The material quality of the first construction material and the second construction material may be the same, or may be different, and may be appropriately selected and combined according to, for example, the usage environment or the use application.

Examples of the organic construction material including the organic material may include a wood plate, and a resin plate. Examples of the wood plate may include a wooden single panel, a wooden plyboard, a particle board, and a medium-density fiberboard including wood such as cedar, hinoki cypress, pine, lauan, and teak.

Also, as the inorganic construction material including the inorganic material, for example, a slate plate, a calcium silicate board, a gypsum board, a brick, a concrete, a cement mortar, a metal material, and a ceramic material may be used.

Examples of the construction material may include those known in the construction procedure; specifically, may include building frame such as a post, a beam, a ceiling, a wall, and a floor of an existing construction structure; a construction member such as a floor plate, a wall plate, and a ceiling plate used to form a building frame when constructing a new construction structure; a surface covering material used by adhering to the surface of a ground such as a building frame or a construction member. Examples of the surface covering material may include a wall covering material such as plastic wall paper, fabric wall paper, paper wall paper, inorganic wall paper, decorative film, tile, panel, and decorative board; decorative floor material such as a tile, linoleum, flooring block, flooring, cushioned floor, and flooring board.

Example of the combination of the first construction material and the second construction material may include a combination in which one is the surface covering material and another is the building frame of a construction structure. Specifically, one of the first construction material and the second construction material may be the wall covering material and another may be the wall of a construction structure; or one may be the decorative floor material and another may be the floor of a construction structure.

Also, one of the first construction material and the second construction material may be the building frame of a construction structure and another may be the building frame of other construction structure. By attaching two kinds of building frames via the first adhesive layer and the second adhesive layer, the cured adhesive layer may be a substitute for a welding or a bolt fixation.

(iii) Others

In the first preparing step and the second preparing step, an adhesive sheet-containing construction material, in which the adhesive sheet is preliminarily attached to the construction material, may be prepared. This is because the time may be shortened by using a ready-made adhesive sheet-containing construction material when producing a product, since there is no need for producing the adhesive sheet-containing construction material.

Also, in at least one of the first preparing step and the second preparing step, an adhesive sheet including a separator and the adhesive layer provided on one surface of the separator may be used, and may include an adhesive sheet attaching step of attaching the surface of the adhesive layer, on which the separator is not placed, to a construction material.

In an adhesive sheet attaching step, an adhesive sheet including an adhesive layer and a separator covering the adhesive layer is used. The separator may be included on at least one surface of the adhesive layer, or may be placed on both surfaces of the adhesive layer. The adhesive sheet may be a sheet fed, or may be a long shape.

A method for attaching the construction material and the adhesive sheet may be appropriately selected according to the aspect of the adhesive sheet. When an adhesive sheet including the separator on one surface of the adhesive layer is used, for example, the attaching may be carried out by rolling out the required amount from the adhesive sheet roll which is rolled as a roll, placing the adhesive layer side on the construction material, and then cutting. Also, when an adhesive sheet in which the separators are placed on both surfaces of the adhesive layer, is used, the adhesive layer may be exposed by peeling off one separator of the sheet fed adhesive sheet, and the construction material may be attached thereon.

In the adhesive sheet attaching step, the adhesive sheet may be attached to the whole region of the adherend surface of the construction material, or may be attached in a frame form on the peripheral of the adherend surface of the construction material. When the adhesive sheet is attached, it is preferable that a squeegee, for example, is used so that air bubble does not enter to the adhesive surface between the construction material and the adhesive layer of the adhesive sheet.

In the adhesive sheet attaching step, when the adhesive layer has the tackiness, it may be attached by a thermal press bonding by ironing, for example, or may be attached by pressing with a roller while imparting a slight vibration. Thereby, the adhesive layer is easily intruded into the gap of the construction material, and the attaching strength between the adhesive sheet and the construction material may be increased.

Further, in the adhesive sheet attaching step, when the adhesive layer included in the adhesive sheet (such as first adhesive layer included in the first adhesive sheet) has the tack force explained in the section of "Combination Having Good Reworkability" above, it is capable of including a positioning step of determining the attaching position of another adhesive sheet-containing construction material (such as second adhesive sheet-containing construction material). By the adhesive layer exhibiting the desired tack force, it is able to reattach the adhesive sheet on the construction material in the preparing step so that the attaching position of another adhesive sheet-containing construction material is the desired position when carrying out the attaching step.

For example, when the first adhesive layer of the first adhesive sheet exhibits the desired tack force, the first preparing step may include both of the first adhesive sheet attaching step and the positioning step of determining the attaching position of the second adhesive sheet-containing construction material. This is similar in the second preparing step. On this occasion, the construction material to be attached to the adhesive sheet including the adhesive layer is preferably a fixed construction material, for example, preferably a building fame (wall or floor) forming a construction structure.

(c) Attaching Step

The attaching step in the method for producing of the preset aspect is a step in which another surface of the first adhesive layer of the first adhesive sheet-containing construction material and another surface of the second adhesive layer of the second adhesive sheet-containing construction material are attached.

In the present step, the curing by the first adhesive layer and the second adhesive layer being in contact with each other proceeds at normal temperature so that the cured adhesive layer formed by the contact curing is capable of exhibiting the strong adhesive force, and the construction materials may be adhered to each other.

In the first adhesive sheet-containing construction material and the second adhesive sheet-containing construction material, when the first separator is placed on the side of the first adhesive layer that is opposite to the first construction material side and/or when the second separator is placed on the side of the second adhesive layer that is opposite to the second construction material side, the first separator of the first adhesive sheet-containing construction material and/or the second separator of the second adhesive sheet-containing construction material is peeled off, and the exposed surface of the first adhesive layer and the surface of the second adhesive layer are attached.

The attaching method of the first adhesive layer on the first adhesive sheet-containing construction material and the second adhesive layer of the second adhesive sheet-containing construction material is not particularly limited, and for example, a method in which the first adhesive layer of the first adhesive sheet-containing construction material and the second adhesive layer of the second adhesive sheet-containing construction material are faced to each other, and are attached from a direction just above, may be used.

Also, when at least one the first adhesive layer and the second adhesive layer exhibits low viscosity or high viscosity, other attaching method may be a method in which the first adhesive layer on the first adhesive sheet-containing construction material and the second adhesive layer of the second adhesive sheet-containing construction material are faced to each other and are attached by sliding one in parallel direction to another adherend surface. The above-described attaching method is preferable when the attaching surface of the first construction material and the second construction material is a horizontal surface such as, for example, when a floor of a construction structure that is the first construction material and a decorative floor material that is the second construction material are attached.

FIGS. 6A to 6C explained above illustrates an example of construction procedure in which first adhesive sheet-containing construction material 20B is attached by sliding on second adhesive layer 24 of second adhesive sheet-containing construction material 30B in the attaching step (FIG. 6C).

According to the magnitude of the tack force between the first adhesive layer and the second adhesive layer, the present step may comprise a positioning step of determining the position by reattaching one upon attaching the first adhesive sheet-containing construction material and the second adhesive sheet-containing construction material. When the present step comprises the positioning step, the combination of the tack force of the first adhesive layer and the second adhesive layer is preferably the combination explained in the section of "Combination Having Good Reworkability" above.

The first adhesive layer and the second adhesive layer are capable of being curing reacted at normal temperature by being in contact. Incidentally, the normal temperature means 23° C. Also, the first adhesive layer and the second adhesive layer may be heated in the contacted state to promote the curing. The curing temperature may be appropriately set according to the composition of the first adhesive layer and the second adhesive layer, and is for example, preferably in a range of 30° C. to 120° C., above all preferably in a range of 40° C. to 80° C. When the curing temperature is too high, the flowing property of the adhesive layer is increased so that the adhesive protrudes from the adherend surface, and may cause the poor appearance in some cases, by the curing of the adhesive being promoted in the protruded state. Also, since the odor is generated under high temperature, it is not preferable depending on the component included in the adhesive layer such as imidazole compound. Meanwhile, when the curing temperature is too low, the curing promoting effect cannot be obtained very much so that the shortening of the procedure time is not likely to be achieved in some cases.

Also, after attaching, the first adhesive layer and the second adhesive layer are preferably aged for a desired time. The reason therefor is to promote the diffusion of the component included in the first adhesive layer and the component included in the second adhesive layer so that the strong adhesive force may be exhibited by being sufficiently cured.

The aging time may be appropriately set according to the composition of the first adhesive layer and the second adhesive layer, and may be, for example, in a range of 0.5 hours to 72 hours. Too short aging time is not preferable since the reattaching is not possible, meanwhile, too long aging time is not preferable since the procedure time is elongated.

When the curing reaction by being in contact is completed, the first adhesive layer and the second adhesive layer become the cured adhesive layer. The cured adhesive layer is a polymer layer formed by the curable component and the reactivity imparting component include in the first adhesive layer and the second adhesive layer being reacted and cured. The cured adhesive layer may be a single layer, or the contact interface of the first adhesive layer and the second adhesive layer may remain.

It is preferable that the cured adhesive layer is capable of adhering the first construction material and the second construction material strongly by its strong adhesive force, and has the adhesive force capable of maintaining the above-described state for a long time, above all, preferably has a high shear tensile strength. The reason therefor is to maintain the fixture of the first construction material and the second construction material for a long term so that peeling off of the construction material may be suppressed even though a shear stress is applied with time.

The shear tensile strength of the cured adhesive layer has been explained in the section of "Combination Having Good Reactivity" in "Combination of Tack force of First Adhesive Layer and Second Adhesive Layer" above, thus the explanation is omitted herein.

(2) Second Aspect

The second aspect of a method for producing a construction product (hereinafter, in this section, is abbreviated to "a method for producing of the present aspect") is a method using the method for producing of the second embodiment explained in the section of "A. Embodiments" above.

According to the method for producing of the present aspect, the first construction material and the second construction material may be adhered strongly at a desired position in the attaching step by the effects exhibited by the above-described method for producing of the second embodiment. Also, the curing and aging may be carried out while maintaining the attached state of the first construction material and the second construction material, until the curing reaction by the first adhesive layer and the second adhesive layer being in contact is completed, by the tack force respectively exhibited by each adhesive layer so that the construction operation may be carried out simply since the operational efforts during the aging is decreased. Further, by using the adhesive sheet, since problems such as coating unevenness and protruding adhesive do not occur, still more, since the adhesive layer is not provided on the second construction material side, the handling of the second construction material upon construction is easy.

(a) Construction Example

The method for producing of the present aspect is a method comprising the preparing step, the second adhesive sheet attaching step, and the second member attaching step that will be described later, and the construction is possible according to, for example, the kinds of the first construction material and the second construction material; the direction of the adherend surface (adhesive surface) when the construction materials are attached to each other; and the tack force of the first adhesive layer and the second adhesive layer.

Hereinafter, a construction example using the method for producing of the present aspect will be explained with examples.

(i) First Example

The first example of the construction example using the method for producing of the present aspect (hereinafter, in this section, is abbreviated to "the present construction example" in some cases) is a construction example in which the adherend surface (adhesive surface) of the first construction material and the second construction material is a vertical surface or a normal line surface. Specifically, it is a construction example in which one of the first construction material and the second construction material is a wall of a construction structure, and another is a wall covering material. By the present construction example, a construction product, in which the wall of the construction structure and the wall covering material are adhered via the cured adhesive layer, may be obtained.

In the present construction example, by placing the first adhesive layer and the second adhesive layer being in contact on the first construction material, the effects similar to the effects explained in the section of "(1) First Aspect, (a) Construction Example, (i) First Example" above may be obtained.

In the present construction example, the first construction material may be the wall covering material and the second construction material may be the wall of the construction structure, and the contrary is possible. Upon attaching a large-sized wall covering material to a wall of a construction structure, when the first construction material is the wall of the construction structure, positioning may be carried out accurately when the wall covering material is attached, by having the first adhesive layer and the second adhesive layer on the wall. Also, since there is no adhesive layer on the wall covering material side, it is preferable from the viewpoint of easy handling of the wall covering material upon attaching. Meanwhile, when the first construction material is a wall covering material, since the first adhesive layer and the second adhesive layer may be preliminarily placed so as to be fit within the adherend surface, there is no need to attach thereof to the wall while paying attention so as the adhesive layer does not protrude from the wall covering material, and it is preferable from the viewpoint of carrying out the construction more simply.

In the present construction example, the first adhesive layer may be the curable component-including layer and the second adhesive layer may be the reactivity imparting component-including layer, and the contrary is possible. Also, in the present construction example, degree of the tack force of the first adhesive layer and the second adhesive layer may be appropriately set respectively. Specific tack force and combination of the first adhesive layer and the second adhesive layer are similar to those explained in the section of "(1) First Aspect" above.

(ii) Second Example

The second example of the construction example using the method for producing of the present aspect (hereinafter, in this section, is abbreviated to "the present construction example" in some cases) is a construction example in which the adherend surface (adhesive surface) of the first construction material and the second construction material is a horizontal surface. Specifically, it is a construction example in which one of the first construction material and the second construction material is a floor of a construction structure, and another is a decorative floor material. By the present construction example, a construction product, in which the floor of the construction structure and the decorative floor material are adhered via the cured adhesive layer, may be obtained.

In the present construction example, by placing the first adhesive layer and the second adhesive layer being in contact on the first construction material, the effects similar to the effects explained in the section of "(1) First Aspect, (a) Construction Example, (ii) Second Example" above may be obtained.

In the present construction example, the first construction material may be the decorative floor material and the second construction material may be the floor of the construction structure, and the contrary is possible.

The first construction material is preferably the floor of the construction structure. This is because, upon attaching a large-sized decorative floor material to a floor of a construction structure, positioning may be carried out accurately when the decorative floor material is attached, by preliminarily providing the first adhesive layer and the second adhesive layer on the floor. Also, this is because, since there is no adhesive layer on the decorative floor material side, the handling of the decorative floor material upon attaching is easier.

Also, the first construction material is preferably the decorative floor material. If a tacky adhesive layer is on the floor, the operation may be disturbed when a worker moves around on the floor of the construction structure. Meanwhile, by preliminarily providing the first adhesive layer and the second adhesive layer on the decorative floor material side, the worker may move around on the floor of the construction structure freely so that the construction is possible without the operation being disturbed.

In the present construction example, the first adhesive layer may be the curable component-including layer and the second adhesive layer may be the reactivity imparting component-including layer, and the contrary is possible. Also, degree of the tack force of the first adhesive layer and the second adhesive layer may be appropriately set respectively. Specific tack force and combination of the first adhesive layer and the second adhesive layer are similar to those explained in the section of "(1) First Aspect" above.

(b) Preparing Step

The preparing step in the method for producing of the present aspect is a step of preparing a first adhesive sheet-containing construction material in which one surface of the first adhesive layer, of a first adhesive sheet including the first adhesive layer, is attached to the first construction material.

The first adhesive sheet may include, for example, a first adhesive layer and a first separator. Also, the first adhesive sheet-containing construction material prepared in the present step may have a structure in which the first adhesive sheet, including the first separator and the first adhesive layer formed on one surface of the first separator, is attached to the surface of the first construction material, at the surface of the first adhesive layer on which the first separator is not placed.

(i) First Adhesive Sheet

The first adhesive sheet includes the first adhesive layer. The first adhesive sheet may include, for example, the first separator and the first adhesive layer provided on one surface of the first separator.

The first adhesive layer in the first adhesive sheet may be the curable component-including layer explained in the section of "(1) First Aspect" above, or may be the reactivity imparting component-including layer. Since the curable component-including layer and the reactivity imparting component-including layer are similar to those explained in the above-described section, the explanation is omitted herein.

When the present step comprises the first adhesive sheet attaching step described later, by adjusting the tack force or the cohesive force of the first adhesive layer, the position may be adjusted by reattaching the first adhesive sheet on the first construction material. On this occasion, the first construction material is preferably a fixed construction material such as a building frame forming a construction structure, for example, preferably a wall or a floor of a construction structure. Also, by the first adhesive layer having the low viscosity or the high viscosity, the second adhesive sheet may be slid in the horizontal direction to the adherend surface of the first adhesive layer, upon attaching the second adhesive layer of the second adhesive sheet onto the first adhesive layer.

Since the tackiness, the cohesive force exhibited by the first adhesive layer and the combination of the tack force to the second adhesive layer are similar to those explained in "(1) First Aspect" above, the explanation is omitted herein.

Since the first separator in the first adhesive sheet and other details and method for producing of the first adhesive sheet are similar to those explained in the section of "(1) First Aspect" above, the explanation is omitted herein.

(ii) First Construction Material

The first construction material may be appropriately selected according to the combination with the second construction material described later. Since the first construction material has been explained in the section of "(1) First Aspect" above, the explanation is omitted herein.

(iii) Others

In the present step, a first adhesive sheet-containing construction material, in which the first adhesive sheet is preliminarily attached to the first construction material, may be prepared. Also, using the first adhesive sheet provided with the first separator and the first adhesive layer provided on one surface of the first separator, the present step may comprise the first adhesive sheet attaching step of attaching the surface of the first adhesive layer, on which the first separator is not placed, to the first construction material.

Since the first adhesive sheet attaching step is similar to the adhesive sheet attaching step explained in the section of "(1) First Aspect, (b) First Preparing Step and Second Preparing Step, (iii) Others" above, the explanation is omitted herein.

(c) Second Adhesive Sheet Attaching Step

The second adhesive sheet attaching step in the method for producing of the present aspect is a step of attaching one surface of the second adhesive layer of the second adhesive sheet including the second adhesive layer, to another surface of the first adhesive layer of the first adhesive sheet-containing construction material.

(i) Second Adhesive Sheet

The second adhesive sheet used in the present step includes the second adhesive layer. The second adhesive sheet may include, for example, a second separator and a second adhesive layer provided on one surface of the second separator.

That is, the present step may be a step in which the first separator of the first adhesive sheet-containing construction material is peeled off, and the surface of the second adhesive sheet including the second separator and the second adhesive layer formed on one surface of the second separator, on which the second separator is not placed, is attached to the surface of the first adhesive layer exposed by peeling the first separator off.

The second adhesive layer may be the curable component-including layer or may be the reactivity imparting component-including layer according to the composition of the first adhesive layer. Since the curable component-including layer and the reactivity imparting component-including layer are similar to those explained in the section of "(1) First Aspect" above, the explanation is omitted herein.

By adjusting the tack force or the cohesive force of the second adhesive layer, the reattaching when attached to the first adhesive layer of the first adhesive sheet-containing construction material is possible, and the reattaching of the second construction material is also possible in the attaching step described later. Also, by the second adhesive layer having the low viscosity or the high viscosity, the second construction material may be slid in the horizontal direction to the adherend surface of the second adhesive layer and attached, upon attaching the second construction material to the second adhesive layer in the attaching step described later.

Since the tackiness, the cohesive force exhibited by the second adhesive layer and the combination of the tack force to the first adhesive layer are similar to those explained in the section of "(1) First Aspect" above, the explanation is omitted herein.

Since the second separator in the second adhesive sheet is similar to the separator explained in the section of "(1) First Aspect" above, the explanation is omitted herein. The second adhesive sheet used in the present step may include the second separator on at least one surface of the second adhesive layer, or may include the second separators on both surfaces of the second adhesive layer.

Since other details and method for producing of the second adhesive sheet are similar to those explained in the section of "(1) First Aspect" above, the explanation is omitted herein.

(ii) Attaching Method

The method for attaching one surface of the second adhesive layer of the second adhesive sheet including the second adhesive layer, to another surface of the first adhesive layer of the first adhesive sheet-containing construction material is not particularly limited. For example, the following method may be used; using a second adhesive sheet roll, including the second separator on one surface of the second adhesive layer and is rolled as a roll with the second adhesive layer being inside the roll, required amount is rolled out from the second adhesive sheet roll, the second adhesive layer is attached onto the first adhesive layer, and then, cut. Also, the following method may be used; using a sheet fed second adhesive sheet provided with the second separators on both surfaces of the second adhesive layer, one second separator of the second adhesive sheet is peeled off, and the exposed second adhesive layer and the first adhesive layer are attached.

In the present step, although the curing reaction is promoted by the first adhesive layer and the second adhesive layer being in contact at normal temperature, the curing is preferably not completed before the second construction material attaching step described later. This is because it may be difficult to attach the second construction material to the second adhesive layer.

(d) Second Construction Material Attaching Step

The second construction material attaching step in the method for producing of the present aspect is a step of attaching the second construction material to another surface of the second adhesive layer of the second adhesive sheet.

Since the second construction material used in the present step may be appropriately selected according to the combination with the first construction material, and is similar to those explained in the section of "(1) First Aspect" above, the explanation is omitted herein.

The method for attaching another surface of the second adhesive layer and the second construction material is not particularly limited. For example, the second construction material may be attached to the adherend surface of the second adhesive layer placed on the first construction material, from a direction just above.

Also, when the second adhesive layer exhibits the low viscosity or the high viscosity, among the first construction material on which the second adhesive layer is placed and the second construction material, one construction material may be fixed, and another construction material may be slid in the horizontal direction to the adherend surface of the fixed one construction material, and attached. Such attaching method by sliding may be preferably used when the attaching surface of the first construction material and the second construction material is a horizontal surface, for example, when a floor of a construction structure and a decorative floor material are attached.

By carrying out the present step within the aging time, after the first adhesive layer and the second adhesive layer are attached in the second adhesive sheet attaching step, the second construction material may be fixed by the tackiness of the second adhesive layer until the curing reaction by the first adhesive layer and the second adhesive layer being in contact is completed. Also, by the completion of the curing reaction, the second construction material may be fixed strongly. Further, while aging, a worker may carryout other construction.

Above all, the present step is preferably carried out under normal temperature, within 0.5 hours after the first adhesive layer and the second adhesive layer are brought into contact. This is because of a concern that the adhesive strength to the second construction material is deteriorated as the curing proceeds.

Also, after attaching the second construction material to another surface of the second adhesive layer, the curing reaction may be promoted by heating. The aging time and the curing temperature are similar to those explained in the section of "(1) First Aspect" above.

In the present step, when the curing reaction by the first adhesive layer and the second adhesive layer being in contact is completed, the cured adhesive layer is formed between the first construction material and the second construction material by the first adhesive layer and the second adhesive layer being adhered strongly.

The details of the cured adhesive layer and the contents not explained in the method for producing of the present aspect are similar to those explained in the section of "(1) First Aspect" above.

(3) Third Aspect

The third aspect of a method for producing a construction product (hereinafter, in this section, is abbreviated to "a method for producing of the present aspect") is a method using the method for producing of the third embodiment explained in the section of "A. Embodiments" above.

According to the method for producing of the present aspect, the construction time at the site of attaching the first construction material and the second construction material may be shortened, also, mistaking work at site such as miss attaching may be decreased by the effects exhibited by the above-described method for producing of the third embodiment.

Hereinafter, each step of the method for producing of the present aspect will be explained in detail.

(a) Preparing Step

The preparing step in the method for producing of the present aspect is a step of preparing a multi-layered adhesive sheet in which one surface of the first adhesive layer of a first adhesive sheet including the first adhesive layer, and one surface of the second adhesive layer of a second adhesive sheet including the second adhesive layer, are attached.

The multi-layered adhesive sheet prepared in the present step may include a first separator on the surface of the first adhesive layer that is opposite to the second adhesive layer side, or may include a second separator on the surface of the second adhesive layer that is opposite to the first adhesive layer side. Accordingly, the multi-layered adhesive sheet may be a multi-layered body in which the first adhesive layer of the first adhesive sheet including the first separator and the first adhesive layer formed on one surface of the first separator is attached to the second adhesive layer of the second adhesive sheet including the second separator and the second adhesive layer formed on one surface of the second separator.

The multi-layered adhesive sheet may include a cured region at the adhesive interface between the first adhesive layer and the second adhesive layer. The cured region means a region cured by the diffusion of the components included in each of the first adhesive layer and the second adhesive layer.

Since the first adhesive sheet and the second adhesive sheet have been explained in the section of "(1) First Aspect" above, the explanation is omitted herein.

In the present step, a multi-layered adhesive sheet, in which the first adhesive layer of the first adhesive sheet and the second adhesive layer of the second adhesive sheet are preliminarily attached in a separate step, may be prepared.

Also, the present step may comprise a multi-layered adhesive sheet forming step of forming a multi-layered adhesive sheet in which the first adhesive layer of the first adhesive sheet including the first separator and the first adhesive layer formed on one surface of the first separator, and the second adhesive layer of the second adhesive sheet including the second separator and the second adhesive layer formed on one surface of the second separator are attached.

In the multi-layered adhesive sheet forming step, the multi-layered adhesive sheet may be prepared by, for example, preparing the first adhesive sheet including the first separators on both surfaces of the first adhesive layer, and the second adhesive sheet including the second separators on both surfaces of the second adhesive layer; respectively peeling off one first separator of the first adhesive sheet and one second separator of the second adhesive sheet; and attaching the exposed first adhesive layer and second adhesive layer.

Also, in the multi-layered adhesive sheet forming step, the multi-layered adhesive sheet may be prepared by, for example, preparing a first adhesive sheet roll including the first separator on one surface of the first adhesive layer and is rolled as a roll with the first adhesive layer being inside the roll, and a second adhesive sheet roll including the second separator on one surface of the second adhesive layer and is rolled as a roll with the second adhesive layer being inside the roll; respectively rolling out from each adhesive sheet roll; attaching the first adhesive layer of the first adhesive sheet and the second adhesive layer of the second adhesive sheet; and cutting out in a desired shape.

The attaching of the first adhesive sheet and the second adhesive sheet may be carried out by a worker's hand, or may be carried out mechanically and continuously using, for example, a roll type laminator (such as Lamipacker LPP4513, manufactured by Fujipla Inc.). The above is also similar in the above-described other aspects.

When the attaching step described later is not carried out immediately after preparing the multi-layered adhesive sheet, the multi-layered adhesive sheet is preferably stored under low temperature environment so as not to promote the curing reaction by the first adhesive layer and the second adhesive layer being in contact.

Under low temperature environment means under environment of 5° C. or below, above all, the multi-layered adhesive sheet is preferably stored in a refrigerator or a freezer of −20° C.

(b) First Attaching Step and Second Attaching Step

The first attaching step in the method for producing of the present aspect is a step of attaching the first member to another surface of the first adhesive layer of the multi-layered adhesive sheet.

Also, the second attaching step in the method for producing of the present aspect is a step of attaching the second member to another surface of the second adhesive layer of the multi-layered adhesive sheet.

The first attaching step and the second attaching step may be carried out in no particular order.

When the first separator is placed on another surface of the first adhesive layer in the multi-layered adhesive sheet, the first construction material may be attached to the first adhesive layer exposed by peeling the first separator off.

Also, when the second separator is placed on another surface of the second adhesive layer in the multi-layered adhesive sheet, the second construction material may be attached to the second adhesive layer exposed by peeling the second separator off.

The first construction material and the second construction material used in each step of the first attaching step and the second attaching step may be similar to the construction material explained in the section of "(1) First Aspect" above.

The first attaching step and the second attaching step are preferably carried out between the preparing step and the completion of the curing reaction by the first adhesive layer and the second adhesive layer being in contact. This is because as the curing of the first adhesive layer and the second adhesive layer proceeds, it may be difficult to attach the construction material in some cases.

In the preparing step, when the multi-layered adhesive sheet is not stored under the low temperature environment, it is preferable to carry out, under normal temperature, within 0.5 hours after bringing the first adhesive layer and the second adhesive layer into contact.

Also, in the preparing step, when the multi-layered adhesive sheet is stored under the low temperature environment, it is preferable to carry out within the aging time after being released from the low temperature environment. The aging time may be similar to those explained in the section of "(1) First Aspect" above.

(c) Others

Besides, the contents not explained in the method for producing of the present aspect such as the attaching method using the property of the adhesive layer, and the cured adhesive layer formed by the contact curing reaction of the first adhesive layer and the second adhesive layer may be similar to those explained in the section of "(1) First Aspect" and "(2) Second Aspect" above.

2. Method for Producing Infrastructure

As for the method for producing a product, any one of the above-described first to fourth embodiments may be used as a method for producing an infrastructure, above all, the fourth embodiment may be preferably used.

The infrastructure here means, for example, a bridge formation, a tunnel, a road pavement, a river management facility, a sand control dam, a sand control riverbed fixer, a sewage pipe joist, a sewage disposal plant, a harbor facility, a public housing, a complex housing, a general housing, an urban park, a sea embankment, an air port, a beacon, and a government building.

In the method for producing an infrastructure, by adhering the second member, for example, an infrastructure in which the first member is mended or reinforced may be obtained. Also, an infrastructure in which the first member is mended or reinforced by the cured adhesive layer including the mending•reinforcing member may be obtained, by not using the second member, but by a mending or a reinforcing member (hereinafter is abbreviated to a mending•reinforcing member) being included in the adhesive layer included in the first adhesive sheet or the second adhesive sheet, or by the mending•reinforcing member being placed on the surface of the adhesive layer.

Accordingly, the method for producing an infrastructure may be "a method for mending or reinforcing an infrastructure".

Since infrastructures get old with the years, they are appropriately mended or reinforced. As the method for mending or reinforcing an infrastructure, for example, a method in which a mending•reinforcing sheet is adhered to an infrastructure is known.

However, when the mending•reinforcing sheet is adhered by using a liquid adhesive, the adhesive might be flown apart and be attached to a body during measuring or coating operation and causing problems that the work burden is heavy and it is difficult to make the construction simple. Also, when a mending•reinforcing sheet including a thermosetting adhesive or a photosetting adhesive made into a sheet is used, an operation for curing the adhesive by applying heat or light is needed after the attaching. Therefore, the worker needs to carry a heating equipment or an ultraviolet irradiating equipment around. Also, since the above-described operations are difficult depending on the placed location of the infrastructure, there is a problem that the mending or reinforcing operation is limited.

In contrast, by using anyone of the above-described first to fourth embodiments of the method for producing a product as a method for producing an infrastructure by mending or reinforcing, the above-described problems may be solved.

(1) First to Third Aspects of Method for Producing Infrastructure

The first to third aspects of the method for producing an infrastructure is a method respectively using the method for producing of the first to third embodiments explained in the section of "A. Embodiments" above.

In these aspects, since they are similar to those explained in the section of "1. Method for Producing Construction Product" above except that the first member and the second member are the members for an infrastructure described later and the obtained product is an infrastructure after mending or reinforcing, the explanation is omitted herein.

Incidentally, "construction product" in the section above may be replaced with "infrastructure (after mending of reinforcing)", "method for producing a construction product" or "method for constructing a construction material" may be replaced with "method for producing of an infrastructure" or "method for mending or reinforcing an infrastructure", and "member", "construction material" may be replaced with "member for an infrastructure" respectively.

(a) Member for Infrastructure

Examples of the member for an infrastructure may include an infrastructure before mending or reinforcing (hereinafter, object infrastructure), mending•reinforcing member, and an abnormality detecting member.

In the first to third aspects of the method for producing an infrastructure, among the first member and the second member those are members for an infrastructure, one is an object infrastructure, and the object infrastructure may be fixed.

For the mending•reinforcing member, conventionally known members may be used, and examples may include a member capable of being impregnated into the adhesive layer; specifically, for the reinforcing application, examples may include aramid fiber, carbon fiber, vinylon fiber, and PET fiber. Also, for the mending application capable of imparting a function, examples may include an advertising signboard, a coated film, a waterproof sheet, a water absorbent sheet, an ultraviolet resistance sheet, a water retaining sheet, and a colored sheet. Incidentally, the reinforcing includes the mending such as covering of a crack and smoothing of an concavo-convex, and further includes those imparting a function such as improving the strength, water retaining, surface protection, and decorating.

Examples of the abnormality detecting member may include a member that is attached to a member for an infrastructure and detects a state change of the surface thereof. Specifically, when the member for an infrastructure is an object infrastructure whose material quality is concrete, the abnormality detecting member detects, for example, an occurrence of a crack on the surface or growth thereof, and a variation of a moisture concentration or an ion concentration such as salt of the concrete surface.

A conventionally known member may be used for the abnormality detecting member according to the kind or the material quality of the member for an infrastructure to which the detector is attached. For a concrete member for an infrastructure, examples may include a conductive wire rod, an optical fiber, a fiber-impregnated plastic film, a commercially supplied crack detector (KZCA-A, manufactured by Tokyo Sokki Kenkyujo Co., Ltd.).

(2) Fourth Aspect of Method for Producing Infrastructure

The fourth aspect of a method for producing an infrastructure (hereinafter, regarded as a method for producing of the present aspect, in this section) is a method using the method for producing of the fourth embodiment explained in the section of "A. Embodiments" above.

The method for producing of the present aspect may be similar to those explained in the section of "1. Method for Producing Construction Product, (2) Second Aspect" above except that the first member is a member for an infrastructure and that the second member attaching step is not carried out.

(a) Preparing Step

The preparing step in the method for producing of the present aspect is a step of preparing a first adhesive sheet-containing member for an infrastructure in which one surface of the first adhesive layer, of a first adhesive sheet including the first adhesive layer, is attached to the member for an infrastructure.

Examples of the member for an infrastructure used as the first member in the method for producing of the present aspect may include an object infrastructure; however, not limited thereto. Also, the member for an infrastructure may be fixed. Specific member for an infrastructure is similar to those described above.

In the first adhesive sheet, the mending•reinforcing member or the abnormality detecting member may be preliminarily placed on the surface of the first adhesive layer on the first member side or on the opposite side thereof, or the mending•reinforcing member may be impregnated into the first adhesive layer. This is because, since the first adhesive layer and the second adhesive layer of the second adhesive sheet are contact cured in the second adhesive sheet attaching step, the mending•reinforcing member or the abnormality detecting member may be included within the cured adhesive layer.

Figure 7:
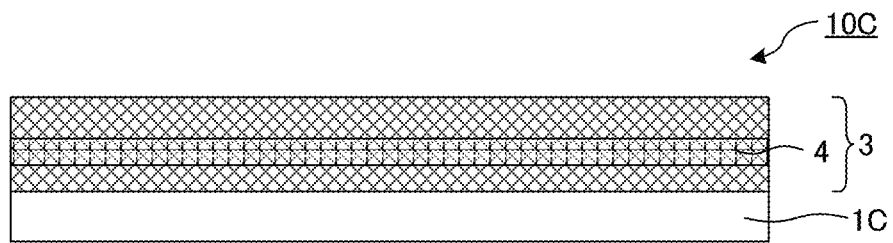
FIG. 7 is a schematic cross-sectional view illustrating an example of a product obtained by the fourth embodiment of a method for producing a product.

In infrastructure 10C exemplified in FIG. 7, cured adhesive layer 3 is formed on object infrastructure 1C, and mending•reinforcing member or abnormality detecting member 4 is included within cured adhesive layer 3.

(b) Second Adhesive Sheet Attaching Step

The second adhesive sheet attaching step in the method for producing of the preset aspect is a step of attaching one surface of the second adhesive layer, of the second adhesive sheet including the second adhesive layer, to another surface of the first adhesive layer of the first adhesive sheet-containing member for an infrastructure.

In the second adhesive sheet, the mending•reinforcing member or the abnormality detecting member may be placed on one surface of the second adhesive layer (the surface on the first adhesive layer side), or the mending•reinforcing member may be impregnated into the second adhesive layer. The reason therefor is as described above.

The second adhesive sheet may include a second separator on another surface (surface opposite to the first adhesive layer side) of the second adhesive layer, and the surface of the second separator on the second adhesive layer side may be a shaping surface.

By the surface of the second separator on the second adhesive layer side being a shaping surface, infrastructure 10C, in which the shape of the shaping surface of second separator 23 is shaped on the surface of cured adhesive layer 3, may be obtained so that designability may be imparted to the infrastructure by contact curing first adhesive layer 22 and second adhesive layer 24, and then, peeling second separator 23 placed on second adhesive layer 24 off as illustrated in FIGS. 4B and 4C.

The present step may include a step of placing a mending•reinforcing member or an abnormality detecting member on another surface of the first adhesive layer of the first adhesive sheet-containing member for an infrastructure, before one surface of the second adhesive layer of the second adhesive sheet is attached. The reason therefor is similar to the reasons described above.

(c) Others

In the method for producing of the present aspect, at least one of the first adhesive sheet and the second adhesive sheet preferably include a pigment. The reason therefore is to make the location of the mended portion visibly recognizable from a distance; also, by including the pigment, a base to which the adhesive sheet is attached may be protected.

3. Method for Producing Automobile

Among the embodiments described above, the first to third embodiments of the method for producing a product may be preferably used as a method for producing an automobile.

In the method for producing an automobile, using members for an automobile as the first member and the second member, the both may be adhered via the first adhesive layer and the second adhesive layer. That is, therefore, the method for producing an automobile may be "method for installing a member for an automobile" for adhering and fixing the members for an automobile to each other.

In the production of an automobile, one member for an automobile such as an automobile part is needed to be installed strongly to a desired position of another member for an automobile such as an automobile body, also, the installed state must be maintained for a long term regardless of the surrounding environment.

However, although a thermosetting adhesive is capable of adhering the members for an automobile strongly to each other, the combination of the material quality is limited since warpage and rise up occur due to the heat applied when the adhesive is cured, if the material quality or the expansion coefficient of the two is different. Particularly, in the production of an automobile, a plastic automobile part is installed to a metal automobile body in many cases, and in such cases, the above-described problems easily notably occur.

Also, although a double-sided tape is capable of easily installing members for an automobile having different material quality or expansion coefficient to each other since a heat treatment is not necessary, long-term durability is poor.

In contrast, among the above-described method for producing a product, by using any one of the first to third embodiments as a method for installing a member for an automobile in the production of an automobile, the above-described problems may be solved.

The method for producing an automobile using each of the first to third embodiments of the method for producing a product is similar to those explained in the section of "1. Method for Producing Construction Product" above except that the first member and the second member are members for an automobile and that the obtained product is an automobile, thus the explanation is omitted herein.

Incidentally, "construction product" in the section above may be replaced with "automobile", "method for producing a construction product" or "method for constructing a construction material" may be replaced with "method for producing of an automobile" or "method for installing a member for an automobile", and "member", "construction material" may be replaced with "member for an automobile" respectively.

The first member and the second member may be any member for an automobile, and the aspect thereof is not particularly limited if an adherend surface is included.

The member for an automobile here is referred to as an automobile body and an automobile part installed to the automobile body, and may be either interior material or exterior material. The automobile part is not particularly limited if it is a part generally used for an automobile; examples may include a decorative member such as an emblem, and structure member such as a pillar.

The material of the member for an automobile may be appropriately selected according to the region of an automobile; examples may include inorganic material, metal material, ceramic material, organic material and composite material or stacked material combining these. The material quality of the first member and the second member may be the same or may be different, and may be appropriately selected and combined.

Examples of the combination of the material quality of the first member and the second member may include a combination of metals and resin such as ABS, CFRP, and a combination of dissimilar metals such as a combination of aluminum and titanium.

II. Adhesive Sheet Set

The adhesive sheet set according to an embodiment of the present disclosure is an adhesive sheet set comprising a first adhesive sheet and a second adhesive sheet, wherein the first adhesive sheet includes a first separator and a first adhesive layer provided on one surface of the first separator, the second adhesive sheet includes a second separator and a second adhesive layer provided on one surface of the second separator, and the first adhesive sheet and the second adhesive sheet are configured to be cured and adhered by the first adhesive layer and the second adhesive layer being in contact with each other.

Figure 8A:
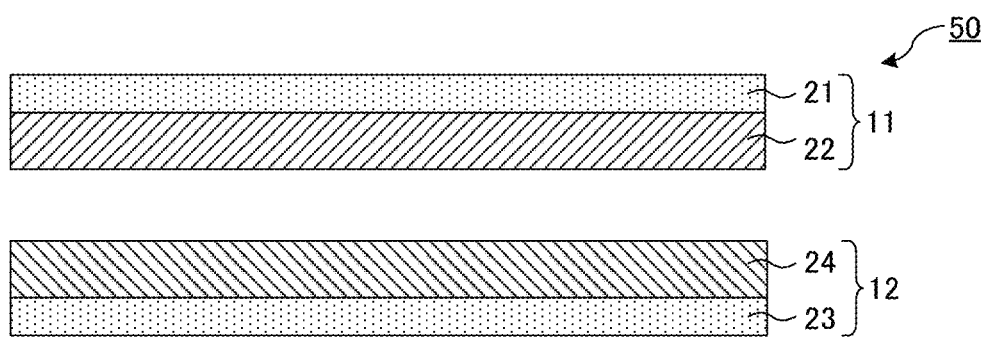
FIGS. 8A and 8B are schematic views illustrating an example of an adhesive sheet set.
Figure 8B:
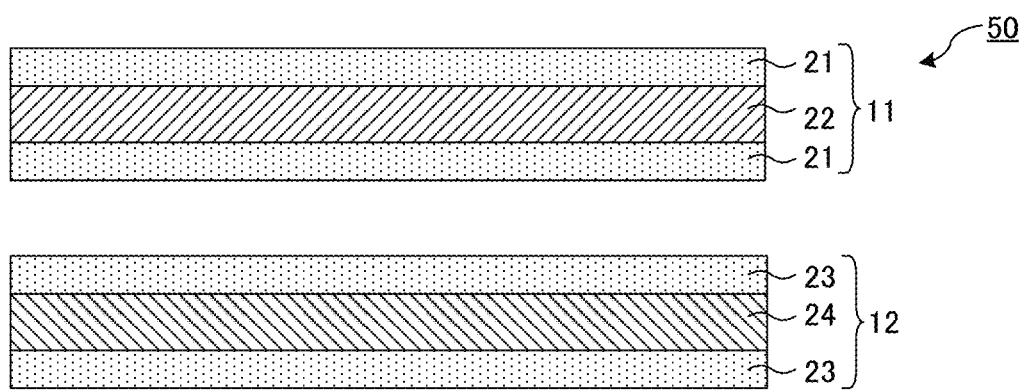

FIGS. 8A and 8B are schematic views illustrating an example of an adhesive sheet set. Adhesive sheet set 50 comprises a pair of first adhesive sheet 11 and a second adhesive sheet 12. First adhesive sheet 11 includes first separator 21 and first adhesive layer 22 provided on one surface of first separator 21. Second adhesive sheet 12 includes second separator 23 and second adhesive layer 24 provided on one surface of second separator 23. First adhesive sheet 11 and second adhesive sheet 12 are configured to be cured and to exhibit a strong adhesive force by first adhesive layer 22 and second adhesive layer 24 being in contact with each other so that a strong adhesion is possible.

The adhesive sheet in the adhesive sheet set may include a separator on one surface of the adhesive layer as illustrated in FIG. 8A, or may include separators on both surfaces of the adhesive layer as illustrated in FIG. 8B.

According to the adhesive sheet set according to an embodiment of the present disclosure, the first adhesive layer of the first adhesive sheet and the second adhesive layer of the second adhesive sheet are able to be cured at normal temperature by being in contact with each other so that strong adhesion is possible with a strong adhesive force exhibited by the curing.

In the adhesive sheet set comprising the first adhesive sheet and the second adhesive sheet, an adhesive layer including one of the two kinds of liquid chemicals of the two-component separate-coating type adhesive and an adhesive layer including another are separated into each adhesive sheet. By individually making the two kinds of liquid chemicals of the two-component separate-coating type adhesive into a sheet as described above, the following effects may be obtained.

Usually, when two members are attached using a two-component separate-coating type adhesive, each liquid chemical is needed to be coated on each member; however, since the liquid chemical is preliminarily made into a sheet, there is no need for mixing the liquid chemicals upon usage so that coating unevenness and coating failure upon coating and protrusion from an adherend surface may be prevented.

Also, since the liquid chemical is made into a sheet, a control by the thickness is made possible so that an adhesive layer may be inevitably placed on a member by attaching an adhesive sheet to a member. Accordingly, it is excellent also from the viewpoint of quality control when producing a product.

Further, although the curing reaction of the two kinds of liquid chemicals is promoted by being in contact with each other, since the liquid chemicals are made into a sheet separately, the curing reaction is not promoted during storage so that long term storage of the adhesive sheet alone is possible. Therefore, the adhesive sheet set may be used according to the timing of the production of a product. In addition, the adhesive sheet is capable of being adjusted in size according to the size or the shape of the adherend.

Since details of the first adhesive layer and the first separator of the first adhesive sheet, and the second adhesive layer and the second separator of the second adhesive sheet are similar to the details of the first adhesive layer, the second adhesive layer and the separator explained in the section of "I. Method for Producing Product, B. Use Applications and Details thereof, 1. Method for Producing Construction Product, (1) First Aspect" above, the explanation is omitted herein.

Also, for the first adhesive layer and the second adhesive layer, the tack force of each adhesive layer may be appropriately selected and combined according to the required function or to the use application of a product after adhesion. Specifically, it may be a combination explained in the section of "Combination of Tack force of First Adhesive Layer and Second Adhesive Layer" in the section of "I. Method for Producing Product, B. Use Applications and Details thereof, 1. Method for Producing Construction Product, (1) First Aspect" above.

It is preferable that one of the first adhesive layer and the second adhesive layer includes a curable component, and another includes a reactivity imparting component, above all, it is preferable that the curable component is an epoxy resin, and the reactivity imparting component is an imidazole compound.

Also, as for the first adhesive layer and the second adhesive layer, it is preferable that the adhesive layer including the curable component further includes a first compatible polymer component that is compatible with at least the curable component, and the adhesive layer including the reactivity imparting component further includes a second compatible polymer component that is compatible with at least the reactivity imparting component. Since the reason therefor and various compatible polymer component are explained in the section of "I. Method for Producing Product, B. Use Applications and Details thereof, 1. Method for Producing Construction Product, (1) First Aspect" above, the explanation is omitted herein.

Incidentally, the present disclosure is not limited to the above-described embodiments. The embodiments are exemplary ones, and thus, any ones including substantially the same configurations as the technical ideas described in the claims of the present disclosure and exhibiting the same functions and effects are included in the technical scope of the present disclosure.

EXAMPLES

Hereinafter, the present disclosure will be further specifically described showing Examples and Comparative Examples.

[Materials]

Details of each component used in the first adhesive composition and the second adhesive composition are shown in Table 1.

TABLE 1

| | Composition (symbol) | Composition (compound name) | Trade name (manufacturer name) | Classification |
|---|---|---|---|---|
| First adhesive composition | A | Liquid bisphenol A type epoxy resin | JER828 (Mitsubishi Chemical Corporation) | Curable component |
| | B | Solid bisphenol A type epoxy resin | JER1009 (Mitsubishi Chemical Corporation) | Curable component |
| | C | Polar group introduced modified methyl methacrylate-butyl acrylate-methyl methacrylate triblock copolymer (polar group imparted PMMA-PBuA-PMMA, Tg = −42° C.) | M22N (Arkema Corporation) | Compatible polymer component |
| | D | Ethyl acetate | (DIC Graphics Corporation) | Solvent |
| | E | Ethyl acrylate (EA)-butyl acrylate(BA)-acrylonitrile(AN) epoxy group including acrylic polymer | SG-P3 (Nagase ChemteX Corporation) | Curable component |
| | F | Diaminodiphenylmethane type semisolid epoxy resin | JER604 (Mitsubishi Chemical Corporation) | Curable component |
| | G | 67% bisphenol A type epoxy resin (core-shell rubber (particle size 200 nm) 33% containing, Mn = 380) | MX153 (Kaneka Corporation) | Curable component |
| | H | Solid bisphenol A type epoxy resin (Tg = 64° C., Mn = 900) | JER1001 (Mitsubishi Chemical Corporation) | Curable component |
| Second adhesive composition | I | 2-ethyl-4-methylimidazole | 2E4MZ (Shikoku Chemicals Corporation) | Reactivity imparting component |
| | J | Polar group introduced modified methyl methacrylate-butyl acrylate-methyl methacrylate triblock copolymer (polar group imparted PMMA-PBuA-PMMA, Tg = −42° C.) | M22N (Arkema Co., Ltd.) | Compatible polymer component |
| | K | Ethyl acetate | (DIC Graphics Corporation) | Solvent |

Examples 1 to 10

1. First Preparing Step

A first adhesive layer was formed by using a polyester film (thickness: 38 μm, trade name: SP-PET-03 manufactured by Tohcello Co., Ltd., hereinafter regarded as first separator A) subjected to a peeling treatment with a silicone based peeling agent on one surface thereof, the peeling-treated surface was respectively coated with the first adhesive composition including the composition blending shown in Table 2 below by using an applicator so that the thickness after the coating is 75 μm, and was dried in a drying oven at 80° C. for 2 minutes.

Next, using a polyester film (thickness: 38 μm, trade name: SP-PET-01 manufactured by Tohcello Co., Ltd., hereinafter regarded as first separator B) subjected to a peeling treatment with a silicone based peeling agent on one surface thereof, the film was stacked on the first adhesive layer so that the peeling-treated surface faces the first adhesive layer, and was pressed by using a roller of 2 kg. Thereby, a first adhesive sheet, in which the first separators A and B are respectively placed on both surfaces of the first adhesive layer, was obtained.

2. Second Preparing Step

A second adhesive layer was formed by using a separator same as the first separator B as a second separator B, the peeling-treated surface was coated with the second adhesive composition including the composition blending shown in Table 2 below by using an applicator so that the thickness after the coating is 25 μm, and was dried in a drying oven at 80° C. for 2 minutes.

Next, using a separator same as the first separator A as a second separator A, the film was stacked on the second adhesive layer so that the peeling-treated surface faces the second adhesive layer, and was pressed by using a roller of 2 kg.

Thereby, a second adhesive sheet, in which the second separators A and B are respectively placed on both surfaces of the second adhesive layer, was obtained.

3. Attaching Step

A first adhesive sheet-containing member was produced by cutting the first adhesive sheet to the size of 25 mm lengthwise, 12.5 mm widthwise, exposing the first adhesive layer by peeling the first separator B off, and attaching it to the tip part of a first member (hot-dip galvanized steel plate, JIS G3302/SGCC standard product, 100 mm lengthwise, 25 mm widthwise, 1.5 mm thickness).

Also, a second adhesive sheet-containing member was produced by cutting the second adhesive sheet to the same size as the first adhesive sheet, exposing the second adhesive layer by peeling the second separator B off, and attaching it to the tip of a second member (same as the first member).

After exposing the first adhesive layer and the second adhesive layer respectively by peeling off another first separator and second separator of the first adhesive sheet-containing member and the second adhesive sheet-containing member respectively, the adhesive layers were attached to each other so that the adhesive area is 25 mm lengthwise, 12.5 mm widthwise.

After temporarily fixing the members of each adhesive sheet-containing member to each other, aging was carried out for 7 days or 1 month under atmosphere of 23° C., 50%, with 3 kg loaded on the temporarily fixed part, thereby a product was obtained.

Also, after temporarily fixing the members of each adhesive sheet-containing member to each other, the temporarily fixed part was heated at 150° C. for 30 minutes, with 3 kg loaded thereon, thereby a sample for measuring strength when thermally set was also produced separately.

Comparative Example 1

An acrylic based double-sided tape (including acrylic tacky agent, trade name: Y-4180, manufactured by 3M Company) was attached on the first member, one separator of the double-sided tape was peeled off, and the second member was attached.

[Evaluation 1]
(1) Adhesive Strength (Shear Tensile Strength)

Both ends of the obtained product were fixed to a Tensilon universal material tester (RTF-1350, manufactured bay A & D Co., Ltd.) under the environment of 23° C., 50% RH, pulled at 10 mm/min, and the shear tensile strength was measured, and the value was regarded as the adhesive strength (compliant with JIS K6850:1999 (Adhesive-Method for Testing Tensile Shear Adhesive Strength of Rigid Adherend)). Specifically, it was measured by the method explained in the section of "I. Method for Producing Product, B. Use Applications and Details thereof, 1. Method for Producing Construction Product, (1) First Aspect" above.

(2) Curing Property

After measuring the adhesive strength, the fractured surface was inspected with an index finger, and determined as "o" if it was not tacky and determined as "x" if it was still tacky.

(3) Tackiness

The first adhesive sheet was cut to the size of 25.4 mm lengthwise, 150 mm widthwise, the first separator B was peeled off, and a PET film (A4100, manufactured by Toyobo Co., Ltd.) was attached on the exposed first adhesive layer with a roller by hand. After that, the first separator A was peeled off, and a SUS plate (304BA, adherend surface: ground surface, sample: 25.4 mm lengthwise, 150 mm widthwise) was attached on the exposed first adhesive layer with a roller by hand. After that, about 20 mm of the first adhesive layer provided with the PET film was peeled off by hand from the SUS plate, the tack force (N/in) of the first adhesive layer to the SUS plate surface was measured with a tensile testing machine (model number: RTF-1150H, manufactured by A and D Co., Ltd.) under the conditions (tensile speed: 300 mm/min, peeling distance: 150 mm, peeling angle: 180°) compliant with JIS 20237: 2009 (Testing methods of pressure-sensitive adhesive tapes and sheets) and the Method 1 of Testing Method for Tack Force (temperature: 23° C., humidity: 50%, testing method in which the tape and the sheet are pulled and peeled off at 180° to the stainless testing plate). The tack force of the second adhesive layer of the second adhesive sheet was also measured by the method similar to the above.

The results were determined as "0" if the tack force was 0.05 N/25 mm or more and determined as "x" if the tack force was less than 0.05 N/25 mm. The results are shown in Table 2.

TABLE 2

| | | Compounded amount (parts by mass) | | | | | | | | | | |
|---|---|---|---|---|---|---|---|---|---|---|---|---|
| | Composition (symbol) | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
| First adhesive composition | A | 100 | 100 | 100 | — | 130 | 130 | 130 | 130 | — | 85 | |
| | B | — | — | — | — | — | — | — | — | — | 15 | |
| | C | — | — | — | — | 30 | 30 | 50 | 70 | 30 | 10 | |
| | D | 43 | 43 | 43 | 43 | 43 | 43 | 43 | 43 | 43 | 43 | |
| | E | 100 | 50 | 100 | 100 | — | — | — | — | — | — | |
| | F | — | — | — | — | — | 10 | — | — | — | — | |
| | G | — | — | — | 100 | — | — | — | — | 130 | — | |
| | H | 100 | 100 | 50 | 100 | 70 | 70 | 70 | 70 | 70 | — | |
| Second adhesive composition | I | 100 | 100 | 100 | 100 | 100 | 100 | 100 | 100 | 100 | 100 | |
| | J | 80 | 80 | 80 | 80 | 80 | 80 | 80 | 80 | 80 | 80 | |
| | K | 287 | 287 | 287 | 287 | 287 | 287 | 287 | 287 | 287 | 287 | |
| | Evaluation | | | | | | | | | | | |
| Tackiness | First adhesive layer (before curing) | o | o | o | o | o | o | o | o | o | o | o |
| | Second adhesive layer (before curing) | o | o | o | o | o | o | o | o | o | o | |

TABLE 2-continued

| | Composition (symbol) | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|---|
| Shear strength (MPa) | 23° C. 50% RH × 7 days | 1.2 | 1.1 | 1.7 | 0.7 | 2.4 | 2.3 | 1.1 | 1.4 | 0.6 | 3.2 | 0.2 |
| | 23° C. 50% RH × 1 month | 4.1 | 2 | 2.5 | 3.8 | 3.8 | 4.5 | 6.4 | 6.5 | 6.6 | 5.4 | 0.3 |
| | 150° C. × 30 minutes | 12.9 | 9.7 | 8.6 | 10.7 | 6.4 | 6.3 | 9.3 | 17.6 | 15.8 | 7.8 | thermally fused, impossible to evaluate |
| Curing Proprty | 23° C. 50% RH × 1 month | ○ | ○ | ○ | ○ | ○ | ○ | ○ | ○ | ○ | ○ | x (not cured) |

[Discussion of Evaluation 1]

From the results of Examples 1 to 10 and Comparative Example 1, it was suggested that, since the cohesive force of the non-curing type adhesive composition was low, the shear strength thereof was low and was not resistant to heating. Also, from the results of Examples 1 to 10, the followings were suggested. That is, comparing Examples 1 and 2, when the content of EA-BA-AN polymer (Composition E) was larger, the toughness was improved and the strength tended to be increased.

Also, comparing Examples 1, 3, and 4, the strength tended to be slightly decreased, since it became harder and brittle overall, when the content of the solid (high molecular) epoxy resin (Composition H) is decreased. In contrast, even when the liquid (low molecular) epoxy resin (Composition A) was lowered, the components included in the first adhesive layer and the second adhesive layer were not properly diffused after being attached so that the curing property at normal temperature tended to be lowered. Although in this case, the diffusion was promoted and the strength was higher if heated.

Comparing Examples 5 to 10, by adding an acrylic triblock copolymer (Composition C), the compatibility and the toughness are improved, and the curing property at normal temperature (particularly, refer to the results of the shear strength of after 7 days curing) is excellent. In these cases, although the curing property at room temperature tends to be lowered since the diffusing property of the components included in the first adhesive layer and the second adhesive layer was lowered as the added amount of the acrylic triblock copolymer was increased, the toughness was improved so that the strength after the heating was particularly improved.

Example 11

1. First Preparing Step

Using the same first separator A as in Example 1, a first adhesive sheet was obtained by coating the peeling-treated surface with the first adhesive composition of the composition blending shown in Table 3 below by using an applicator so that the thickness after the coating is 75 μm, drying in a drying oven at 80° C. for 2 minutes, thereby forming the first adhesive layer.

Using a 3 mm thickness plate material (MDF) assuming a residential floor material, the MDF and the first adhesive layer of the first adhesive sheet were stacked so that they face to each other, and were pressed by using a roller of 2 kg. Thereby, a first adhesive sheet-containing construction material in which the first adhesive sheet was placed on one surface of the MDF was obtained.

2. Second Preparing Step

Using the same second separator A as in Example 1, a second adhesive layer was formed by coating the peeling-treated surface with the second adhesive composition of the composition blending shown in Table 3 below by using an applicator so that the thickness after the coating is 25 μm, and drying in a drying oven at 80° C. for 2 minutes.

Next, similarly using the second separator A, the peeling-treated surface and the second adhesive layer were stacked so that they face to each other, and were pressed by using a roller of 2 kg, and a second adhesive sheet in which the second separators A were placed on both surfaces of the second adhesive layer was obtained.

Using an iron plate (hot-dip galvanized steel plate, 1.5 mm thickness) imitating a floor, the second adhesive layer was exposed by peeling off one second separator A provided on the second adhesive sheet, and the second adhesive layer and the iron plate were attached with hands and fingers. Thereby, a second adhesive sheet-containing construction material in which the second adhesive sheet was placed on one surface of the iron plate was obtained.

TABLE 3

| | Composition (symbol) | Compounded amount (parts by mass) |
|---|---|---|
| First adhesive composition | A | 85 |
| | B | 15 |
| | C | 10 |
| | D | 43 |
| Second adhesive composition | I | 100 |
| | J | 80 |
| | K | 187 |

3. Attaching Step

A construction product was obtained by peeling off the first separator A and the second separator B of the first adhesive sheet-containing construction material and the second adhesive sheet-containing construction material, respectively exposing the first adhesive layer and the second adhesive layer and attaching. According to the method of Example 11, it was confirmed that it was able to attach the MDF and the iron plate simply.

Comparative Example 2

A one-component liquid type moisture curing adhesive (hereinafter, may be called simply as one-component curing type adhesive in some cases) was produced by mixing a silicone elastomer (trade name: KE-66, manufactured by Shin-Etsu Chemical Co., Ltd.) as a main agent and a curing agent CAT-RC (manufactured by Shin-Etsu Chemical Co., Ltd.) so as to be main agent:curing agent=100: 2 in the weight ratio.

One surface of the MDF used in Example 11 was coated with the one-component curing type adhesive, the iron plate used in Example 11 was attached to the coated surface, and a construction product was obtained. In Comparative Example 2, the mixing production of the one-component curing type adhesive was complex, and when the one-component curing type adhesive was coated, the protrusion of the liquid from the MDF was confirmed.

Comparative Example 3

The double-sided tape used in Comparative Example 1 was attached to an iron plate same as in Example 11, the separator on one surface of the double-sided tape was peeled off, the MDF same as in Example 11 was attached thereto, and a construction product was obtained. In Comparative Example 3, since it was only attaching each construction material via the double-sided tape, the construction was simple.

[Evaluation 2]
1. Shear Tensile Strength

Evaluation samples were produced by the following method, and the shear tensile strength of each evaluation sample was measured. All of the MDFs used for producing the evaluation samples were similar to that used in Example 11. The shear tensile strength was measured under the same conditions similar to Evaluation 1.

(Evaluation Sample 1)

One second separator A of the second adhesive sheet produced in Example 11 was peeled off, the exposed second adhesive layer was attached to the MDF with hands and fingers, and another second separator A was peeled off. Thereto, the first adhesive layer, exposed by peeling off the first separator A of the first adhesive sheet produced in Example 11, was attached so that the first adhesive layer and the second adhesive layer are to be adhered to each other, and other MDF was attached on the first adhesive layer so that the adhesive area was 12.5 mm×25 mm. After that, the above was aged for 24 hours under the environment of 23° C., 50% RH, and evaluation sample 1 was obtained. The shear tensile strength of evaluation sample 1 was 3.4 MPa.

(Evaluation Sample 2)

The surface of the MDF was coated with the adhesive used in Comparative Example 2 as liquid, similarly, other MDF was attached on the adhesive layer so that the adhesive area was 12.5 mm×25 mm. Since the MDF could not be fixed because the adhesive was liquid, the MDF was fixed by a Kapton tape so as not to be peeled off, and aging was carried out for 24 hours under atmosphere of 23° C., 50% RH to obtain evaluation sample 2. The shear tensile strength of evaluation sample 2 was 1.2 MPa.

(Evaluation Sample 3)

The double-sided tape used in Comparative Example 3 was attached on the MDF, one separator of the double-sided tape was peeled off, and other MDF was attached on the double-sided tape so that the adhesive area was 12.5 mm×25 mm. After that, the above was aged for 24 hours under the environment of 23° C., 50% RH, and evaluation sample 3 was obtained. The shear tensile strength of evaluation sample 3 was 0.2 MPa.

[Discussion of Evaluation 2]

Since the resin included in the adhesive was silicone resin in Comparative Example 2, the adhesive was soft even after the curing, and the shear tensile strength was low strength as 1.2 MPa. Also, since the tacky agent was used in Comparative Example 3, almost no stress was exhibited in the shear tensile strength test, and the result was such that it continued to extend on and on so that the shear tensile strength was extremely low strength.

Meanwhile, compared to Comparative Examples 2 and 3, a high shear tensile strength was exhibited in Example 11.

Examples 12 to 15

1. Formation of First Adhesive Sheet Using a polyester film subjected to a peeling treatment with a silicone based peeling agent on one surface thereof (first separator A), a first adhesive layer was formed by respectively coating the peeling-treated surface with the first adhesive composition including the composition blending shown in Table 4 below by using an applicator so that the thickness after the coating is 75 μm, and drying thereof in a drying oven at 80° C. for 2 minutes.

Next, using a polyester film subjected to a peeling treatment with a silicone based peeling agent on one surface thereof (first separator B), the film was stacked on the first adhesive layer so that the peeling-treated surface faces the first adhesive layer, and was pressed by using a roller of 2 kg.

Thereby, a first adhesive sheet, in which the first separators A and B are respectively placed on both surfaces of the first adhesive layer, was obtained.

2. Formation of Second Adhesive Sheet

A second adhesive layer was formed by using a separator same as the first separator B as a second separator B, the peeling-treated surface was coated with the second adhesive composition including the composition blending shown in Table 4 below by using an applicator so that the thickness after the coating is 25 μm, and was dried in a drying oven at 80° C. for 2 minutes.

Next, using a separator same as the first separator A as a second separator A, the film was stacked on the second adhesive layer so that the peeling-treated surface faces the second adhesive layer, and was pressed by using a roller of 2 kg.

Thereby, a second adhesive sheet, in which the second separators A and B are respectively placed on both surfaces of the second adhesive layer, was obtained.

3. Adhesive Sheet Set

An adhesive sheet set was obtained by combining the first adhesive sheet and the second adhesive sheet shown in Table 4.

TABLE 4

|  |  | Ex. 12 Compounded amount (parts by mass) | Ex. 13 Compounded amount (parts by mass) | Ex. 14 Compounded amount (parts by mass) | Ex. 15 Compounded amount (parts by mass) |
|---|---|---|---|---|---|
|  | Composition (symbol) |  |  |  |  |
| First adhesive composition | A | 85 | 85 | 50 | 50 |
|  | B | 15 | 15 | 50 | 50 |
|  | C | 10 | 10 | 10 | 10 |
|  | D | 43 | 43 | 43 | 43 |

TABLE 4-continued

|  |  | Ex. 12 Compounded amount (parts by mass) | Ex. 13 Compounded amount (parts by mass) | Ex. 14 Compounded amount (parts by mass) | Ex. 15 Compounded amount (parts by mass) |
|---|---|---|---|---|---|
| Second adhesive composition | I | 50 | 80 | 50 | 80 |
|  | J | 100 | 100 | 100 | 100 |
|  | K | 300 | 300 | 300 | 300 |
|  | Unit |  |  |  |  |
| Tackiness (first adhesive layer) | N/inch | 10.5 | 10.5 | 0.6 | 0.6 |
| Tackiness (second adhesive layer) | N/inch | 1.3 | 0.4 | 1.3 | 0.4 |
| Thickness (first adhesive layer) | μm | 75 | 75 | 75 | 75 |
| Thickness (second adhesive layer) | μm | 25 | 25 | 25 | 25 |
| Storage elastic modulus (first adhesive layer) | Pa | $4.03 \times 10^5$ | $4.03 \times 10^5$ | $1.67 \times 10^8$ | $1.67 \times 10^8$ |
| Storage elastic modulus (second adhesive layer) | Pa | $4.35 \times 10^4$ | $3.14 \times 10^5$ | $4.35 \times 10^4$ | $3.14 \times 10^5$ |
| Shear strength | MPa | 2.1 | 2.2 | 1.0 | 0.9 |
| Holding property (holding force) | Second | 12.5 | 16.5 | 5 | 12.5 |
| Reworkability | % | 30 | 10 | 100 | 100 |

[Evaluation 3]

(1) Tackiness

For the adhesive sheet sets of Examples 12 to 15, respective tack force of the first adhesive layer of the first adhesive sheet and the second adhesive layer of the second adhesive sheet was measured. The measurement of the tack force was carried out by a method similar to the method explained in the section of Evaluation 1 above. The results are shown in Table 4.

(2) Shear Tensile Strength

For the adhesive sheet sets of Examples 12 to 15, the shear tensile strength was measured. The measurement of the shear tensile strength was carried out by the method explained in the section of "Combination of Tack Force of First Adhesive Layer and Second Adhesive Layer" in the section of "I. Method for Producing Product, B. Use Applications and Details thereof, 1. Method for Producing Construction Product, (1) First Aspect" above. The results are shown in Table 4.

(3) Storage Elastic Modulus

For the adhesive sheet sets of Examples 12 to 15, the storage elastic modulus of the first adhesive layer and the second adhesive layer were measured. The measurement of the storage elastic modulus was carried out by the method explained in the section of "Combination of Tack Force of First Adhesive Layer and Second Adhesive Layer" in the section of "I. Method for Producing Product, B. Use Applications and Details thereof, 1. Method for Producing Construction Product, (1) First Aspect" above. The results are shown in Table 4.

(4) Holding Property

For the adhesive sheet sets of Examples 12 to 15, the holding force was measured. The measurement of the holding force was carried out by the method explained in the section of "Combination of Tack Force of First Adhesive Layer and Second Adhesive Layer" in the section of "I. Method for Producing Product, B. Use Applications and Details thereof, 1. Method for Producing Construction Product, (1) First Aspect" above. The results are shown in Table 4.

(5) Reworkability

For the adhesive sheet sets of Examples 12 to 15, the reworkability measured. The measurement of the reworkability was carried out by the method explained in the section of "Combination of Tack Force of First Adhesive Layer and Second Adhesive Layer" in the section of "I. Method for Producing Product, B. Use Applications and Details thereof, 1. Method for Producing Construction Product, (1) First Aspect" above. The results are shown in Table 4.

[Discussion of Evaluation 3]

From the results in Examples 12 to 15, the shear strength tended to be high regardless of the magnitude of the tackiness of the second adhesive layer including the reactivity imparting component, by making the tack force of the first adhesive layer including the curable component more than the tack force of the second adhesive layer including the reactivity imparting component, above all, by the one adhesive layer having the strong tackiness. Also, the reworkability also tended to be good. On this occasion, the thickness of the first adhesive layer was more than the thickness of the second adhesive layer. From these results, by making the tack force of the one adhesive layer more than another, it was suggested that the reactivity and the reworkability are improved. Also, by making the thickness of the adhesive layer including the curable component more, it was suggested that the similar effects may be exhibited.

Meanwhile, by making the tack force of one adhesive layer more than another adhesive layer, above all, by the one adhesive layer having the strong tackiness, it was suggested that the holding force tends to be high. Also, by making the thickness of the adhesive layer including the curable component more, it was suggested that the similar tendency may be exhibited (Examples 12 and 13). This is surmised that, although at least one will be a layer exhibiting low cohesive force and having softness, by increasing the tack force due to thickness at the same time, it is possible to increase the holding force since the stress is easily diffused overall.

Further, also in a case in which both of the first adhesive layer and the second adhesive layer have the weak tackiness, the holding force was suggested to be high (Example 15). This is surmised that, since both of the first adhesive layer and the second adhesive layer have the weak tackiness and are hard layers exhibiting high cohesive force, the stress is not concentrated to either one but the stress was received overall so that the resistance in shearing direction was increases.

The holding force in Example 14 was lower than in Examples 12, 13 and 15. From the results shown in Table 4, it was suggested that the holding property was improved by setting the storage elastic modulus of at least one adhesive layer in the predetermined range. Above all, it was suggested that the holding property was further improved by making the storage elastic modulus of both of the first adhesive layer and the second adhesive layer in the predetermined range.

Form the results of Examples 12 to 15, for the first adhesive layer and the second adhesive layer, it was suggested that the combination shown in Example 13, that is, the combination, in which the first adhesive layer including the curable component has the strong tackiness and the second adhesive layer including the reactivity imparting component has the weak tackiness, was the best from the viewpoints of the reactivity, the reworkability, and the holding property.

REFERENCE SIGNS LIST

1: first member
2: second member
10: product
11: first adhesive sheet
12: second adhesive sheet
20: first adhesive sheet-containing member
21: first separator
23: second separator
22: first adhesive layer
24: second adhesive layer
30: second adhesive sheet-containing member
50: adhesive sheet set

The invention claimed is:

1. An adhesive sheet set comprising:
a first adhesive sheet and
a second adhesive sheet,
wherein:
the first adhesive sheet includes:
  a first separator and
  a first adhesive layer provided on one surface of the first separator,
the second adhesive sheet includes:
  a second separator and
  a second adhesive layer provided on one surface of the second separator, wherein the second adhesive layer includes a reactivity imparting component,
among the first adhesive layer and the second adhesive layer, a curable component that is capable of being cured by the reactivity imparting component is only provided in the first adhesive layer,
the first adhesive sheet and the second adhesive sheet are configured to be cured and adhered by the first adhesive layer and the second adhesive layer being in direct contact with each other, and
among the first adhesive layer and the second adhesive layer, a tack force of one adhesive layer is more than a tack force of another adhesive layer.

2. The adhesive sheet set according to claim 1, wherein a tack force of the first adhesive layer and a tack force of the second adhesive layer are in a range of 0.05 N/in or more to less than 1 N/in, respectively.

3. The adhesive sheet set according to claim 1, wherein a tack force of the one adhesive layer is in a range of 5 N/in or more to 50 N/in or less, and
a tack force of the another adhesive layer is in a range of 0.05 N/in or more to less than 5 N/in.

4. The adhesive sheet set according to claim 1, wherein a tack force of the first adhesive layer and a tack force of the second adhesive layer are 0.5 N/in or more, respectively.

5. The adhesive sheet set according to claim 1, wherein, when the first adhesive layer and the second adhesive layer are attached under their own weight, maintained for 10 seconds, and then, peeled off, a proportion of an area of the first adhesive layer transferred to the second adhesive layer side after peeling, with respect to an adhesive area of the first adhesive layer before the peeling is 50% or less.

6. The adhesive sheet set according to claim 1, wherein a tack force of at least one of the first adhesive layer and the second adhesive layer is in a range of 5 N/in or more to 50 N/in or less.

7. The adhesive sheet set according to claim 1, wherein,
among the first adhesive layer and the second adhesive layer, a ratio of a thickness of one adhesive layer and a thickness of another adhesive layer is in a range of 0.5:1 to 5:1, and
a thickness of the one adhesive layer is in a range of 2 μm or more to 200 μm or less.

8. The adhesive sheet set according to claim 1, wherein a storage elastic modulus at 20° C. of at least one of the first adhesive layer and the second adhesive layer is in a range of $1.0 \times 10^5$ Pa or more to $1.0 \times 10^6$ Pa or less.

9. The adhesive sheet set according to claim 1, wherein the first adhesive layer further includes a first compatible polymer component that is compatible with at least the curable component, and the second adhesive layer further includes a second compatible polymer component that is compatible with at least the reactivity imparting component.

10. The adhesive sheet set according to claim 9, wherein a tack force of the first adhesive layer is more than a tack force of the second adhesive layer.

11. The adhesive sheet set according to claim 10, wherein a tack force of the first adhesive layer is in a range of 5 N/in or more to 50 N/in or less.

12. The adhesive sheet set according to claim 9, wherein a thickness of the first adhesive layer is more than a thickness of the second adhesive layer.

13. The adhesive sheet set according to claim 9, wherein the curable component includes an epoxy resin, and the reactivity imparting component includes an imidazole compound.

14. The adhesive sheet set according to claim 9, wherein the first compatible polymer component and the second compatible polymer component are a same component including an acrylic polymer.

15. The adhesive sheet set according to claim 9, wherein a mass-average molecular weight of the first compatible polymer component is more than a mass-average molecular weight of the curable component, and a mass-average molecular weight of the second compatible polymer component is more than a mass-average molecular weight of the reactivity imparting component.

16. The adhesive sheet set according to claim 1, wherein the first adhesive layer and the second adhesive layer are in different colors from each other.

17. The adhesive sheet set according to claim 1, wherein the first separator and the second separator are in different colors from each other.

18. The adhesive sheet set according to claim 15, wherein the second adhesive layer consists of the reactivity imparting component, the second compatible polymer component, and optionally a solvent.

* * * * *